US012055886B2

(12) United States Patent
Toda et al.

(10) Patent No.: US 12,055,886 B2
(45) Date of Patent: Aug. 6, 2024

(54) IMAGE FORMING APPARATUS HAVING A COMMUNICATION BOARD WITH A PLURALITY OF ANTENNAS

(71) Applicant: CANON KABUSHIKI KAISHA, Tokyo (JP)

(72) Inventors: Kozo Toda, Tokyo (JP); Tsutomu Kubota, Chiba (JP); Akitomo Fukui, Kanagawa (JP); Shozo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 17/701,794

(22) Filed: Mar. 23, 2022

(65) Prior Publication Data

US 2022/0214644 A1 Jul. 7, 2022

Related U.S. Application Data

(63) Continuation of application No. PCT/JP2020/037385, filed on Sep. 24, 2020.

(30) Foreign Application Priority Data

| Sep. 26, 2019 | (JP) | 2019-176272 |
| Sep. 26, 2019 | (JP) | 2019-176273 |
| Sep. 26, 2019 | (JP) | 2019-176274 |
| Sep. 26, 2019 | (JP) | 2019-176275 |
| Sep. 26, 2019 | (JP) | 2019-176276 |
| Sep. 26, 2019 | (JP) | 2019-176277 |

(51) Int. Cl.
*G03G 21/16* (2006.01)
*H04N 1/00* (2006.01)

(52) U.S. Cl.
CPC ..... *G03G 21/1657* (2013.01); *H04N 1/00315* (2013.01); *H04N 2201/0094* (2013.01)

(58) Field of Classification Search
None
See application file for complete search history.

(56) References Cited

U.S. PATENT DOCUMENTS 5,526,405 A 6/1996 Toda
5,526,420 A 6/1996 Watanabe et al.
(Continued)

FOREIGN PATENT DOCUMENTS

JP  H10-260239 A  9/1998
JP  2017-028477 A  2/2017
(Continued)

OTHER PUBLICATIONS

International Search Report and Written Opinion for International Patent Application No. PCT/JP2020/037385.

*Primary Examiner* — Akwasi M Sarpong
*Assistant Examiner* — Pawan Dhingra
(74) *Attorney, Agent, or Firm* — Venable LLP

(57) ABSTRACT

Conventionally, an image forming apparatus including a plurality of antennas for detecting for an arrival direction of a radio wave was not invented. In the present invention, a communication board including a plurality of antennas for wireless communicating with a communication terminal is provided on a front side with respect to a front-rear direction of an image forming apparatus including an imager forming unit in a vertical direction.

20 Claims, 23 Drawing Sheets

(56) References Cited

U.S. PATENT DOCUMENTS

| | | |
|---|---|---|
| 7,594,056 B2 | 9/2009 | Fujise et al. |
| 9,503,595 B2* | 11/2016 | Ueyama ............. H04N 1/00557 |
| 9,794,438 B2 | 10/2017 | Sawada |
| 9,876,922 B2 | 1/2018 | Onishi et al. |
| 9,953,784 B2 | 4/2018 | Kitora et al. |
| 2015/0146251 A1* | 5/2015 | Ueyama ............. H04N 1/00557 |
| | | 358/1.15 |
| 2017/0026530 A1 | 1/2017 | Sawada |
| 2017/0257502 A1* | 9/2017 | Onishi ............... H04N 1/00559 |
| 2017/0276776 A1* | 9/2017 | Ito ........................... G01S 11/06 |
| 2017/0374213 A1* | 12/2017 | Sawada ............. H04N 1/00564 |
| 2018/0076864 A1* | 3/2018 | Jan ....................... H01Q 21/205 |
| 2018/0107042 A1* | 4/2018 | Yamasaki ............. G02F 1/1343 |
| 2020/0044310 A1* | 2/2020 | Ben Rached ...... H01Q 21/0087 |
| 2020/0382658 A1* | 12/2020 | Ikarashi ................... B41J 2/175 |
| 2020/0389563 A1* | 12/2020 | Toda .................. H04N 1/00315 |
| 2021/0360114 A1 | 11/2021 | Toda |

FOREIGN PATENT DOCUMENTS

| | | |
|---|---|---|
| JP | 2017-154374 A | 9/2017 |
| JP | 2017-173189 A | 9/2017 |

\* cited by examiner (a)
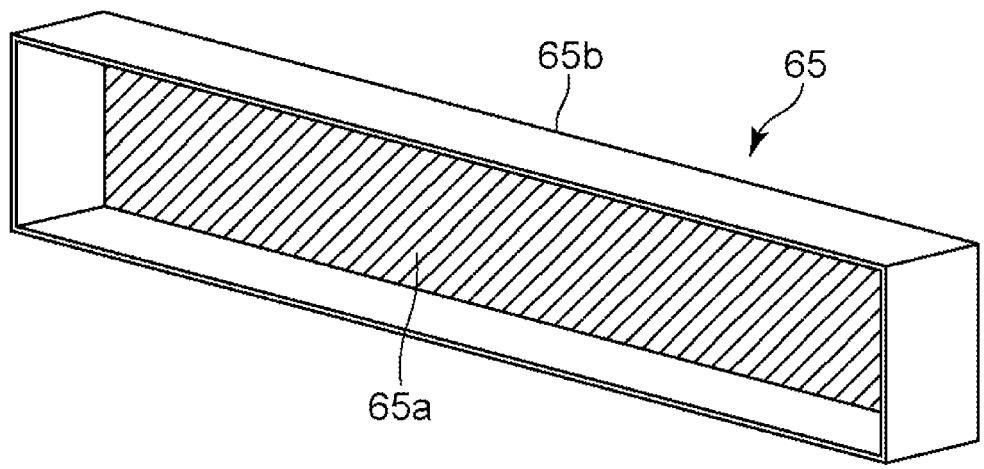
(b)
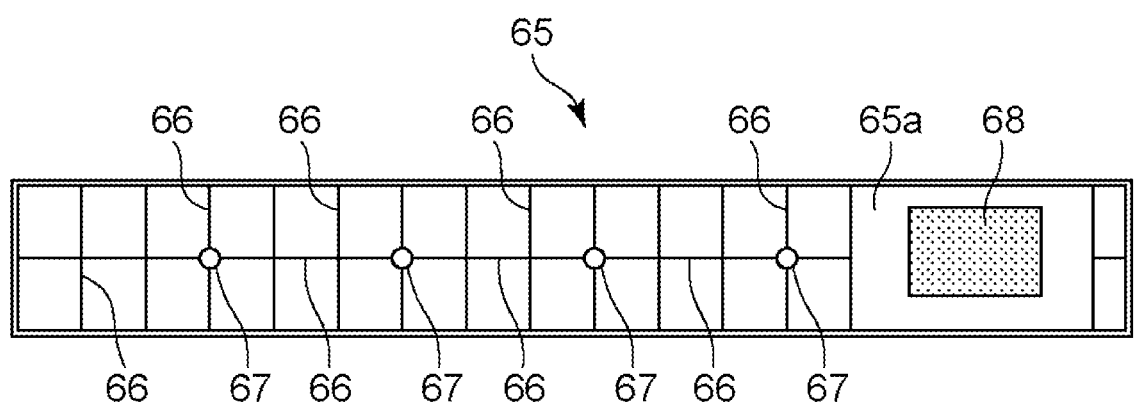
Fig. 8

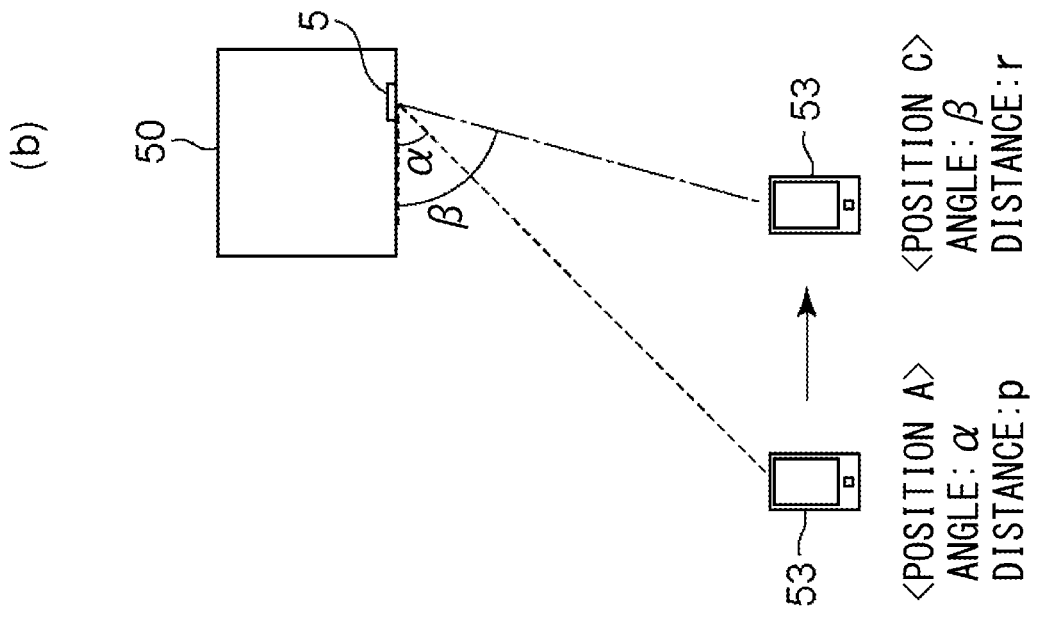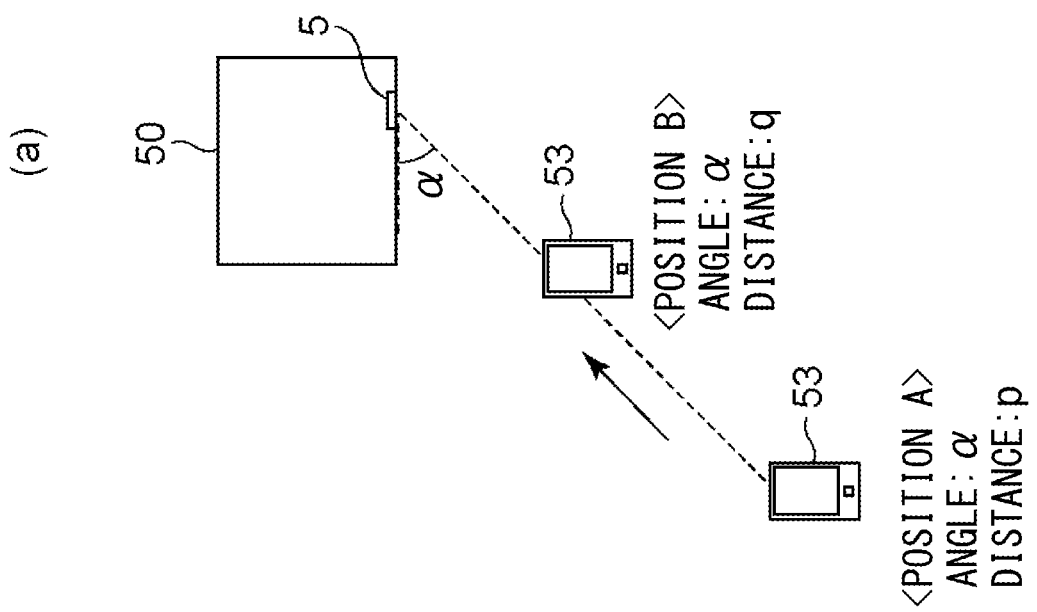
Fig. 9

(a)
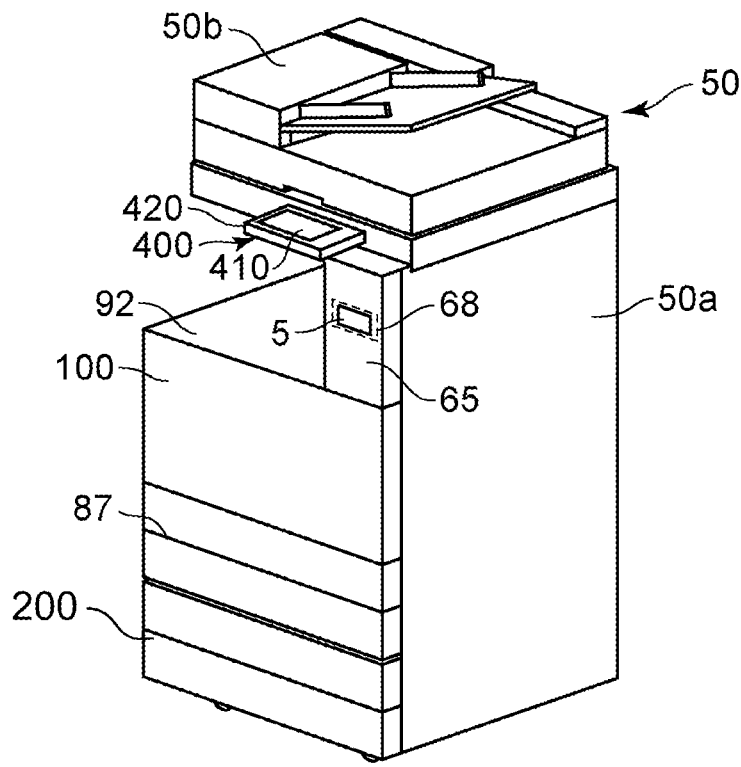
(b)
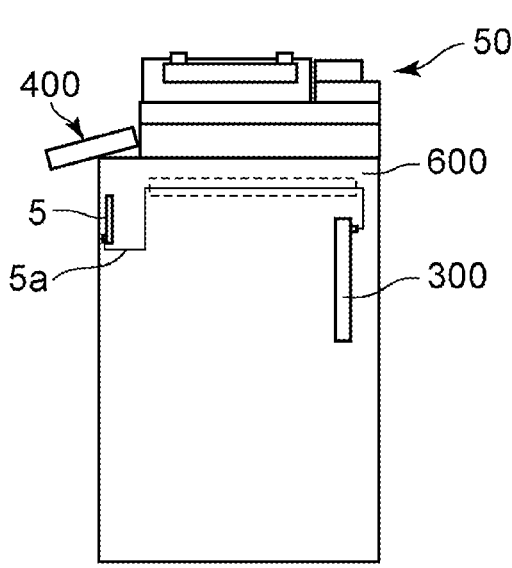
(c)
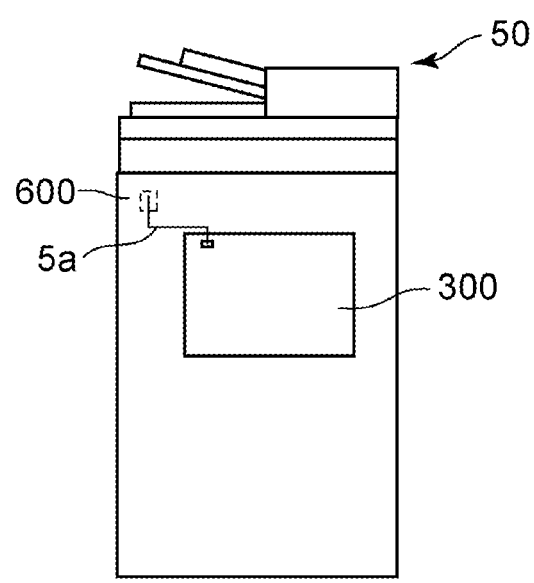
Fig. 13

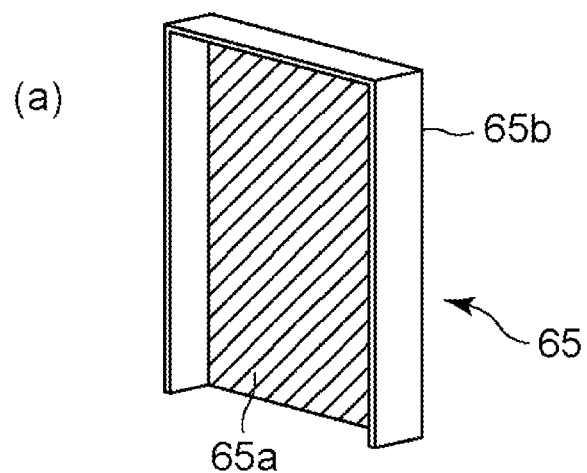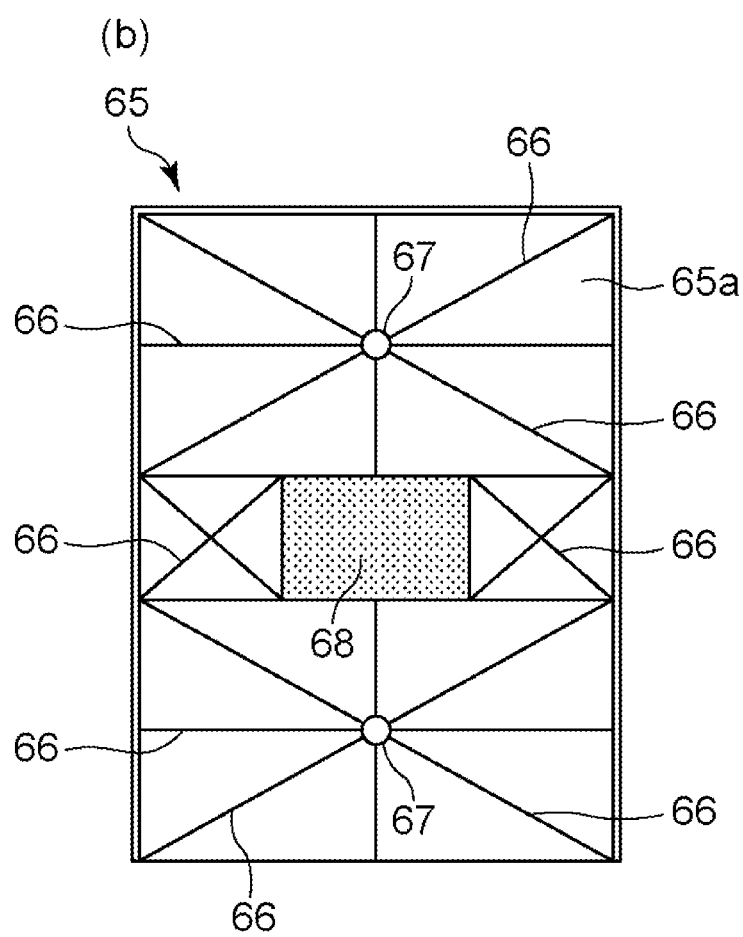
Fig. 14

(a)
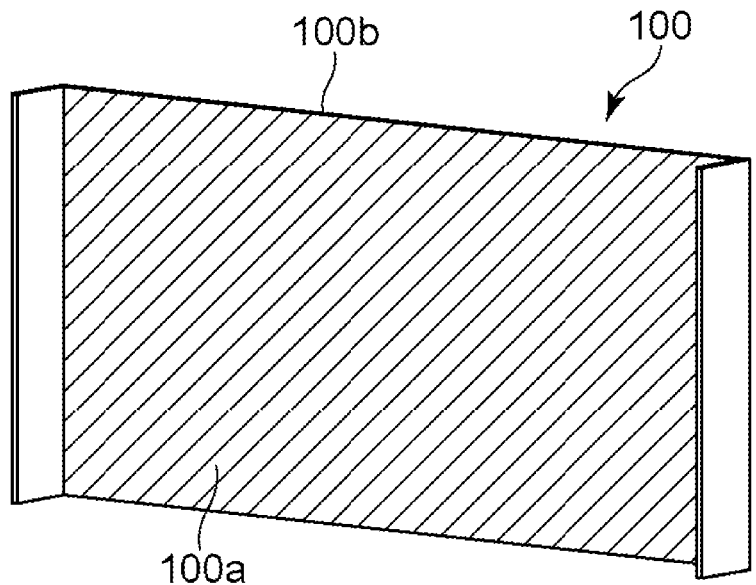
(b)
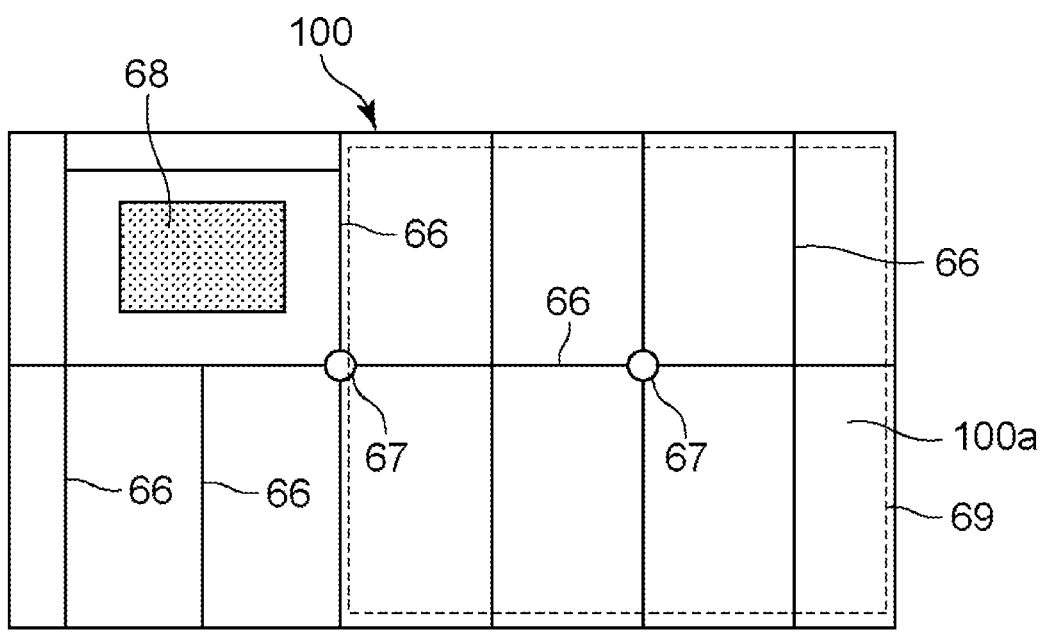
Fig. 16

(a)
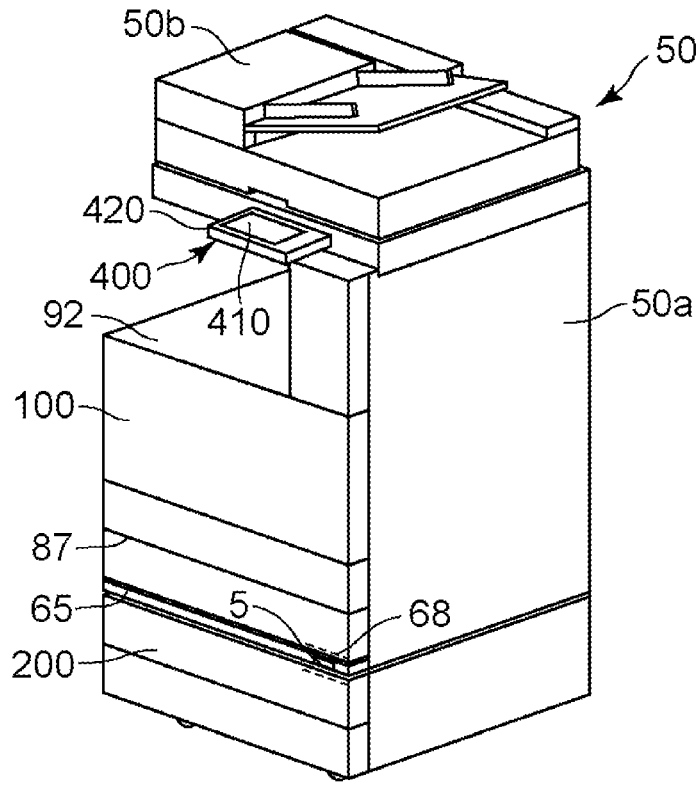
(b)
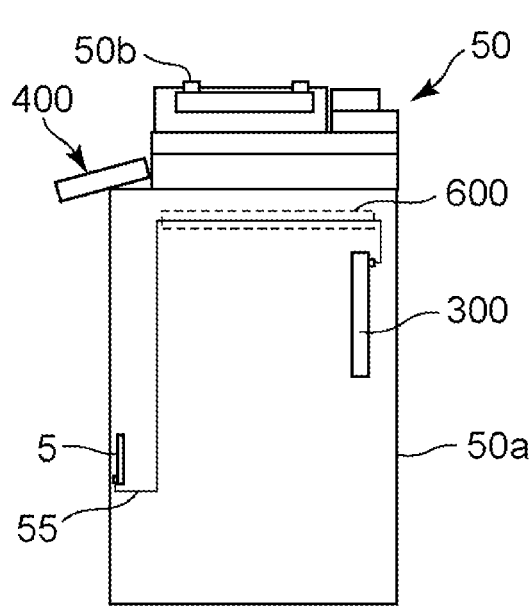
(c)
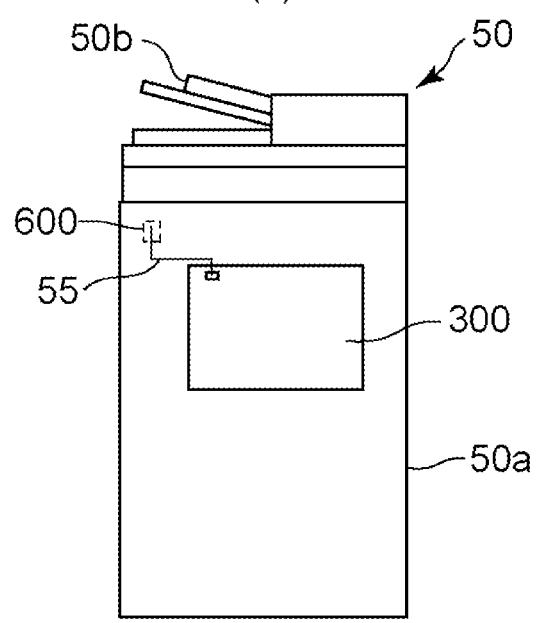
Fig. 17

(a)
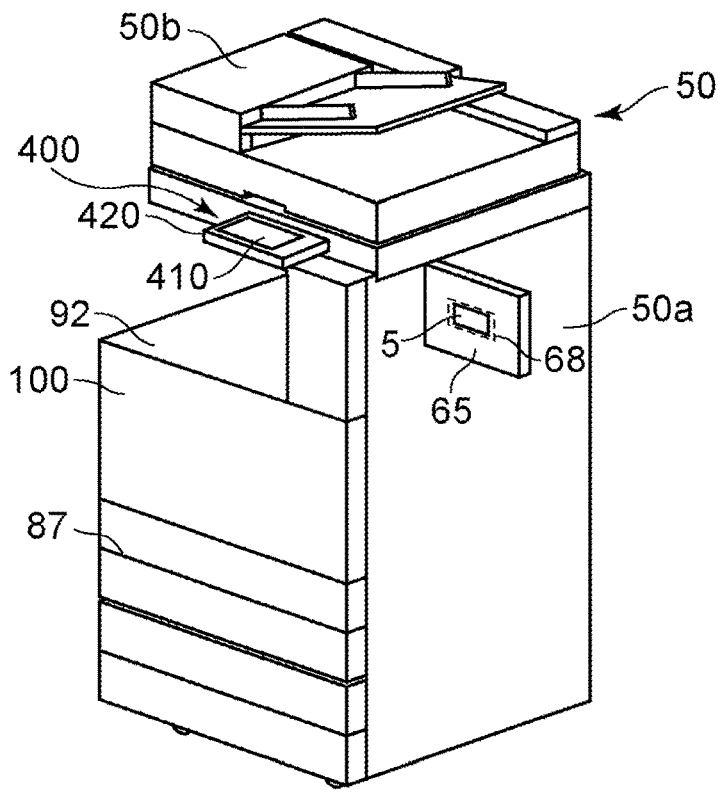
(b)
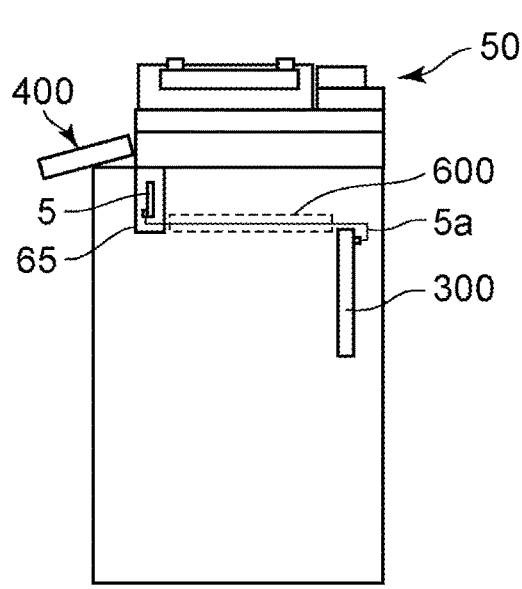
(c)
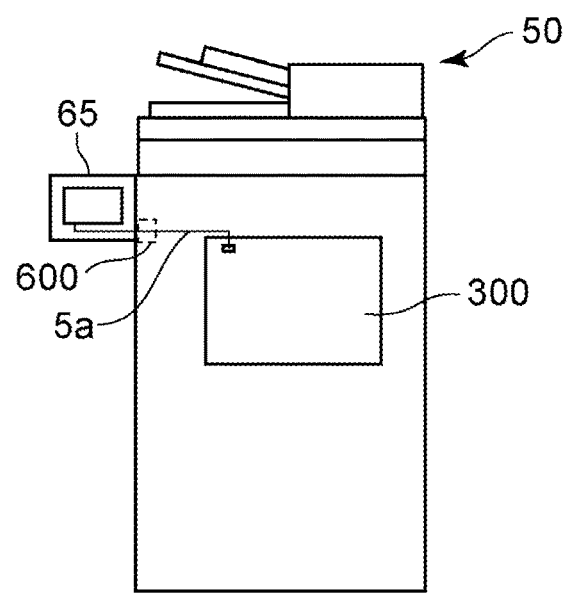
Fig. 22

IMAGE FORMING APPARATUS HAVING A COMMUNICATION BOARD WITH A PLURALITY OF ANTENNAS

FIELD OF THE INVENTION

The present invention relates to an imaging forming apparatus such as a printer, a copier, a fax machine, or a multifunction device, provided with a wireless communication function which enables wireless communication with a communication terminal.

BACKGROUND ART

In recent years, with a spread of a use of communication terminals such as a smartphone and a tablet terminal in a business application, it is required for an image forming apparatus to expand its function to work with the communication terminals. For this reason, a trend to improve a usability of the image forming apparatus by being provided with short range wireless communication functions such as Bluetooth (registered trademark).

Bluetooth is a wireless communication system which uses a 2.4 GHz ISM (Industrial Scientific and Medical) band, as well as other communication systems such as Wi-Fi (registered trademark). And Bluetooth Low Energy (hereinafter, referred to as BLE) is a part of a Bluetooth standard, and is a close proximity wireless communication system with lower power consumption than a conventional Bluetooth.

In particular, BLE is applied to various functions by controlling a position. And an image forming apparatus, which loads the BLE communication function and performs a short range wireless communication with a communication terminal, is popular. In Japanese Laid-Open Patent Application (JP-A) 2017-173189, a technology, which detects a distance between an image forming apparatus and a communication terminal by a radio wave strength when the communication terminal receives a BLE communication radio wave which is transmitted from the imaging forming apparatus.

PROBLEM TO BE SOLVED BY THE INVENTION

As mentioned above, as for BLE, a method of determining a distance between devices, based on a radio wave strength, is widely known, and applied. Besides, in a BLE communication function by Bluetooth 5.1, a function, to detect a direction in which a device is located between devices by detecting an arrival direction of a radio wave, is added by an upgrading of the Bluetooth standard, in addition to determining a conventional distance. In this case, in order to detect the arrival direction of the radio wave, it is necessary to arrange a plurality of antennas and to detect differences in phase and time of the radio waves which are sent and received between the plurality of antennas.

However, conventionally, an image forming apparatus including a plurality of antennas for detecting an arrival direction of a radio wave was not invented.

The present invention is made in consideration of the problems described above, and its object is to improve a performance of the image forming apparatus by using a plurality of antennas to detect an arrival direction of a radio wave.

MEANS FOR SOLVING THE PROBLEMS

A typical constitution of the present invention is an image forming apparatus including an image forming unit configured to form an image on a sheet, which is provided with a main assembly including the image forming unit therein, a reading device provided above the main assembly with respect to a vertical direction and for reading an image of an original, an operating portion provided on a front side of the reading device with respect to a front-rear direction of the image forming apparatus and above the main assembly with respect to the vertical direction, and operable by a user, and a communication board provided with a plurality of antennas for detecting for an arrival direction of a radio wave, the plurality of antennas being arranged along a horizontal direction, wherein the communication board is provided on a front side of the image forming apparatus with respect to the front-rear direction. Further, another typical constitution of the present invention is an image forming apparatus including an image forming unit configured to form an image on a sheet, which is provided with a main assembly including the image forming unit therein, a reading device provided above the main assembly with respect to a vertical direction and for reading an image of an original, an operating portion provided on a front side of the reading device with respect to a front-rear direction of the image forming apparatus and above the main assembly with respect to the vertical direction, and operable by a user, and a communication board provided with a plurality of antennas for detecting for an arrival direction of a radio wave, the plurality of antennas being arranged along a horizontal direction, wherein the communication board is provided at a position projecting from an upper surface of the reading apparatus with respect to the vertical direction of the image forming apparatus and where the plurality of antennas are not overlapped with any other portions as viewed from a front of the image forming apparatus. Further, another typical constitution of the present invention is an image forming apparatus including an image forming unit configured to form an image on a sheet, which is provided with a main assembly including the image forming unit therein, a reading device provided above the main assembly with respect to a vertical direction and for reading an image of an original, an operating portion provided on a front side of the reading device with respect to a front-rear direction of the image forming apparatus and above the main assembly with respect to the vertical direction, and operable by a user, and a communication board provided with a plurality of antennas for detecting for an arrival direction of a radio wave, the plurality of antennas being arranged along a horizontal direction, wherein the communication board is provided so as to project from a side surface of the image forming apparatus with respect to a widthwise direction of the image forming apparatus.

According to the present invention, it is possible to improve a performance of an image forming apparatus by using a plurality of antennas to detect an arrival direction of a radio wave.

BRIEF DESCRIPTION OF THE DRAWINGS

FIG. 8 is a view showing an outer cover which covers a BLE communication unit.

FIG. 9 is a view illustrating a detection of a user's movement locus by BLE.

FIG. 13 is a view illustrating an arrangement of a BLE communication unit in a third embodiment.

FIG. 14 is a view showing an outer cover which covers a BLE communication unit in a third embodiment.

FIG. 16 is a view showing an outer cover which covers a BLE communication unit in a fourth embodiment.

FIG. 17 is a view illustrating an arrangement of a BLE communication unit in a fifth embodiment.

FIG. 22 is a view illustrating an arrangement of a BLE communication unit in a seventh embodiment.

EMBODIMENTS FOR CARRYING OUT THE INVENTION

Optimum forms for implementing the present invention will be described with reference to drawings below. Incidentally, dimensions, materials, shapes, relative arrangements, etc., of components described below are not intended to limit a scope of the present invention only to them, unless it is specifically described.

Embodiment 1

Figure 1:
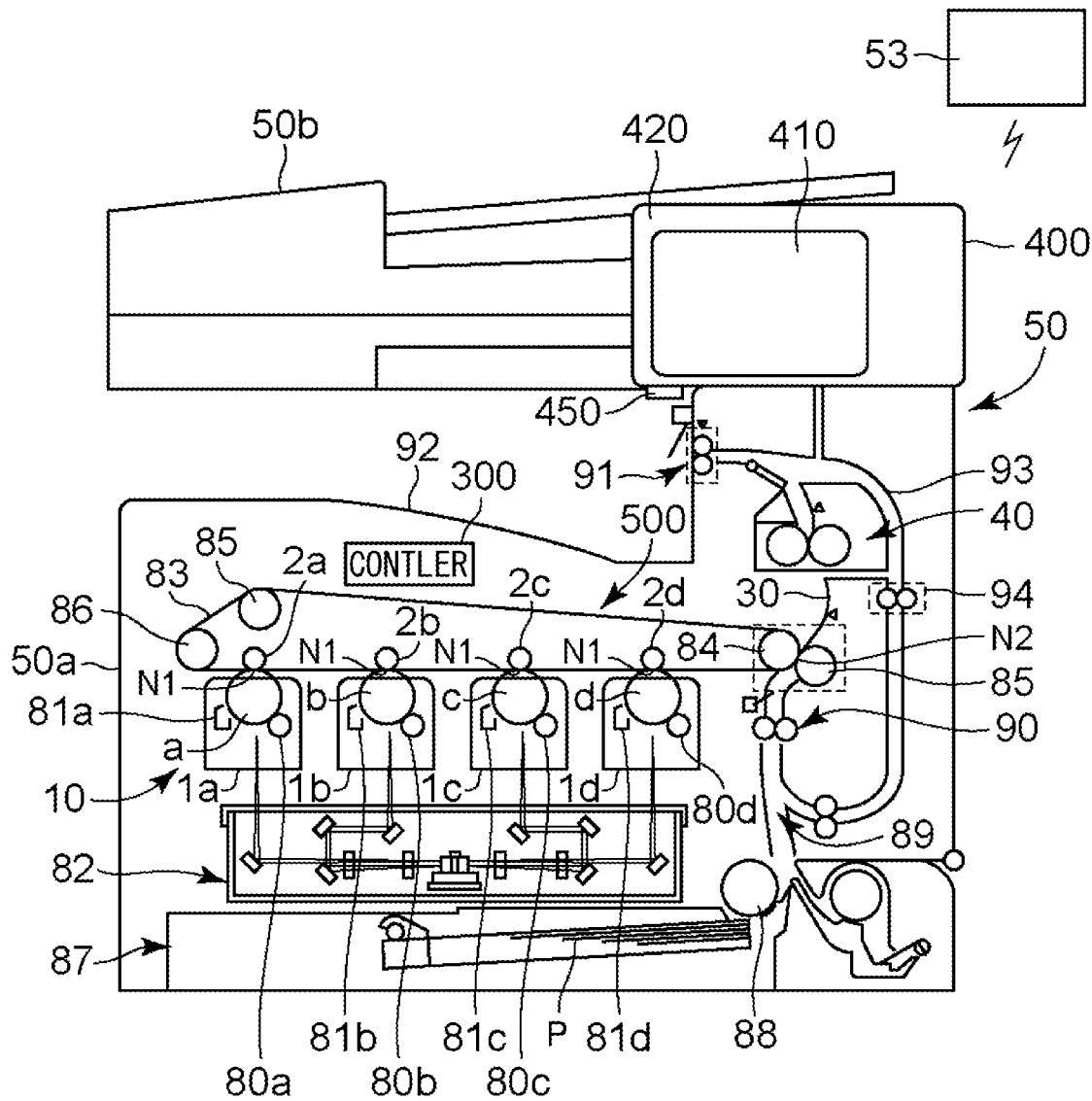
FIG. 1 is a schematic sectional view of an image forming apparatus.
Figure 2:
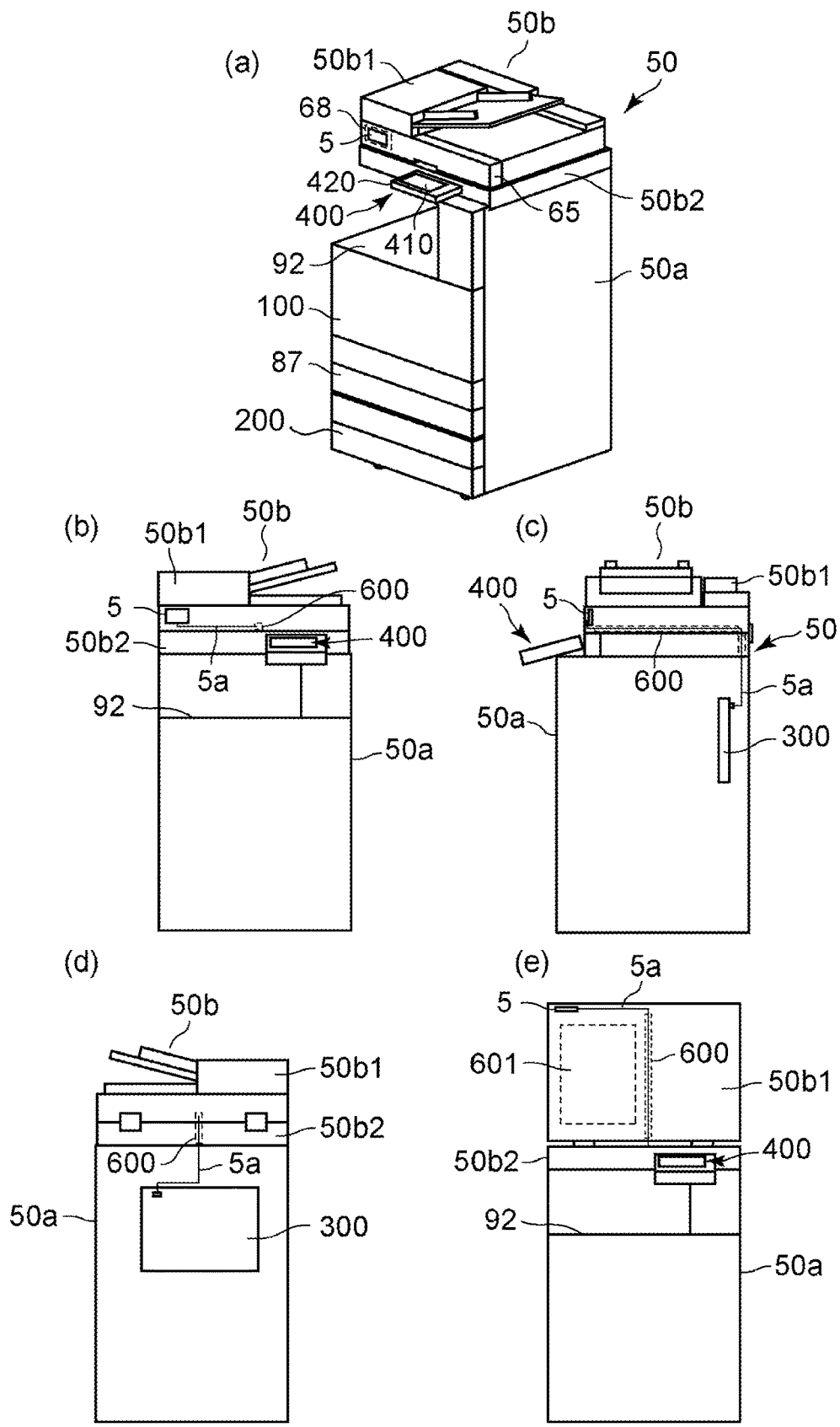
FIG. 2 shows a constitution of an image forming apparatus.

First, an image forming apparatus of the embodiment will be described by using FIGS. 1 and FIG. 2. FIG. 1 is a schematic sectional view of the image forming apparatus 50. FIG. 2 is a view showing a constitution of the image forming apparatus, where part (a) of FIG. 2 is a perspective view of an external appearance, part (b) of FIG. 2 is a front view while a feeding portion 50b1 is in a closed state, part (c) of FIG. 2 is a side view, part (d) is a back view, and part (e) of FIG. 2 is a front view while a feeding portion 50b1 is in an open state.

An image forming apparatus 50 described in FIG. 1 is a tandem type full color printer of an electrophotographic method. The image forming apparatus 50 includes a main assembly 50a which includes an image forming portion 500 as an image forming means, and a reading device 50b which reads an image of an original.

The reading device 50b includes a feeding portion 50b1 which feeds originals stacked on a loading tray one by one, and a reading portion 50b2 which includes the unshown reading unit such as CIS or CCD inside and reads an image of an original fed from the feeding portion 50b1 or an image of an original which is placed on an unshown original table glass by the reading unit. The feeding portion 50b1 is rotatable with respect to the reading portion 50b2 by a hinge mechanism, and is possible to place an original on the unshown original table glass by opening the feeding portion 50b1 with respect to the reading portion 50b2 as shown in part (e) of FIG. 2.

And the image forming apparatus 50 is possible to form an image on a recording material P based on image data sent from the reading device 50b, an external terminal such as a computer, a mobile communication terminal 53 such as a smart phone which is communicating by a wireless communication, etc.

In a case of the embodiment, the image forming apparatus 50 includes the image forming portion 500 as an image forming means for forming an image on the recording material P in the main assembly 50a.

Incidentally, various types of sheet materials, such as a plain paper, a thick paper, a rough paper, an uneven paper, a coated paper, a glossy paper, a photographic paper, a plastic film, a cloth, are used as the recording material P.

Next, we will describe the image forming section 500 in detail. The image forming portion 500 is provided with an image forming portion 10 which is possible to form yellow, magenta, cyan, and black images. The image forming portion 10 includes image forming units 1a, 1b, 1c, and 1d which are arranged along a peripheral direction of an intermediary transfer belt 58. Here, the 1a is a unit which forms an image by yellow color toner, the 1b is a unit which forms an image by magenta color toner, the 1c is a unit which forms an image by cyan color toner, and the 1d is a unit which forms an image by black toner.

The image forming units from 1a to 1d include rotatable photosensitive drums from a to d, charging devices from 80a to 80d, and developing devices from 81a to 81d, respectively. The photosensitive drums from a to d are exposed by laser beams corresponding to an image data which are emitted from a laser scanner 82 after being charged by corresponding charging devices from 80a to 80d.

As a result, electrostatic latent images corresponding to the image data are formed on surfaces of the photosensitive drums a through d. And the electrostatic latent images formed on the photosensitive drums from a to d are developed to toner images by the developing devices from 81a to 81d using each color developers.

Each of toner images formed on the photosensitive drums from a to d is primarily transferred to an intermediary transfer belt 83 in respective primary transfer nip portions N1 by applying primary transfer bias to primary transfer rollers from 2a to 2d which are arranged on an inner periphery side of the intermediary transfer belt 83 opposing to the photosensitive drums from a to d.

The intermediary transfer belt 83 is stretched by a secondary transfer inner roller 84, a secondary transfer outer roller 85, and a stretching roller 86. The secondary transfer outer roller 85 is arranged at a position opposing to the secondary transfer inner roller 84 via the intermediary transfer belt 83 and form a secondary transfer nip portion N2 to secondarily transfer a toner image on the intermediary transfer belt 83 to the recording material P.

A sheet feeding cassette 87 on which the recording material P is stacked is arranged at a bottom of the image forming apparatus 50. The recording material P is fed one by one from the sheet feeding cassette 87 by the feed roller 88 into the feeding passage 89. The recording material P fed from the sheet feeding cassette 87 is fed through the feeding passage 89 to a registration roller pair 90. Although only one sheet feeding cassette 87 is described in FIG. 1, a constitution which includes a plurality of sheet feeding cassettes may be used as shown in part (a) of FIG. 2. Further, a feeding device 200, which is provided separately from the image forming apparatus 50 as an optional device, may be constituted to be mounted to a bottom of the image forming apparatus 50. The paper cassette 87 is an example of a storage section that holds sheets to be fed to the image forming section 500.

The registration roller pair 90 feeds the recording material P to the secondary transfer nip portion N2 in accordance with a timing of forming a toner image on the intermediary transfer belt 83 in each of image forming units from 1a to 1d after stopping a feeding of the recording material P and correcting a skewness of the recording material P.

And by applying a secondary transfer bias to the secondary transfer outer roller 85, the toner image on the intermediary transfer belt 83 is secondarily transferred to the recording material P at the secondary transfer nip portion N2. Subsequently, the recording material P is fed to a fixing device 40. In the fixing device 40, as the recording material P is nipped and fed by a roller pair which form a fixing nip portion, the toner image is fixed to the recording material P by being heated and pressurized.

In a case of forming a toner image on only one side of the recording material P, the recording material P, which is passed through the fixing device 40, is discharged onto a discharge tray 92 by a discharging roller pair 91. In the embodiment, the discharging roller pair 91 discharges a sheet to the discharge tray 92 from a right side to a left side with respect to a right and left direction of the image forming apparatus 50. And, in a case of forming toner images on both sides of the recording material P, the recording material P, which is passed through the fixing device 40, is switched back and fed to a double sided feeding passage 93 by the discharging roller pair 91.

The recording material P, which is sent to the double sided feeding passage 93, is returned to the feeding passage 89 by a feeding roller pair 94, and a toner image is formed on the other side through a same process at a time of forming a toner image on one side. And the recording material P, of which the toner images are fixed on both sides, is discharged onto the discharge tray 92 by the discharging roller pair 91.

Further, as shown in FIG. 1, the image forming apparatus 50 includes an operation portion 400 by which it is possible for a user to input operation instructions. In a case of the embodiment, the operation portion 400 is provided with a display portion 410, which is able to display various screens such as an input screen, for example, including soft keys (not shown) which imitate shapes of actual operation elements, such as a switch, a button, a numeric keypad, etc., and an outer cover 420.

In a case that soft keys are displayed in the display portion 410, various functions, which are assigned to the soft keys in advance, are executed in accordance to touch operations on the soft keys by a user. That is, the display portion 410 is a display panel such as a liquid crystal display or an organic EL display, for example, and a touch panel type display which is provided with a touch panel in which a touch operation by a user is possible, etc.

By a touch operation of the soft keys displayed on the display portion 410, it is possible for a user to input various data related to an image forming, give a start instruction and an end instruction of an image forming operation. Further, the display portion 410 is surrounded by the outer cover 420 so that a display surface is exposed.

The operation portion 400 is provided on a front side of the main assembly 50a where a user is positioned during an operation, as shown in part (a) of FIG. 2. In a case that a side which is provided with the operation panel 400 is a front, a right and left direction when the image forming apparatus 50 is viewed from the front side is a width direction of the image forming apparatus 50, and a direction from the front to the rear is a front and rear direction. Further, an up and down direction is a vertical direction in part (a) of FIG. 2.

As shown in part (a) of FIG. 2, on the front side of the main assembly 50a of the image forming apparatus 50, a front cover 100, which is an outer cover to be opened when accessing the image forming portion 500 for maintenance (replacement of the image forming units from 1a to 1d and an unshown toner accommodating container, etc.) of the image forming portion 500, etc. The front cover 100 is possible to open and close with respect to the main assembly 50a by an unshown hinge mechanism.

Incidentally, the operation panel 400 is provided on the main assembly 50a so that it is possible to adjust an angle or a position in an up and down direction or a right and left direction by a tilt mechanism or a vari angle mechanism, for example. Incidentally, the operation portion 400 may be immobile with respect to the main assembly 50a, as long as it is possible to receive an operation from a user. Further, a constitution, in which the operation portion 400 includes a display portion 410 with a touch panel, is described in the embodiment, however, it may be any other form as long as it is operable by a user, such as one with a display which does not include a touch panel, or one with hard keys which is operable by a user.

The image forming apparatus 50 is provided with a BLE communication unit 5 inside the outer cover 65 which performs a short range wireless communication with a communication terminal 53 by BLE (Bluetooth Low Energy). The BLE communication unit 5 is provided in a form of a board module which is constituted on a printed circuit board.

The outer cover 65 is arranged above the discharge tray 92 in a vertical direction, and a cover member which constitutes an outer appearance on a front side of the feeding portion 50b1 of the reading device 50b. Further, the outer cover 65 is arranged above the discharging roller pair 91 in a vertical direction of the image forming apparatus 50 and constitutes an outer appearance of the image forming apparatus on a front side of the feeding portion 50b1 of the reading device 50b. Further, the outer cover 65 constitutes the outer appearance of the image forming apparatus 50 above the operation portion 400 in a vertical direction of the image forming apparatus 50.

In a case of the embodiment, the BLE communication unit 5 communicates according to IEEE 802.15 standard (what has been referred to as Bluetooth (registered trademark)). Specifically, it uses a low power consumption BLE (Bluetooth Low Energy) which is a part of Bluetooth standard, and performs wireless communication by using an ISM (Industrial, Scientific and Medical) band of a 2.4 GHz band. Incidentally, in the embodiment, the BLE communication unit 5 supports a BLE communication method of a Bluetooth 5.1, and supports a function of detecting a direction of the communication terminal 53 by the BLE communication.

Further, in the embodiment, the BLE communication unit 5 is arranged on a front side of the reading device 50b of the image forming apparatus 50 and on the feeding portion 50b1 which is above the discharge 92, and is covered by the outer cover 65. Incidentally, the front side of the reading device 50b is a position on a front side of the unshown reading unit, which is accommodated inside the reading portion 50b2, and is a position on a front side of a support frame, which is a metal frame of the reading device 50b. Further, the front side of the reading device 50b is a position on a front side of support frames which support each configuration of the feeding portion 50b1 of the reading device 50b.

Further, the BLE communication unit 5 in the embodiment is provided in a position where it does not overlap with the operation portion 400 when the image forming apparatus 50 is viewed from the front side, even in a case that the operation portion 400 is rotated with respect to the main assembly 50a.

In many cases, a user who carries the communication terminal 53 comes close to a front side of the image forming apparatus 50 to operate the operation portion 400 of the image forming apparatus 50. For details, it will be described below, however, in order to detect a direction by BLE communication of Bluetooth 5.1, it is necessary to send and receive a direct wave of a wireless radio wave which reaches in a straight line between the image forming apparatus 50 and the communication terminal 53 which is carried by the user.

In the embodiment, by arranging the BLE communication unit 5 on a front side of the main assembly 50a of the image forming apparatus 50, it is possible to send and receive the direct waves of the wireless radio wave with a sufficient radio wave strength without being affected by shielding of the radio wave by the main assembly of the image forming equipment 50, etc., in BLE communication with the communication terminal 53 which is carried by the user. For example, in a case that the BLE communication unit 5 is arranged on a rear side of the image forming apparatus 50, it may not be possible to obtain a sufficient radio wave strength since the radio wave is shielded by a unit inside the image forming apparatus 50 or the reading device 50b. However, in the embodiment, by arranging the BLE communication unit 5 on a front side of the main assembly 50a of the image forming apparatus 50, it is possible to suppress the radio wave from being shielded by the image forming apparatus 50 itself.

Further, by providing the BLE communication unit 5 in a vicinity of the operation panel 400 in a vertical direction, it is possible to detect a user carrying the communication terminal 53 more accurately who approaches the image forming apparatus 50 to operate the operation unit 400.

Further, the BLE communication unit 5 is arranged in the feeding portion 50b1 which is in a vicinity of the operation unit 400 and above an upside of the operation unit 400 in a vertical direction, that is at a relatively high position in the image forming apparatus 50. Here, the relatively high position with respect to the image forming apparatus 50 means a position above the discharge tray 92 and above the main assembly 50a in the vertical direction. Here, the position above the discharge tray is a position vertically above all of sheet loading surfaces of the discharge tray 92. Further, the relatively high position with respect to the imaging forming apparatus 50 is a position above the discharging roller pair 91 in a vertical direction. In this way, by arranging the BLE communication unit 5 at the relatively high position in the main assembly 50a, it is possible to send and receive the direct wave of the wireless radio wave with sufficient radio wave strength, avoiding an influence of obstacles which exist between the image forming apparatus 50 and the communication terminal 53. Incidentally, details of each constitution and arrangement of the BLE communication unit 5 will be described below.

As shown in FIG. 1, the image forming apparatus 50 is provided with a control portion 300 which controls an operation of the image forming portion 500. In the embodiment, the BLE communication unit 5 is arranged on a front side of the reading device 50b as shown in parts (a) and (b) of FIG. 2, while the control portion 300 is arranged on a rear side of the main assembly 50a as shown in parts (c) and (d) of FIG. 2.

Thus, the BLE communication unit 5 and the control portion 300 are electrically connected by a cable 5. Since the cable 5a is passed through a cable guide 600, which is provided with the main assembly 50a, is wired from a front surface to a rear surface in the main assembly 50a, it is easy to wire in the main assembly 50a and is designed to enhance workability when the image forming apparatus 50 is assembled or maintained.

As shown in part (e) of FIG. 2, a cable guide 600 is arranged to avoid an area 601 through an inside of the feeding portion 50b1. This is because, in the feeding portion 50b1, each mechanism such as rollers for separating, feeding, and discharging documents is arranged in the area 601, and the cable guide 600 is arranged to avoid this. Since the cable 5a passes through the cable guide 600 and is arranged from a front side of the feeding portion 50b1 to a rear side of the main assembly 50a, an operability is improved in a case of assembling or maintaining the image forming apparatus 50.

Figure 3:
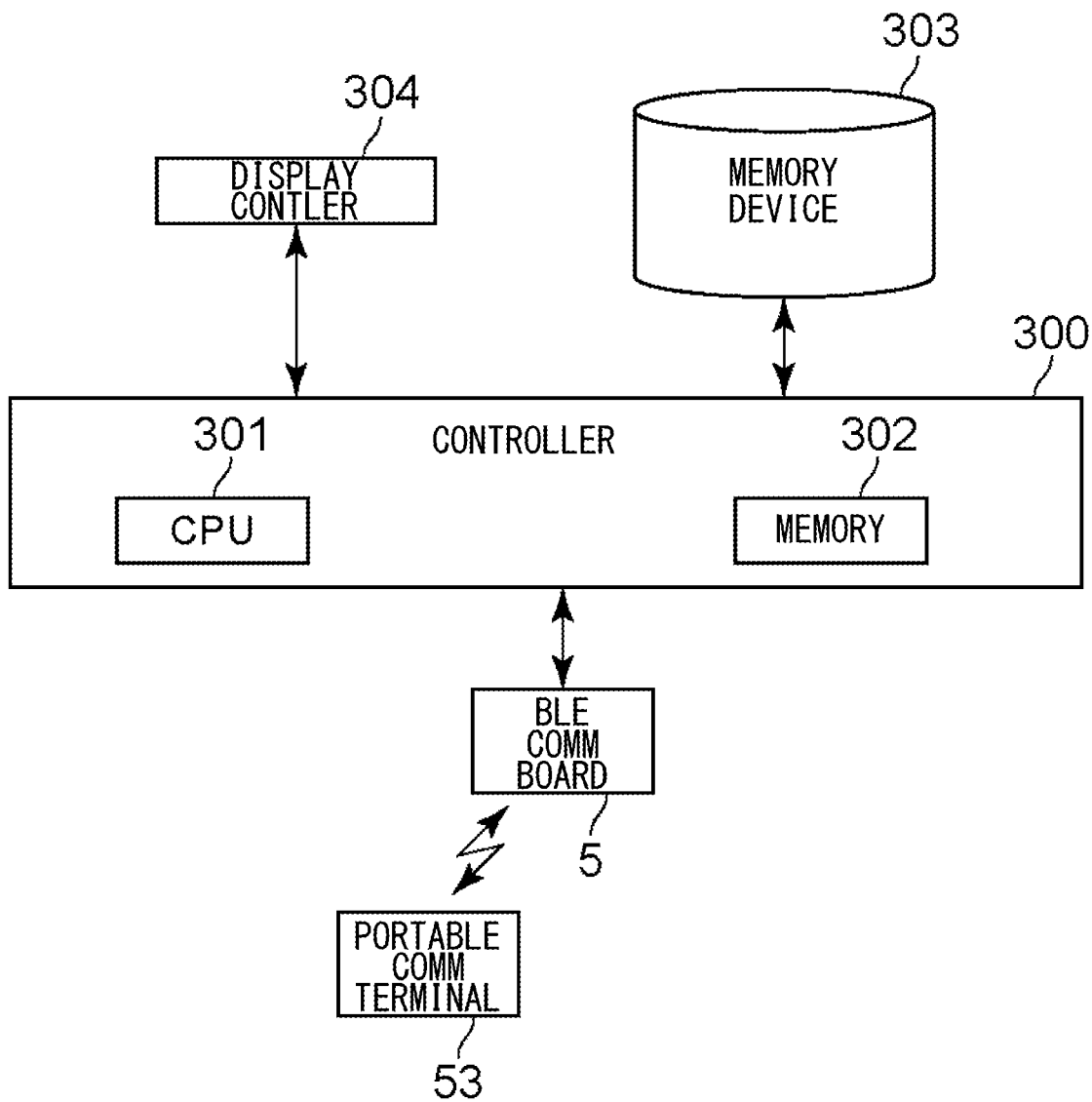
FIG. 3 is a block diagram illustrating a control portion.

The control portion 300 will be described using FIG. 3 with reference to FIG. 1. However, the control portion 300 is connected to various devices other than those shown in the figures, such as each of portions which constitute the image forming portion 500 including the image forming portion 10 and drive sources (motor, power source, etc.) for operating each of the portions.

The control portion 300 as a control means controls various operations of the image forming portion 500 such as data communication and image formation, and includes, for example, a CPU 301 (Central Processing Unit) and a memory 302. The memory 302 is constituted of a ROM (Read Only Memory) and RAM (Random Access Memory), etc.

The memory 302 stores various programs for controlling the image forming apparatus 50 and various data such as connection setting data and authentication data for communication between the image forming apparatus 50 and the communication terminal 53. Here, the memory 302 is an example of a storage means for storing various data such as an ID list of authenticatable users.

The CPU 301 is capable of executing various programs such as "communication control processing (program)" and "image forming job processing (program)" (not shown), for example, which are stored in the memory 302, and controls an operation of the image forming apparatus 50 by executing the various programs.

Incidentally, the memory 302 is also capable of temporarily storing results of arithmetic processing which are accompanied by executions of various programs, terminal information and image data which are received from the communication terminal 53, etc.

The control portion 300 is connected to a memory device 303, a display control portion 304, the BLE communication unit 5, etc. via an input and output interface. The memory device 303 is capable of storing various programs, various data, etc. as well as the memory 302, and is capable of sending and receiving various programs, various data, etc. between the memory device 303 and the memory 302.

The display control portion 304 performs various controls related to the display portion 410 such as displaying various screens, soft keys, etc. on the display portion 410.

The BLE communication unit 5 performs wireless communication according to BLE with the communication terminal 53, and controls data input and output between the communication terminal 53 and the control portion 300.

Examples of the communication terminals 53 are a smart phone, a tablet, or a laptop computer, or a digital camera. The communication terminal 53 includes a BLE communication board (not shown) and is capable of performing wireless communication with the BLE communication unit 5 which is arranged in the image forming apparatus 50. Here, in a case that the communication terminal 53 includes a communication mode by BLE, it is a device which is capable of performing a wireless communication by BLE with other devices having a BLE communication board by setting its mode to ON. Incidentally, the device may be capable of performing a wireless communication by BLE without switching the communication mode.

Figure 4:
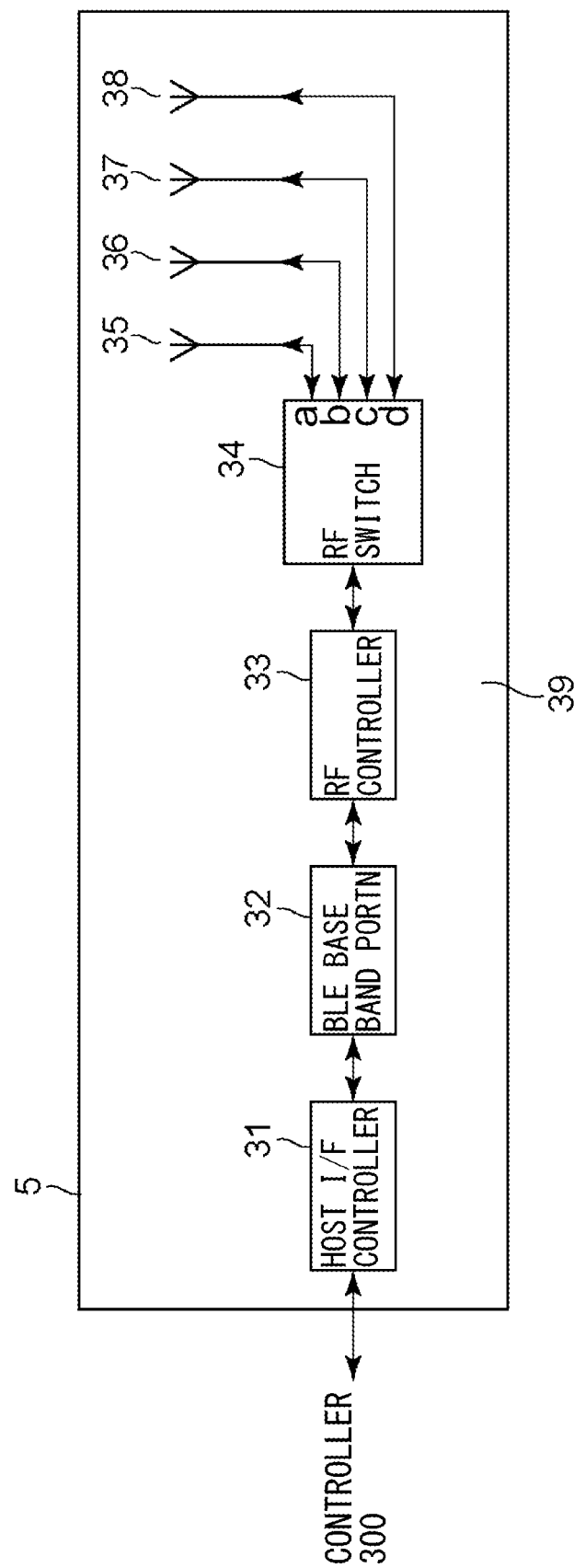
FIG. 4 is a block diagram showing a BLE communication board.

A constitution of the BLE communication unit 5 described above will be described with reference to FIG. 4 and FIG. 5. As shown in FIG. 4, in the BLE communication unit 5, a host OF control portion 31, a BLE baseband portion 32, a RF control portion 33, a RF switch 34, a BLE antenna 35, a BLE antenna 36, a BLE antenna 37, and a BLE antenna 38 are arranged on a common board 39.

Incidentally, the host OF control portion 31, the BLE baseband portion 32, the RF control portion 33, and the RF switch 34 are formed as a single IC chip in which each function is integrated.

The host I/F control portion 31 performs input and output of data with the control portion 300 (see FIG. 3) via a wired interface. An example of the interface is one which is possible to connect to the cable 5a (see part (b) of FIG. 2) corresponding to a serial communication system such as a "USB (Universal Serial Bus)".

The BLE baseband portion 32 performs a baseband signal processing in order to perform a digital signal processing by BLE communication.

The RF control portion 33 performs a modulation and a demodulation of a radio wave for RF (Radio Frequency) communication in a case of performing BLE communication with the communication terminal 53.

The RF switch 34 performs a switching control to connect to the RF control portion 33 by switching each of the BLE antennas which are the BLE antenna 36, the BLE antenna 37, and the BLE antenna 38. Here, a switch for switching the RF switch 34 includes four contacts which are a contact a, a contact b, a contact c, and a contact d.

The BLE antenna 35 is an antenna which is formed for a wireless communication with the communication terminal 53. Incidentally, the BLE antenna 35 is a pattern antenna which is wired on the board 39 of the BLE communication unit 5, and its antenna characteristic is adjusted to perform the BLE communication on the 2.4 GHz band.

The BLE antenna 36, the BLE antenna 37, and the BLE antenna 38 are antennas formed in a same way as the BLE antenna 35. The BLE antenna 36, the BLE antenna 37, and the BLE antenna 38 are adjusted to obtain antenna characteristics which are equivalent to the BLE antenna 35, and these four BLE antennas with equivalent characteristics are uniformly arranged on the board 39.

The BLE antenna 35 is connected to the contact a of the RF switch 34, and similarly, the BLE antenna 36, the BLE antenna 37, the BLE antenna 38 are connected to the contact b, the contact c, and the contact d of the RF switch 34, respectively.

That is, it is possible to switch which BLE antenna of the four BLE antennas of the BLE antenna 35, the BLE antenna 36, the BLE antenna 37, and the BLE antenna 38, is connected to the RF control portion 33 by the RF switch 34.

Figure 5:
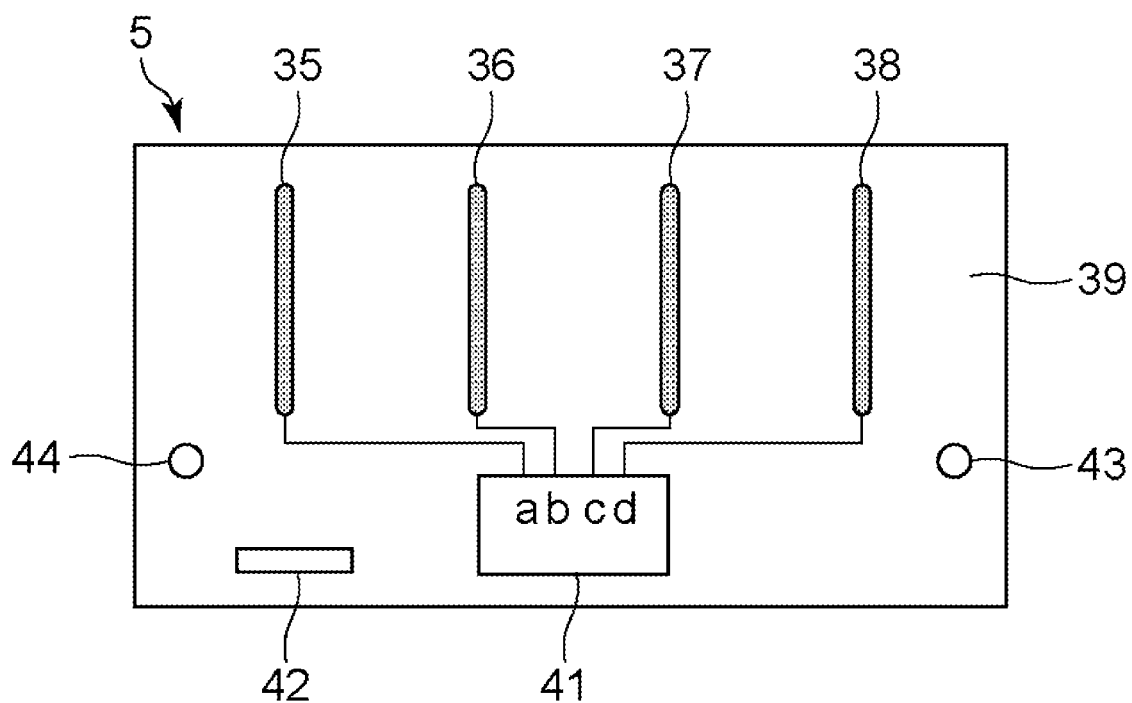
FIG. 5 is a schematic view showing a BLE communication board.

FIG. 5 shows a physical form of the BLE communication unit 5. On the board 39 of the BLE communication unit 5, the BLE antenna 35, the BLE antenna 36, the BLE antenna 37, and the BLE antenna 38 are formed so as to be arranged side by side in a plane of the board by a pattern wiring.

An IC chip 41 includes a BLE communication function, and as described above, realizes each of functions of the host I/F control portion 31, the BLE baseband portion 32, the RF control portion 33, and the RF switch 34 (see FIG. 4).

The BLE antenna 35, the BLE antenna 36, the BLE antenna 37, and the BLE antenna 38 are connected to the IC chip 41, and are electrically connected to the contact a, the contact b, the contact c, and the contact d of the RF switch 34, respectively, as described above.

Further, on the board 39 of the BLE communication unit 5, a connector 42, which is possible to connect to the cable 5a (see part (b) of FIG. 2) to make an interface connection with the control portion 300, is provided. Further, a screw hole 43 is provided on the board 39 of the BLE communication unit 5. The screw hole 43 is conducted to ground of an electric circuit on the board 39.

In general, it is possible to perform maximum antenna characteristics by obtaining electrically stable ground, for a wireless communication board which uses a radio wave in high frequency bands such as BLE. Consequently, in the embodiment, the board 39 is constituted to be grounded by screwing through the screw hole 43 to a metal plate 61 (will be described below) which constitutes a part of a main frame which constitutes a support frame which supports each unit of the image forming apparatus 50 which is an electrically stable ground. Further, a through hole 44 is provided on the board 39 of the BLE communication unit 5. The through hole 44 is provided in order to determine a position of the BLE communication unit 5 and fix it.

As described above using FIG. 4 and FIG. 5, in the embodiment, the BLE communication unit 5 are provided and arranged with the four antennas of the BLE antenna 35, the BLE antenna 36, the BLE antenna 37, and the BLE antenna 38. This is for a direction detection according to Bluetooth standard.

Figure 6:
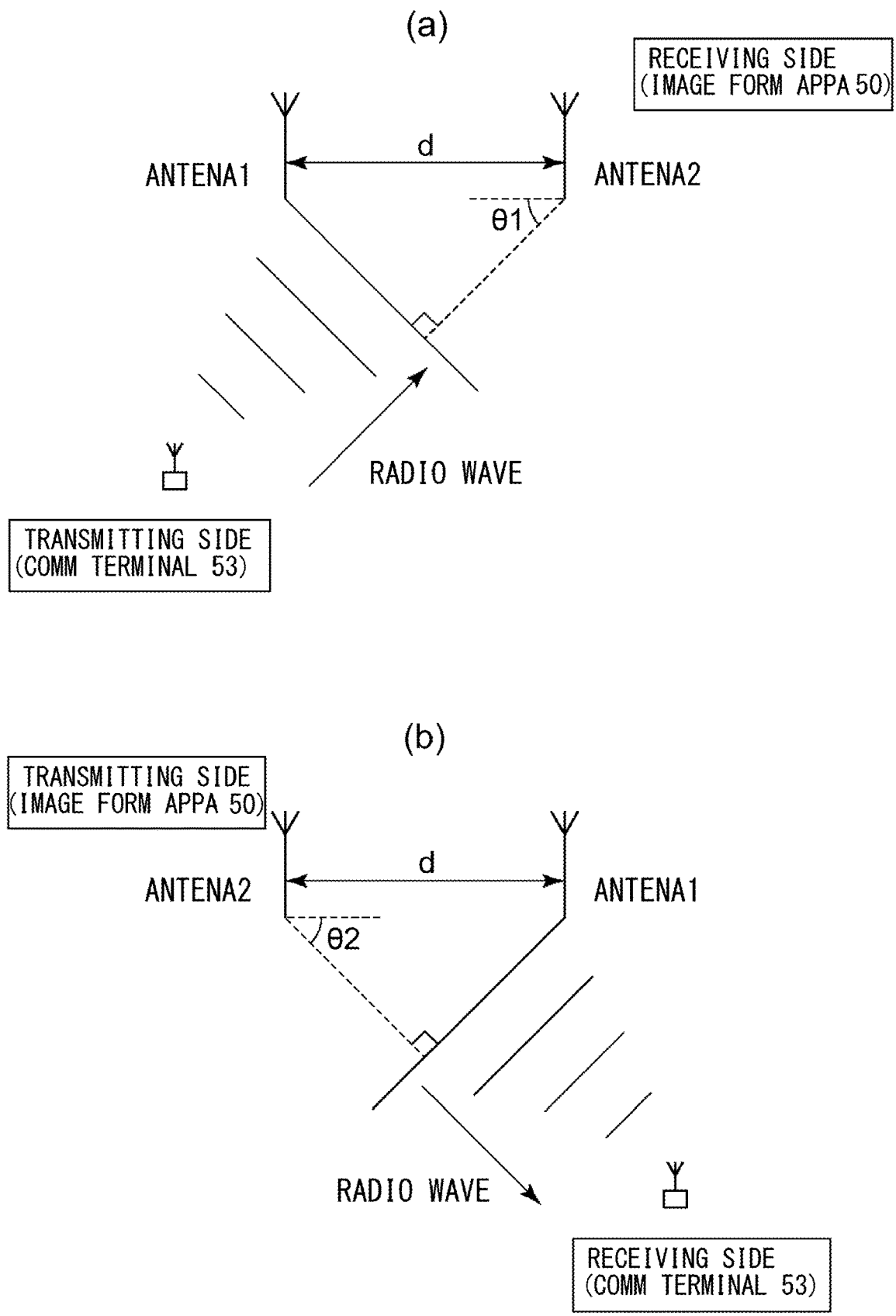
FIG. 6 is a view illustrating a direction detection by BLE.

Then, by using FIG. 6, an overview of a direction detection method by using a plurality of antennas in Bluetooth standard. Part (a) of FIG. 6 is a method, in which a wireless radio wave of the BLE communication is sent out from a transmitting side with a single antenna, the wireless radio wave is received at a receiving side with a plurality of antennas, and the direction is detected.

As described above, in the embodiment, the BLE communication unit 5 of the image forming apparatus 50 is provided and arranged with a plurality of antennas, and in this method, the transmitting side corresponds to the communication terminal 53 and the receiving side corresponds to the image forming apparatus 50.

In part (a) of FIG. 6, the wireless radio wave of the BLE communication which is sent out from the single antenna on the transmitting side reaches the receiving side. On the receiving side, by targeting two antennas of an antenna 1 and an antenna 2, a distance until the wireless radio wave sent out from the transmitting side reaches the antenna 1 is different from a distance until it reaches the antenna 2. Thus, a phase difference is occurred between the wireless radio wave arriving at the antenna 1 and the wireless radio wave arriving at the antenna 2.

Here, a distance between the antenna 1 and the antenna 2 is defined as d, an arrival angle of the wireless radio wave which arrives at the antenna 1 and the antenna 2 is defined as θ1, and a wavelength of the wireless radio wave is defined as λ.

When the phase difference described above is defined as ψ in this case, a following relationship is established $$\psi=(2\pi d^{*}\cos(\theta 1))/\lambda$$

Thus, the arrival angle of the radio wave is as described below.

$$\theta 1=\arccos((\psi\lambda)/(2\pi d))$$

That is, according to the above, it is possible to determine the arrival angle of the radio wave which is arrived at the receiving side by using two antennas of the antenna 1 and the antenna 2 in the receiving side. In this way, it is possible to detect the arrival direction of the radio wave. Incidentally, according to the above, since the wireless radio wave arriving at the antenna 1 and the antenna 2 is used to determine the phase difference, it is necessary that the antenna 1 and the antenna 2 are provided with equivalent radio wave characteristics.

Further, it is necessary that the radio wave received by the antenna 1 and the antenna 2 is a direct wave which is sent out from the transmitting side and arrived at the receiving side in a straight line along a same propagation route. In the embodiment, four antennas of the BLE antenna 35, the BLE antenna 36, the BLE antenna 37, and the BLE antenna 38, are arranged with the BLE communication unit 5 of the image forming apparatus 50 in the receiving side.

As described above in FIG. 4, the BLE antenna 35, the BLE antenna 36, the BLE antenna 37, and the BLE antenna 38 possess equivalent radio wave characteristics. While these BLE antennas are switched by the RF switch 34, the arrival angle of the wireless radio wave is calculated by the wireless radio wave which is received by targeting the two BLE antennas, as described above.

Thus, it is possible for the image forming apparatus 50 to detect a direction toward the communication terminal 53 as an arrival angle θ1 (arrival direction) of the wireless radio wave by the BLE communication unit 5.

Part (b) of FIG. 6 shows a method in which a transmitting side with a plurality of antennas send out the wireless radio wave of the BLE communication and a receiving side with a single antenna receives it and detects the direction.

As described above, in the embodiment, the BLE communication unit 5 of the image forming apparatus 50 is provided and arranged with a plurality of antennas, and in this method, the receiving side corresponds to the communication terminal 53 and the transmitting side corresponds to the image forming apparatus 50.

In part (b) of FIG. 6, the wireless radio wave of the BLE communication which is sent out from the antenna of the transmitting side reaches the receiving side. Here, on the transmitting side, the antenna 1 and the antenna 2 are switched sequentially and send out the wireless radio wave sequentially.

Thus, by targeting two antennas of the antenna 1 and the antenna 2, a distance until the wireless radio wave sent out from the antenna 1 of the transmitting side reaches the receiving side is different from a distance until the wireless radio wave sent out from the antenna 2 of the transmitting side reaches the receiving side. Thus, a phase difference is occurred between the wireless radio wave in which the receiving side receives from the antenna 1 and the wireless radio wave in which the receiving side receives from the antenna 2.

Here, the distance between the antenna 1 and the antenna 2 is defined as d, a sending angle of the wireless radio wave which sends out from the antenna 1 and the antenna 2 is defined as θ2, and the wavelength of the wireless radio wave is defined as λ. When the phase difference described above is defined as ψ in this case, a following relationship is established.

$$\psi=(2\pi d^{*}\cos(\theta 2)/\lambda$$

Thus, the sending angle of the radio wave is as described below.

$$\theta 2=\arccos((\psi\lambda)/(2\pi d))$$

That is, according to the above, it is possible to determine the sending angle of the wireless radio wave of the transmitting side by using two antennas of the antenna 1 and the antenna 2 in the transmitting side and receiving it at the single antenna in the receiving side.

Incidentally, according to the above, since the wireless radio wave which is sent out from the antenna 1 and the antenna 2 is used to determine the phase difference, it is necessary that the antenna 1 and the antenna 2 are provided with equivalent radio wave characteristics. Further, it is necessary that the radio wave is sent out from the antenna 1 and the antenna 2 and is a direct wave which arrives at the single antenna in the receiving side in a straight line along a same propagation route.

In the embodiment, the four antennas of the BLE antenna 35, the BLE antenna 36, the BLE antenna 37, and the BLE antenna 38, are arranged with the BLE communication unit 5 of the image forming apparatus 50 in the transmitting side. As described above, the BLE antenna 35, the BLE antenna 36, the BLE antenna 37, and the BLE antenna 38 possess equivalent radio wave characteristics. While these BLE antennas are switched by the RF switch 34, they send out the wireless radio wave.

On the other hand, the communication terminal 53 of the receiving side receives this and calculates the sending angle of the wireless radio wave by targeting a wireless radio wave signal which is sent out from the two BLE antennas. Thus, in order to calculate the sending angle of the radio wave described above, it is necessary for the communication terminal 53 to obtain the distance d between the antenna 1 and the antenna 2 in the transmitting side and the wavelength λ of the wireless radio wave from the image forming apparatus 50 of the transmitting side in advance.

In the embodiment, information of the distance d and the wavelength is transmitted, in advance, from the image forming apparatus 50 to the communication terminal 53 by BLE communication. Further, the sending angle of the wireless radio wave calculated by the communication terminal 53 is transmitted to the image forming apparatus 50 by BLE communication after the calculation.

Thus, it is possible for the image forming apparatus 50 to detect the direction toward the terminal device 53 as the sending angle θ2 (arrival direction) of the wireless radio wave. In this way, by a method shown in FIG. 6, the image forming apparatus 50 is able to detect the arrival direction of the radio wave by the BLE communication unit 5, so it is possible to recognize a position of a user who carries the communication terminal 53 in coordinates.

In the embodiment, as described above in part (a) of FIG. 2, the BLE communication unit 5 is arranged on a front portion of the image forming apparatus 50 and in the feeding portion 50b1 which is above the main assembly 50a in a vertical direction.

Figure 7:
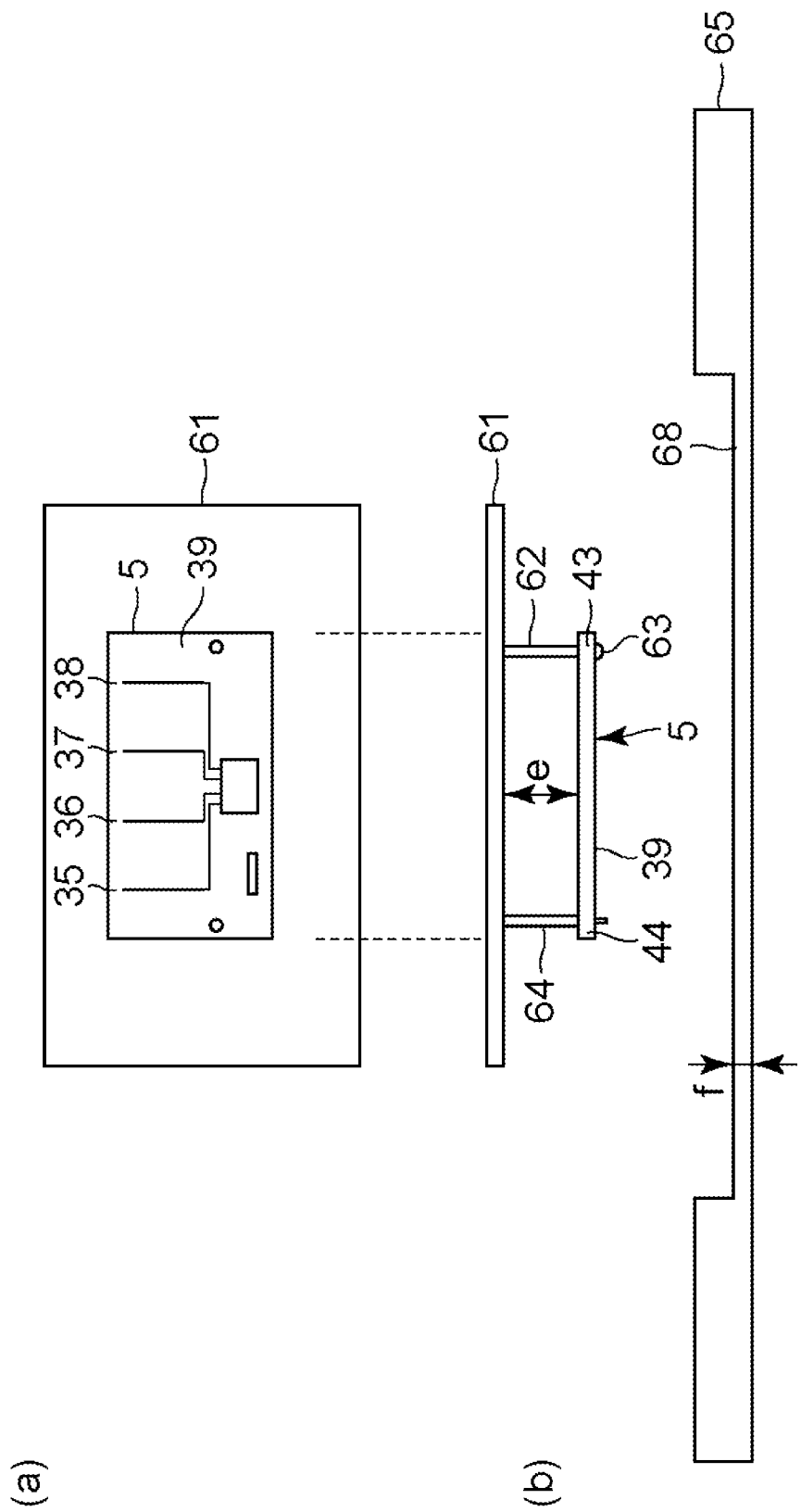
FIG. 7 is a view illustrating an arrangement of a BLE communication unit.

Here, a method of fixing and arranging of the BLE communication unit 5 in the feeding portion 50b1 of the reading device 50b will be described by using FIG. 7. Part (a) of FIG. 7 is a view of the BLE communication unit 5, which is fixed to the feeding portion 50b1 of the reading device 50b, from a front side of the image forming apparatus 50 (side on which the operation portion 400 is arranged) and a view of the BLE communication unit 5 from a thickness direction of the board. Thus, a transverse direction in part (a) of FIG. 7 is a horizontal direction in which the image forming apparatus 50 is installed. Further, part (b) of FIG. 7 is a view of it from a top of the image forming apparatus 50.

The metal plate 61 is a part of a frame plate which constitutes the support frame of the reading device 50b as described above, and a part of the frame plate which constitutes the support frame of the feeding portion 50b1. Here, the metal plate 61 may be a plate which is integrally constituted with a plate which supports each unit of the feeding portion 50b1, or it may be a plate which is constituted of a separate body.

The metal plate 61 serves as a frame ground for an electric circuit in the reading device 50b, and is grounded via a ground wire, etc.

A metal spacer 62 is constituted of a metal member which is formed of metal, is a spacer for fixing the BLE communication unit 5 to the metal plate 61 and is fixed to the metal plate 61.

A resin spacer 64 is constituted of a resin member which is formed of plastic resin, is a spacer for fixing the BLE communication unit 5 to the metal plate 61 and is fixed to the metal plate 61.

A screw 63 is a metal screw for fixing the BLE communication unit 5 to the metal spacer 62, and fixes the BLE communication unit 5 by passing through the screw hole which is provided with the BLE communication unit 5 and being tighten by a tap which is formed in the metal spacer 62. As described above, the screw hole 43 which is provided with the BLE communication unit 5 is grounded to an electric circuit of the BLE communication unit 5.

Thus, ground of the electric circuit of the BLE communication unit 5 is connected to the metal plate 61 through the metal spacer 62 and the screw 63, that is, it is connected to the frame ground of the electric circuit of the reading device 50b.

The resin spacer 64 is formed so that its tip portion penetrates the through hole 44 of the BLE communication unit 5. Thus, the resin spacer 64 prevents the BLE communication unit 5 from rotating around the metal spacer 62, when the BLE communication unit 5 is fixed to the metal plate 61.

The outer cover 65 is an outer part which covers an outer surface of the reading device 50b and an outer surface of the feeding device 50b, and is formed by plastic resin. The outer cover 65 is arranged to cover a front of the BLE communication unit 5 opposing the feeding portion 50b1. Thus, the BLE antenna 35, the BLE antenna 36, the BLE antenna 37, and the BLE antenna 38 of the BLE communication unit 5 are covered by the outer cover 65. Here, the outer cover 65 is an example of a cover member which covers the BLE communication unit 5 which is fixed to the metal plate 61.

As described above in part (a) of FIG. 7, the BLE communication unit 5 is fixed to the metal plate 61 via the metal spacer 62 and the resin spacer 64. In this case, the respective antennas of the BLE antenna 35, the BLE antenna 36, the BLE antenna 37, and the BLE antenna 38 of the BLE communication unit 5 are arranged and fixed to the metal plate 61 so that they are arrayed in a horizontal direction on an installation surface of the image forming apparatus 5. Here, the metal spacer 62 is an example of a first support member, and the resin spacer 64 is an example of a second support member.

This is, as described above using part (a) of FIG. 6 and part (b) of FIG. 6, due to detect the arrival angle and the sending angle of the wireless radio wave by using two of the antennas when performing a direction detection between the image forming apparatus 50 and the communication terminal 53.

That is, in a case of performing a direction detection between the image forming apparatus 50 and the communication terminal 53 which is present on a horizontal plane of an installation of the image forming apparatus 50, it is possible to detect in all directions efficiently by arraying the respective BLE antennas in a horizontal direction.

Incidentally, as shown in part (b) of FIG. 7, the BLE communication unit 5 is fixed to the metal plate 61 by the metal spacer 62 and the resin spacer 64 with the distance e, so that it is parallel to the metal plate 61. At this time, the BLE communication unit 5 is fixed to the metal plate 61 so that distances between each of the BLE antennas from 35 to 38 and the metal plate 61 are equally spaced.

This is due to maintain a uniform distance between each of the BLE antennas from 35 to 38 which are formed on the BLE communication unit 5 and the metal plate 61, and prevent the metal plate 61 from causing differences in the antenna characteristics of the BLE antennas from 35 to 38.

In this way, it is possible to send and receive the wireless radio wave under a same characteristic conditions of the respective antennas, and it is possible to correctly detect a phase difference of the wireless radio waves between antennas in the direction detection by the wireless radio wave described above, and to accurately calculate a direction in which the communication terminal 53 as a communication target is located.

FIG. 8 is a view showing the outer cover 65. As shown in part (a) of FIG. 2, the outer cover 65 is an outer part which is mounted on a front side in the feeding portion 50b1 and covers the BLE communication unit 5. Further, the outer cover 65 is an outer part which is mounted on a front of the reading device 50b which is located above the main assembly 50a, and fixed to the support frame of the feeding portion 50b1 of the reading device 50b by unshown screws, etc.

Part (a) of FIG. 8(a) is a perspective view of the outer cover 65 viewed from an inner surface 65a side. Part (b) of FIG. 8 is a plan view showing a detailed constitution of the inner surface 65a of the outer cover 65. Here, in the outer cover 65, a surface, which is inside the image forming apparatus 50 and faces toward an inside of the reading device 50b while the outer cover 65 is mounted on the reading device 50b, is defined as the inner surface 65a. Further, in the outer cover 65, a surface, which is inside the imaging forming apparatus 50 and opposes the support frame (the metal plate 61 and the BLE communication unit 5) while the outer cover 65 is mounted on the reading device 50b, is defined as the inner surface 65a. And, in the outer cover 65, a surface which forms an outer appearance of the image forming apparatus 50 is defined as the outer surface 65b.

Here, the outer cover 65 is molded from resin. In general, in a cover member, which is formed using a resin material, ribs, bosses, etc. are formed on the inner surface 65a in order to ensure a strength.

In the outer cover 65 of the embodiment, as shown in part (b) of FIG. 8, a plurality of ribs 66 as reinforcing ribs and a plurality of bosses 67 are formed on the inner surface 65a. In this way, the cover itself is prevented from being deformed by reinforcing it with the ribs 66 and the bosses 67. Incidentally, in the embodiment, a constitution, which includes both ribs 66 and bosses 67, is shown, however, the outer cover 65 may be reinforced by either ones.

However, even on the inner surface 65a of the outer cover 65, an area 68 includes a uniform surface where ribs 66 and bosses 67 are not formed. That is, since the ribs 66 and the bosses 67 are provided in an area other than the area 68, a constitution of the area 68 is less unevenness compared to other area on the inner surface 65a of the outer cover 65.

In part (a) of FIG. 2, the area 68 is arranged at a position to cover an area where the BLE communication unit 5 is arranged when the outer cover 65 is mounted on the reading device 50b. That is, the area 68 is an area which opposes the BLE communication unit 5 on the inner surface 65a of the outer cover 65, and an area which opposes the BLE antennas from 35 to 38.

Further, as shown in part (b) of FIG. 7, the area 68 of the outer cover 65 which covers the BLE communication unit 5 is molded so that a thickness f of a molding material is uniform.

That is, no ribs and bosses are existed in a portion of the area 68 of the outer cover 65 which covers the BLE antenna 35, the BLE antenna 36, the BLE antenna 37, and the BLE antenna 38 of the BLE communication unit 5, and the portion of the area 68 is made by molding resin so that the thickness f is uniform.

This is due to maintain uniform radio wave characteristics of a member which is arranged in front of the BLE antenna 35, the BLE antenna 36, the BLE antenna 37, and the BLE antenna 38 of the BLE communication unit 5.

That is, this is due to avoid causing a difference in characteristics of the wireless radio waves which are passed through the outer cover 65 and are sent and received by the BLE antenna 35, the BLE antenna 36, the BLE antenna 37, and the BLE antenna 38, so that it is possible to send and receive the wireless radio waves under same characteristic conditions for the respective antennas.

In this way, it is possible to correctly detect a phase difference of the wireless radio waves between the antennas and to accurately calculate a direction in which the communication terminal 53 is positioned, in the direction detection of the communication terminal 53 by using the wireless radio waves, In the embodiment described above, the BLE communication unit 5 is constituted that the BLE antenna 35, the BLE antenna 36, the BLE antenna 37, and the BLE antenna 38 are pattern antennas which are formed by board patterns on the board 39 of the BLE communication unit 5. However, a main purpose of the embodiment is to arrange the BLE communication unit 5 which includes a plurality of antennas in a position on a front side of the image forming apparatus 50.

Thus, these antennas may be arranged by mounting antenna parts with equivalent characteristics (generally known chip antenna) on the board 39. Further, these antennas are not necessarily arranged on the board 39, and the plurality of antennas may be fixed and arranged by providing terminal connectors at antenna terminals a, b, c, and d of the IC chip 41, and connecting to external antennas with coaxial cables, etc.

Further, in the embodiment, the four antennas of the BLE antenna 35, the BLE antenna 36, the BLE antenna 37, and the BLE antenna 38 are provided.

However, as shown in FIG. 6, when two or more antennas are provided, it is possible to detect a direction by switching them, and a number of antennas may be changed as appropriate, as long as two or more, depending on a required accuracy of a direction detection, a required detection speed, etc.

Based on the description so far, a method, how to identify a user's movement locus by detecting a direction between the image forming apparatus 50 and the communication terminal 53, will be described below.

Incidentally, in the description above, a direction detection method in which the communication terminal 53 is the transmitting side and the image forming apparatus 50 is the receiving side was described by part (a) of FIG. 6, and a direction detection method in which the communication terminal 53 is the receiving side and the image forming apparatus 50 is the transmitting side was described by part (b) of FIG. 6.

Regardless of which of these methods is used, the imaging forming apparatus 50 is able to detect a direction of the communication terminal 53 by using the BLE communication unit 5, as described above.

Thus, in a description below, the image forming apparatus 50 shall use one of the methods described above to perform a direction detection of the mobile communication terminal 53.

Part (a) of FIG. 9 shows an example when a user who carries a communication terminal 53 is moving near a front of the image forming apparatus 50. In the description below, a distance between the imaging forming apparatus 50 and the communication terminal 53 shall be detected based on a radio wave strength which is detected by at least one of the plural antennas of the BLE communication unit 5 as a conventionally used method.

First, a position of the communication terminal 53 with respect to the image forming apparatus 50 when the user is at a position A is detected as in a direction of angle α by the image forming apparatus 50. In addition, a distance at that time is detected as a distance p.

After that, in a case that the user moves closer towards the image forming apparatus 50 and moves to a position B, a position of the communication terminal 53 with respect to the image forming apparatus 50 is detected as in a direction of an angle α. In addition, a distance at that time is a distance q.

That is, in a case that the user who carries the communication terminal 53 moves from the position A to the position B toward the image forming apparatus 50 and comes close to it, an angle at which the communication terminal 53 is positioned with respect to the image forming apparatus 50 remains the angle α, and the distance from the communication terminal 53 to the image forming apparatus 50 approaches from the distance p to the distance q.

On the other hand, part (b) of FIG. 9 shows another example when the user who carries the communication terminal 53 is moving near a front of the image forming apparatus 50.

First, a position of the communication terminal 53 when the user is at the position A is detected as in the direction of the angle α with respect to the image forming apparatus 50. In addition, the distance at that time is detected as the distance p.

After that, in a case that the user moves to a position C in a horizontal direction in front of the image forming apparatus 50, a position of the communication terminal 53 with respect to the image forming apparatus 50 is detected as in a direction of an angle β. In addition, a distance at that time is detected as a distance r.

That is, in a case that the user who carries the communication terminal 53 is not approaching the image forming apparatus 50, the angle at which the communication terminal 53 is positioned with respect to the image forming apparatus 50 changes arbitrarily from the angle α to the angle β, and the distance from the communication terminal 53 to the image forming apparatus 50 changes arbitrarily from the distance p to the distance q.

Thus, by detecting the angle which indicates the direction of the communication terminal 53 and the distance to the communication terminal 53 and by detecting the movement locus, the image forming apparatus 50 is able to identify whether the user who carries the communication terminal 53 is approaching to operate the image forming apparatus 50 or passing through a vicinity of the image forming apparatus 50.

Incidentally, in FIG. 9, the example, in which the user who carries the communication terminal 53 is moving near the front of the image forming apparatus 50, is illustrated, however, as long as the user is within a communication area of the BLE communication unit 5, it is also possible to detect the user who is approaching the image forming apparatus 50 from a side of it.

Next, an operation of returning the image forming apparatus 50 from a sleep state to a standby state, by detecting a movement locus of the user who carries the communication terminal 53 as described in part (a) of FIG. 9 and part (b) of FIG. 9, will be described using the flow chart in FIG. 10. Here, the standby state is a state in which the image forming apparatus 50 is started up and is ready to form an image on a sheet by accepting an image forming job. Further, the standby state is a state in which the reading device 50b of the image forming apparatus 50 is able to read a current image by accepting an instruction from the user. Further, the sleep state is a power saving state which consumes less power than the standby state, is a state to which a predetermined power source voltage is applied, and is a state which is able to shift to the standby state by performing a return operation.

In S1001, the control portion 300 determines whether or not the communication terminal 53 is detected by the BLE communication unit 5. Here, by using a method described in FIG. 6, the communication terminal 53 is detected based on that the BLE communication unit 5 receives the radio wave.

Then, in a case that the communication terminal 53 is detected (S1001 YES), go to S1002. In S1002, a direction of the communication terminal 53 which is detected in S1001 is detected by using a method described in FIG. 9, and whether the direction is constant or not is determined by detecting a change in an angle in which the communication terminal 53 is positioned. That is, in S1002, by detecting a position of the communication terminal 53 every predetermined time, it detects whether an angle of the communication terminal 53 with respect to the image forming apparatus 50 is constant or changed.

In a case that the direction is constant (S1002 YES), go to S1003. In a case that the direction is not constant (S1002 NO), go to S1001.

In S1003, the control portion 300 detects a distance from the communication terminal 53 by the BLE communication unit 5 and determines whether or not the distance is within a predetermined distance. That is, in S1003, the control portion 300 determines whether or not the communication terminal 53 approaches the image forming apparatus 50 within a certain distance.

In a case that the distance from the communication terminal 53 is within the predetermined distance (S1003 YES), go to S1004. In a case that the distance from the communication terminal 53 is not within the predetermined distance (S1003 NO), go to S1001.

In S1004, the control portion 300 performs a sleep return process to return each portion of the image forming apparatus 50 from the sleep state to the standby state.

Specifically, the control portion 300 displays an operation screen, which is necessary for a user operation, on the display portion 410 by the display control portion 304 as the sleep return process. That is, the control portion 300 controls a transition of the display screen of the display portion 410 to a screen of a startup state or controls the display of the display portion 410 to turn on, as the sleep return process. Further, the control portion 300 performs startup control on each portion of the main assembly 50a and the document reading device 50b which are in the sleep state, as the sleep return process, and returns to a state in which various functions are operable. Here, the startup control of each portion is a control which performs warm up operations for performing an image forming operation and a reading operation, such as a startup control of motors, etc., a temperature control of the fixing device, etc.

Figure 10:
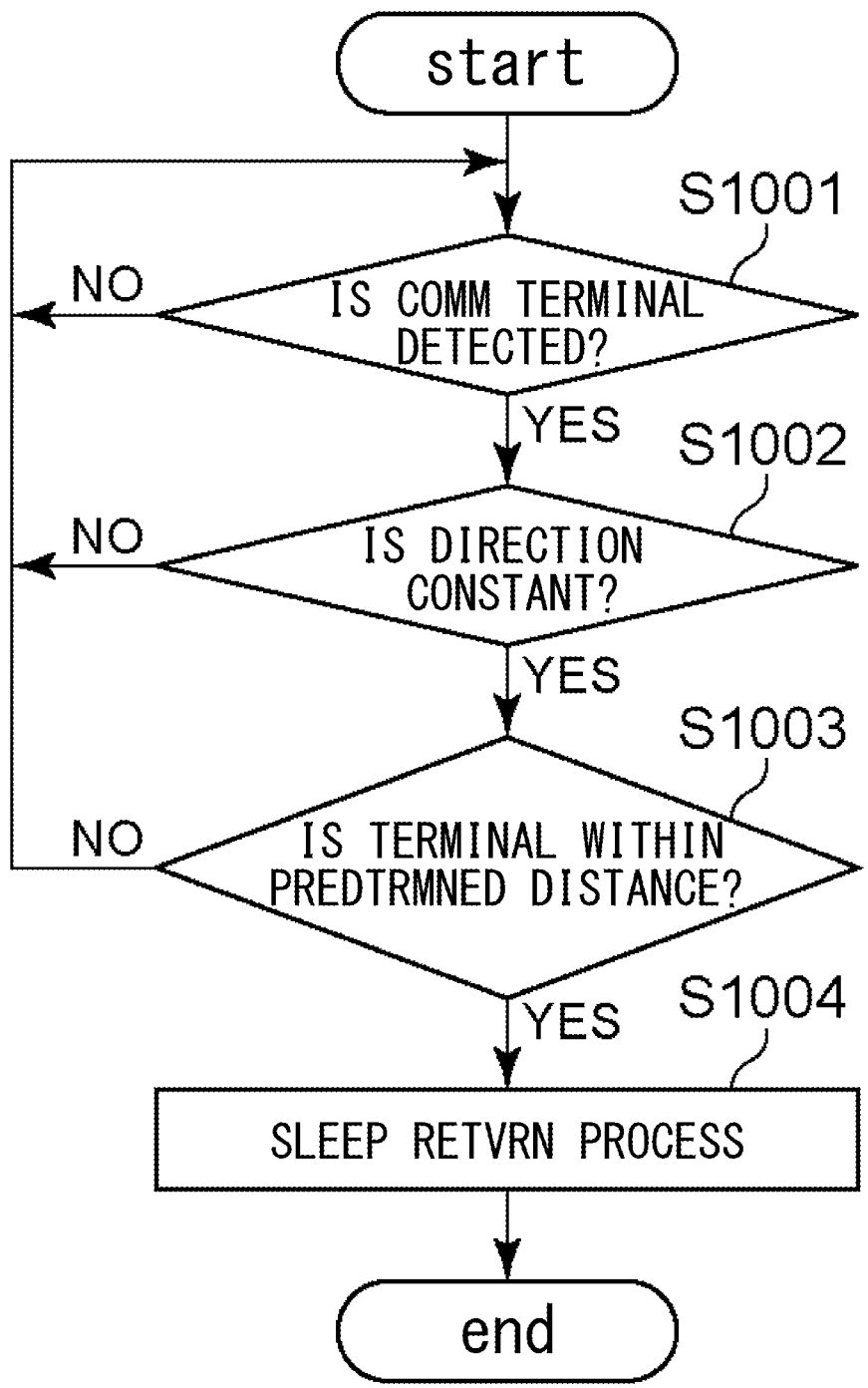
FIG. 10 is a flow chart illustrating an operation of sleep restoration by BLE communication.

In this way, in FIG. 10, it is possible to perform the sleep return process only when the user is approaching toward the image forming apparatus 50, after identifying accurately the user approaching to operate the image forming apparatus 50 and the user passing through the image forming apparatus 50 by detecting a direction and a distance in which the communication terminal 53 is positioned.

Incidentally, the sleep return process may be performed without a step of S1003, by determining that the user is approaching the image forming apparatus 50 based on a fact that positions of the communication terminals 53 are approaching from a same direction. This also allows the sleep return process to be performed only when the user approaches to operate the image forming apparatus 50.

Thus, the image forming apparatus 50 is able to save even more power by avoiding an unnecessary sleep return. Further, since the direction and the distance of the user approaching to operate the image forming apparatus 50 are detected using the BLE communication unit 5, it is possible to more accurately control a timing of the sleep return based on the user's position. Thus, the image forming apparatus 50 is able to provide the sleep return which is fast and stress free according to the user's movement and improve a usability.

Incidentally, as for whether a direction determined in S1002 is constant or not, a direction may be determined as a constant in a case that the angle is completely same angle, however, or it may be also determined as a constant direction in a case that a change in angle is within a predetermined range. For example, it may be determined as a constant direction in a case that the change in angle is within plus and minus 20 degrees.

Next, an operation, in which the image forming apparatus 50 performs a user authentication by a method of identifying the movement locus of the user who carries the communication terminal 53 as described in part (a) of FIG. 9 and part (b) of FIG. 9, will be described by using the flow chart in FIG. 11.

In S1101, the control portion 300 determines whether or not the communication terminal 53 is detected by the BLE communication unit 5. Here, by using the method described in FIG. 6, the communication terminal 53 is detected based on a fact that the BLE communication unit 5 receives the radio wave.

Then, in a case of detecting the communication terminal 53 (S1101 YES), go to S1102. In S1102, by detecting a direction in which the communication terminal 53 detected in S1101 is positioned and detecting a change in the angle in which the communication terminal 53 is positioned, it is determined whether the direction is constant or not. That is, in S1102, by detecting a position of the communication terminal 53 every predetermined time, it detects whether the angle of the communication terminal 53 with respect to the image forming apparatus 50 is constant or the angle is changed.

In a case that the direction is constant (S1102 YES), go to S1103. In a case that the direction is not constant (S1102 NO), go to S1101.

In S1103, the BLE communication unit 5 detects a distance from the communication terminal 53 and the control portion 300 determines whether or not the distance is within a predetermined distance. That is, in S1103, the control portion 300 determines whether the communication terminal 53 is close to the image forming apparatus 50 within a certain distance.

In a case that the distance from the communication terminal 53 is within the predetermined distance (S1103 YES), go to S1104. In a case that the distance from the communication terminal 53 is not within the predetermined distance, go to S1101.

In S1104, the control portion 300 performs the user authentication process through the BLE communication with the communication terminal 53 by the BLE communication unit 5.

Here, user IDs associated with users are registered in the communication terminal 53, and, further, an ID list of the users who can be authenticated is stored in the memory device 303 of the image forming apparatus 50.

That is, the control portion 300 obtains the user ID associated with the communication terminal 53 through the BLE communication with the communication terminal 53, checks it against the ID list of the users who can be authenticated by the memory device 303, and performs the user authentication based on whether or not the ID list matches the obtained user ID.

And, in S1105, the control portion 300 determines whether or not the mobile terminal 53 is authenticated by the user authentication process in S1104.

In a case of being authenticated (S1105 YES), go to S1106. In a case of not being authenticated, go to S1101.

In S1106, the control portion 300 performs a log in process for the authenticated user. Specifically, the control portion 300 displays an operation screen which is necessary for a user operation on the display unit 410 by the display control portion 304. In this case, the control portion 300 reads various settings of the authenticated user, which are stored in the memory device 303, and displays a standby operation screen which is customized for the user on the display portion 410. Thus, the authenticated user is able to log in to the imaging forming apparatus 50 and easily operate the imaging forming apparatus 50.

Figure 11:
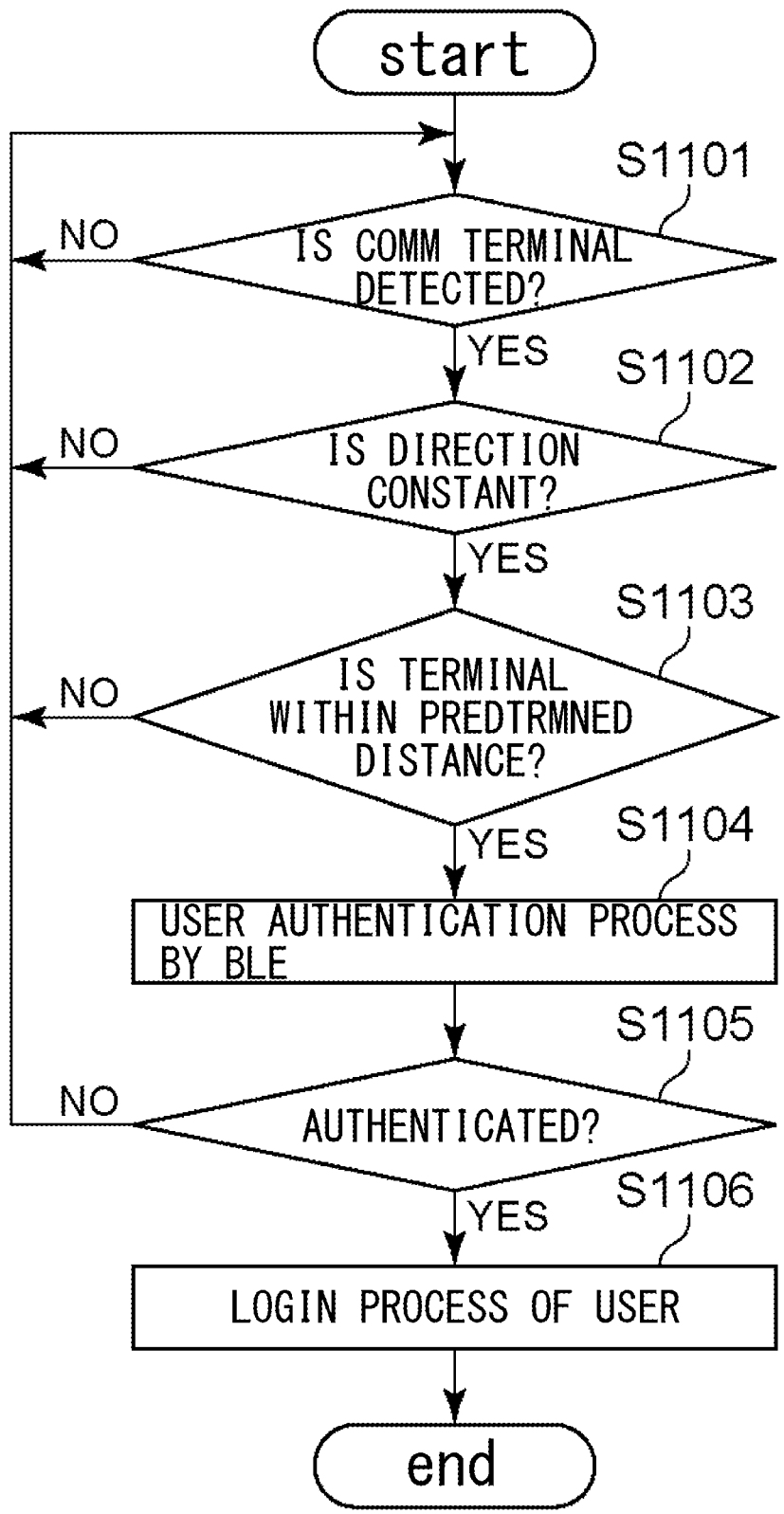
FIG. 11 is a flow chart illustrating an operation of user authentication by BLE communication.

In FIG. 11, by detecting the direction and the distance in which the communication terminal 53 is positioned, it is possible to accurately identify a user who approaches in order to operate the image forming apparatus 50 and a user who passes through the image forming apparatus 50 and performs the log in process only in the case of approaching toward the image forming apparatus 50.

Incidentally, it may be constituted to perform the user authentication process without a step of S1103, by determining that a user is approaching the image forming apparatus 50 based on a fact that positions of the communication terminal 53 are approaching from a same direction. In this way, it is also possible to perform the log in process only in the case that the user approaches in order to operate the image forming apparatus 50.

Thus, it is possible to suppress the unnecessary authentication and the unnecessary log in process for a user who passes through the image forming apparatus 50. Further, since it is possible to detect the direction and the distance of the user who approaches in order to operate the image forming apparatus 50, it is possible to control a timing of the authentication process by the user's position more appropriately. Thus, by performing the authentication process and the log in process in accordance with the user's arrival in the image forming apparatus 50, it is possible to improve usability since it is possible to perform the authentication process and the log in process in a way that is fast and stress free for the user.

Incidentally, in the embodiment described above, an example, in which the sleep return process and the user log in process are performed respectively by detecting the direction and the distance in which the communication terminal 53 is positioned, is described, however, both the sleep return process and the log in process may be performed. For example, it may be constituted to perform the sleep return process and the user authentication process when a distance between the communication terminal 53 which approaches from a same direction and the image forming apparatus 50 is a predetermined distance.

Further, as for whether or not the direction determined in S1102 is constant, the direction may be determined to be constant in a case that an angle is completely same, however, the direction may also be determined to be constant in a case that a change of an angle is within a predetermined range. For example, in a case that a change in an angle is within plus and minus 20 degrees, it may be determined to be a constant direction.

Further, in the embodiment described above, an example, that only one communication terminal 53 approaches, is described, however, in a case that a plurality of the communication terminals 53 are detected within the communication area of the BLE communication unit 5, the directions and the distances of positions of respective terminals 53 may be detected respectively based on data of the terminals 53. In this case, in a case that any one of the plurality of the communication terminals 53 approaches from a same direction for a predetermined distance, it may perform the sleep return process and the user authentication process for the communication terminal 53 which approaches from the same direction for the predetermined distance. Incidentally, in a case that two or more communication terminals, out of a plurality of the communication terminals 53 positioned within the communication area of the BLE communication unit 5, are detected approaching from a same direction, the user authentication process may be constituted to be performed with a communication terminal 53 which approaches in a predetermined distance first. Incidentally, as long as a control is based on the direction and the distance in which the communication terminal is positioned using the plurality of the BLE antennas from 35 to 38, it may be constituted to perform other controls than the sleep return process and the user authentication process. In this way, by mounting the plurality of the BLE antennas from 35 to 38 on the image forming apparatus 50, it is possible to improve a performance of the image forming apparatus 50.

As described above, in the embodiment, the BLE communication unit 5 is arranged on a front side of the image forming apparatus 50. Thus, when the BLE communication is performed with the communication terminal 53 which is owned by the user, it is possible to prevent radio waves from being shielded by the main assembly 50*a*, the reading device 50*b*, etc. of the image forming apparatus 50 and to detect a direction in which the communication terminal 53 is positioned by using the BLE communication. Further, by arranging the BLE communication unit 5 in a vicinity of the operation portion 400, it is possible to more accurately detect the user who carries the communication terminal 53 and approaches the image forming apparatus 50 to operate the operation portion 400.

Further, the BLE communication unit 5 is arranged in the vicinity the operation portion 400, above the main assembly 50*a* in a vertical direction, and at a relatively high position in the image forming apparatus 50. Further, the BLE communication unit 5 is arranged above the discharge tray 92 in a vertical direction, above the discharging roller pair 91, and at a relatively high position in the image forming apparatus 50. Thus, it is possible to send and receive the direct wave of the wireless radio wave which arrives by avoiding an influence of obstacles between the image forming apparatus 50 and the communication terminal 53, with sufficient radio wave strength. Thus, it is possible to detect efficiently the direction in which the communication terminal 53 is positioned.

Further, in the embodiment described above, a sensor is provided to detect that the feeding portion 50*b*1 is open with respect to the reading portion 50*b*2, and, in a case that the feeding portion 50*b*1 is in an open state as a result of a sensor detection, the BLE communication unit 5 may be constituted not to detect the communication terminal 53. That is, the detection of the communication terminal 53 by the BLE communication unit 5 may be constituted to be performed only in a case that the feeding portion 50*b*1 is in a closed state.

According to this constitution, it is possible to prevent an inability of a favorable detection of the arrival radio wave, due to inconsistency at all times of a detection range by the BLE antennas from 35 to 38 by a rotational angle of the feeding portion 50*b*1, an attachment error in the closed state, etc. Thus, it is possible to prevent a decrease in an accuracy of detection of the position and the direction of the communication terminal 53 due to a change in a detection direction of the BLE antennas from 35 to 38 by an angle of the open state of the feeding portion 50*b*1. Therefore, it is possible to send and receive the direct wave of the arrival wireless radio wave with a sufficient radio wave strength by avoiding an influence of an obstacle existing between the image forming apparatus 50 and the communication terminal 53. Thus, it is possible to favorably detect the direction in which the communication terminal 53 is positioned.

Embodiment 2

Figure 12:
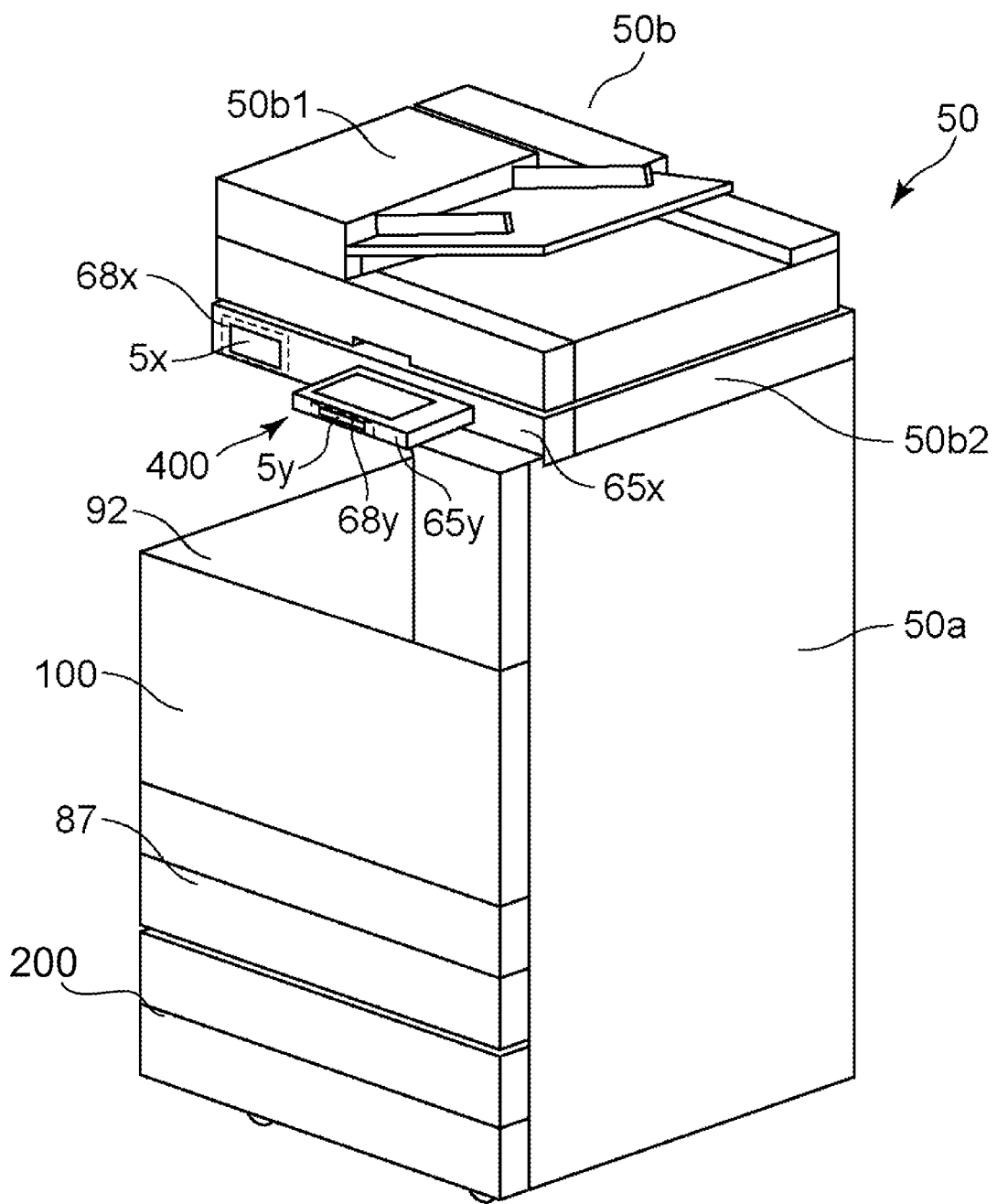
FIG. 12 is a view illustrating an arrangement of a BLE communication unit in a second embodiment.

Next, a second embodiment will be described using FIG. 12. FIG. 12 is an external appearance perspective view of the image forming apparatus 50 showing the second embodiment. Incidentally, in the other embodiments, an only difference from the embodiment shown in FIG. 2 is an arrangement of the BLE communication unit 5, and similar constitutions are indicated with same reference numerals and omitted from descriptions. Incidentally, in FIG. 12, the board 39 and the BLE antennas from 35 to 38 which constitute the BLE communication unit 5 are not shown, however, its constitution is same as in the first embodiment described above.

In an embodiment shown in FIG. 12, as the other examples of arranging the BLE communication unit 5 above the discharging roller pair 91 of the image forming apparatus 50 in a vertical direction, BLE communication units 5*x* and 5*y* are shown.

The BLE communication unit 5*x* is arranged in a front side of the reading portion 50*b*2 of the reading device 50*b* which is above the main assembly 50*a*.

Further, the BLE communication unit 5*x* is fixed to the unshown metal plate 61 as the support frame of the reading portion 50*b*1 of the reading device 50*b*. And the board 39, on which the BLE antennas from 35 to 38 are mounted, is covered by an outer cover 65*x* which forms an outer in a front side of the reading portion 50*b*1. In this case, similar to a constitution shown in FIG. 8, an area 68*x*, which is an area opposing the BLE antennas from 35 to 38 and opposing the BLE communication unit 5*x*, is formed with a uniform thickness without any ribs or bosses. Thus, as same in the embodiment described above, it is possible to send and receive the wireless radio waves at the respective antennas under same characteristic conditions, preventing from causing differences in characteristics of the wireless radio waves which are sent and received by the BLE antennas from 35 to 38. Thus, it is possible to accurately calculate the direction in which the communication terminal 53 is positioned by correctly detecting the phase differences of the wireless radio waves among the antennas in the direction detection of the communication terminal 53 by means of the wireless radio waves.

In this way, the BLE communication unit 5*x* is constituted to be arranged in a position in the front side of the image forming apparatus 50, above the discharging roller pair 91 in a vertical direction, and above the main assembly 50*a* in a vertical direction. Thus, it is possible to prevent from being shielded by the main assembly 50*a* and the reading device 50*b* etc. of the image forming apparatus 50, and to favorably detect a direction in which the communication terminal 53 is positioned by using the BLE communication. Further, it is possible to detect a user more accurately, who carries the communication terminal 53 and approaches the image forming apparatus 50 in order to operate the operation portion 400, by arranging the BLE communication unit 5 in a vicinity of the operation position 400.

Further, at a position of the BLE communication unit 5*x*, it is not fixed to the rotatable feeding portion 50*b*1, but is fixed to the immovable reading device 50*b*2. That is, in an arrangement of the BLE communication unit 5*x*, the BLE communication unit 5*x* is immovable. Thus, it is possible to prevent an inability of a favorable detection of the arrival radio wave due to inconsistency at all times of the detection range by the BLE antennas from 35 to 38, by the rotational angle of the feeding portion 50*b*1, the attachment error in the closed state, etc. By this constitution, it is possible to detect more favorably a direction in which the communication terminal 53 is positioned, since it is possible to detect the arrival radio wave favorably.

Further, as for another example shown in FIG. 12, the BLE communication unit 5*y* may be constituted to be arranged on a front side of the operation portion 400 which is above the main assembly 50*a* in a vertical direction. Here, the front side of the operation portion 400 is a portion which is positioned at forefront side of the image forming apparatus 5 in the operation portion 400. Further, the front side of the operation portion 400 is a portion which is positioned at front side of the display portion 410 such as a touch panel, etc. with respect to a front and rear direction of the image forming apparatus 50.

And the BLE communication unit 5y is fixed to the metal plate 61 which is a part of the unshown support frame which supports the display portion 410, etc. of the operation portion 400, and is covered by the outer cover 65. Here, as the outer cover 65y is similar to the constitution shown in FIG. 8, an area 68y, which opposes the BLE antennas from 35 to 38 in an inside of the cover and opposes the BLE communication unit 5y, is formed with a uniform thickness without any ribs, bosses, etc. Thus, as same in the embodiment described above, it is possible to send and receive the wireless radio waves at the respective antennas under same characteristic conditions, preventing from causing differences in characteristics of the wireless radio waves which are sent and received by the BLE antennas from 35 to 38.

Further, in a case that the operation portion 400 is provided with the BLE communication unit 5y, since the operation portion 400 is positioned on the front side of the image forming apparatus 50 rather than the reading device 50b, it is possible to perform communication with the BLE communication unit 5 on the front side of the image forming apparatus 50. Thus, it is possible to prevent the radio wave from being shielded by the main assembly 50a and the reading device 50b of the image forming apparatus 50, and to detect favorably the direction in which the communication terminal 53 is positioned by using the BLE communication. Further, by arranging the BLE communication unit 5 in the operation portion 400, it is possible to more accurately detect the user who carries the communication terminal 53 and approaches the image forming apparatus 50 to operate the operation portion 400.

Incidentally, in a case that the BLE communication unit 5y is provided with the operation panel 400, in order to improve a detection accuracy of the arrival radio wave by the plurality of antennas from 35 to 38, the operation portion 400 should be constituted not to be rotatable with respect to the main assembly 50a. Further, in a case that a constitution in which the operation portion 400 does not rotate with respect to the main assembly 50a and the display portion such as a touch panel is arranged so that it faces the front side of the image forming apparatus 500, the front side of the operation portion 400 is a surface in which the display portion is arranged. Thus, in this case, the BLE communication unit may be constituted to be provided on a same surface in which the display portion 400 is provided.

Further, it may be constituted to detect a direction in which the communication 53 is positioned, only in a case that it is possible to detect accurately the arrival radio wave by the plurality of antenna from 35 to 38 based on a detection result of a senser by means of the senser which detects a rotational angle with respect to the main assembly 50a though the operation portion 400 is constituted to be rotatable.

Embodiment 3

Next, a third embodiment will be described by using FIG. 13 and FIG. 14. FIG. 13 is an external appearance view of the image forming apparatus 50 showing the third embodiment. Incidentally, in the embodiment, an only difference from the embodiment described above is an arrangement of the BLE communication unit 5, and similar constitutions are indicated with same reference numerals and omitted from descriptions. Incidentally, in FIG. 13, the board 39 and the BLE antennas from 35 to 38 which constitute the BLE communication unit 5 are not shown, however, its constitution is same as in the first embodiment described above. In the embodiment, the BLE communication unit 5 is arranged on a front portion of the main assembly 50a of the image forming apparatus 50 and below the operation portion 400. Further, the BLE communication unit 5 is covered by the outer cover 65. That is, the BLE communication unit 5 in the embodiment is provided so that it is positioned on the front side of the image forming portion 500 in a front and rear direction of the image forming apparatus 50. Further, the BLE communication unit 5 in the embodiment is provided so that it is positioned on the front side of the discharging roller pair 91 in the front and rear direction of the image forming apparatus 50. Further, the BLE communication unit 5 in the embodiment is provided in the position in which it does not overlap with the operation portion 400 when the image forming apparatus 50 is viewed from the front side, even in the case that the operation portion 400 is rotated with respect to the main assembly 50a.

In many cases, a user who carries the communication terminal 53 approaches from the front side of the image forming apparatus 50 to operate the operation portion 400 of the image forming apparatus 50. For details, it will be described below, however, in order to detect a direction by the BLE communication of Bluetooth 5.1, it is necessary to send and receive a direct wave of a wireless radio wave which arrives in a straight line between the image forming apparatus 50 and the communication terminal 53 which is carried by the user.

In the embodiment, by arranging the BLE communication unit 5 on the front side of the main assembly 50a of the image forming apparatus 50, it is possible to send and receive the direct wave of the wireless radio wave with the sufficient radio wave strength without being affected by shielding of the radio wave by the main assembly of the image forming apparatus 50, etc., in the BLE communication with the communication terminal 53 which is carried by the user. For example, in a case that the BLE communication unit 5 is arranged on the rear side of the image forming apparatus 50, it may not be possible to obtain the sufficient radio wave strength since the radio wave is shielded by the unit inside the image forming apparatus 50 or the reading device 50b. However, in the embodiment, by arranging the BLE communication unit 5 on the front side of the main assembly 50a of the image forming apparatus 50, it is possible to prevent the radio wave from being shielded by the image forming apparatus 50 itself. Further, by arranging the BLE communication unit 5 in a vicinity of the operation portion 400, it is possible to more accurately detect the user who carries the communication terminal 53 and approaches the image forming apparatus 50 to operate the operation portion 400.

Further, the BLE communication unit 5 is arranged in the vicinity of the operation portion 400 and below the operation portion 400 in a vertical direction, which is a relatively high position in the main assembly 50a. Here, the relatively high position with respect to the main assembly 50a is a position above the image forming portion 500 and the front cover 100 in a vertical direction. Further, the relatively high position with respect to the main assembly 50a is the position above the discharge tray 92 in the vertical direction. Here, the position above the discharge tray 92 in the vertical direction is a position above at least a part of the sheet loading surface of the discharge tray 92. Further, the relatively high position with respect to the main assembly 50a is a position above the sheet feeding cassette 87 in the vertical direction. In this way, by arranging the BLE communication unit 5 at the relatively high position in the main assembly 50a, it is possible to send and receive the direct wave of the wireless radio wave with sufficient radio wave strength, avoiding the influence of obstacles which exist between the image forming apparatus 50 and the communication terminal 53. Incidentally, details of each constitution and arrangement of the BLE communication unit 5 are similar to the first embodiment, so the descriptions of them will be omitted.

In the embodiment, while the BLE communication unit 5 is arranged on a front side of the main assembly 50a of the image forming apparatus 50 as shown in part (b) of FIG. 13, the control portion 300 is arranged on the rear side of the main assembly 50a as shown in parts (b) and (c) of FIG. 13.

Thus, the BLE communication unit 5 and the control portion 300 are electrically connected by a cable 5.

Since the cable 5a is passed through the cable guide 600, which is provided with the main assembly 50a, is wired from a front surface to a rear surface in the main assembly 50a, it is easy to wire in the main assembly 50a and is designed to enhance workability when the image forming apparatus 50 is assembled or maintained.

FIG. 14 is a view showing the outer cover 65. As shown in part (a) of FIG. 13, the outer cover 65 is an outer part which is mounted below the display portion 410 in the main assembly 50a, and covers the BLE communication unit 5. Further, the outer cover 65 is an outer part which is mounted above the front cover 100, and is fixed to the support frame of the main assembly 50a by unshown screws, etc.

Part (a) of FIG. 14 is a perspective view of the outer cover 65 viewed from an inner surface 65a side. Part (b) of FIG. 14 is a plan view showing a detailed constitution of the inner surface 65a of the outer cover 65. Here, in the outer cover 65, a surface, which is inside the image forming apparatus 50 and faces toward the inside of the main assembly 50a while the outer cover 65 is mounted on the main assembly 50a, is defined as the inner surface 65a. Further, in the outer cover 65, a surface, which is inside the imaging forming apparatus 50 and opposes the support frame (the metal plate 61 and the BLE communication unit 5) while the outer cover 65 is mounted on the main assembly 50a, is defined as the inner surface 65a. And, in the outer cover 65, the surface which forms an outer appearance of the image forming apparatus 50 is defined as the outer surface 65b.

Here, the outer cover 65 is molded from resin. In general, in a cover member, which is formed using a resin material, ribs, bosses, etc. are formed on the inner surface 65a in order to ensure a strength.

In the outer cover 65 of the embodiment, as shown in part (b) of FIG. 14, the plurality of ribs 66 as reinforcing ribs and the plurality of bosses 67 are formed on the inner surface 65a. In this way, the cover itself is prevented from being deformed by reinforcing the outer cover 65 with the ribs 66 and the bosses 67. However, even on the inner surface 65a of the outer cover 65, the area 68 includes the uniform surface where the ribs 66 and the bosses 67 are not formed. That is, since the ribs 66 and the bosses 67 are provided in an area other than the area 68, the area 68 is constituted to be less unevenness compared to the other area on the inner surface 65a of the outer cover 65.

The area 68 is arranged at the position to cover the area where the BLE communication portion 5 is arranged when the outer cover 65 is mounted on the main assembly 50a. That is, the area 68 is the area which opposes the BLE communication portion 5 on the inner surface 65a of the outer cover 65, and the area which opposes the BLE antennas from 35 to 38. Incidentally, the arrangement of the BLE communication unit 5 with respect to the area 68 of the outer cover is the same as what is described in the first embodiment by using FIG. 7.

Further, similar to the first embodiment as shown in part (b) of FIG. 7, the area 68 of the outer cover 65 is molded so that the thickness f of the molding material is uniform. Thus, similar to the first embodiment, no ribs and bosses are existed in the portion of the area 68 of the outer cover 65 which covers the BLE antenna 35, the BLE antenna 36, the BLE antenna 37, and the BLE antenna 38 of the BLE communication unit 5, and the portion of the area 68 is formed by molding resin so that the thickness f is uniform.

Thus, it is possible to maintain the uniform radio wave characteristics of the member which is arranged in front of the BLE antenna 35, the BLE antenna 36, the BLE antenna 37, and the BLE antenna 38 of the BLE communication unit 5. Thus, it is possible to send and receive the wireless radio waves at the respective antennas under the same characteristic conditions, preventing from causing the differences in the characteristics of the wireless radio waves which are sent and received by the BLE antenna 35, the BLE antenna 36, the BLE antenna 37, and the BLE antenna 38 passing through the outer cover 65.

Thus, it is possible to accurately calculate the direction in which the communication terminal 53 is positioned by correctly detecting the phase differences of the wireless radio waves among the antennas in the direction detection of the communication terminal 53 by means of the wireless radio waves.

As described above, in the embodiment, the BLE communication unit 5 is arranged on the front side of the main assembly 50a of the image forming apparatus 50. Thus, when the BLE communication is performed with the communication terminal 53 which is carried by the user, it is possible to prevent the radio waves from being shielded by the main assembly 50a, the reading device 50b, etc. of the image forming apparatus 50 and to favorably detect the direction in which the communication terminal 53 is positioned by using the BLE communication. Further, by arranging the BLE communication unit 5 in the vicinity of the operation portion 400, it is possible to more accurately detect the user who carries the communication terminal 53 and approaches the image forming apparatus 50 to operate the operation portion 400.

Further, by arranging the BLE communication unit 5 in the vicinity of the operation unit 400, below the operation portion 400 and above the image forming portion 500 in a vertical direction, that is, at a position relatively high in the main assembly 50a, it is possible to send and receive the direct wave of the arrival wireless radio wave with the sufficient radio wave strength by avoiding the influence of the obstacles existing between the image forming apparatus 50 and the communication terminal 53. Thus, it is possible to favorably detect the direction in which the communication terminal 53 is positioned.

Embodiment 4

Figure 15:
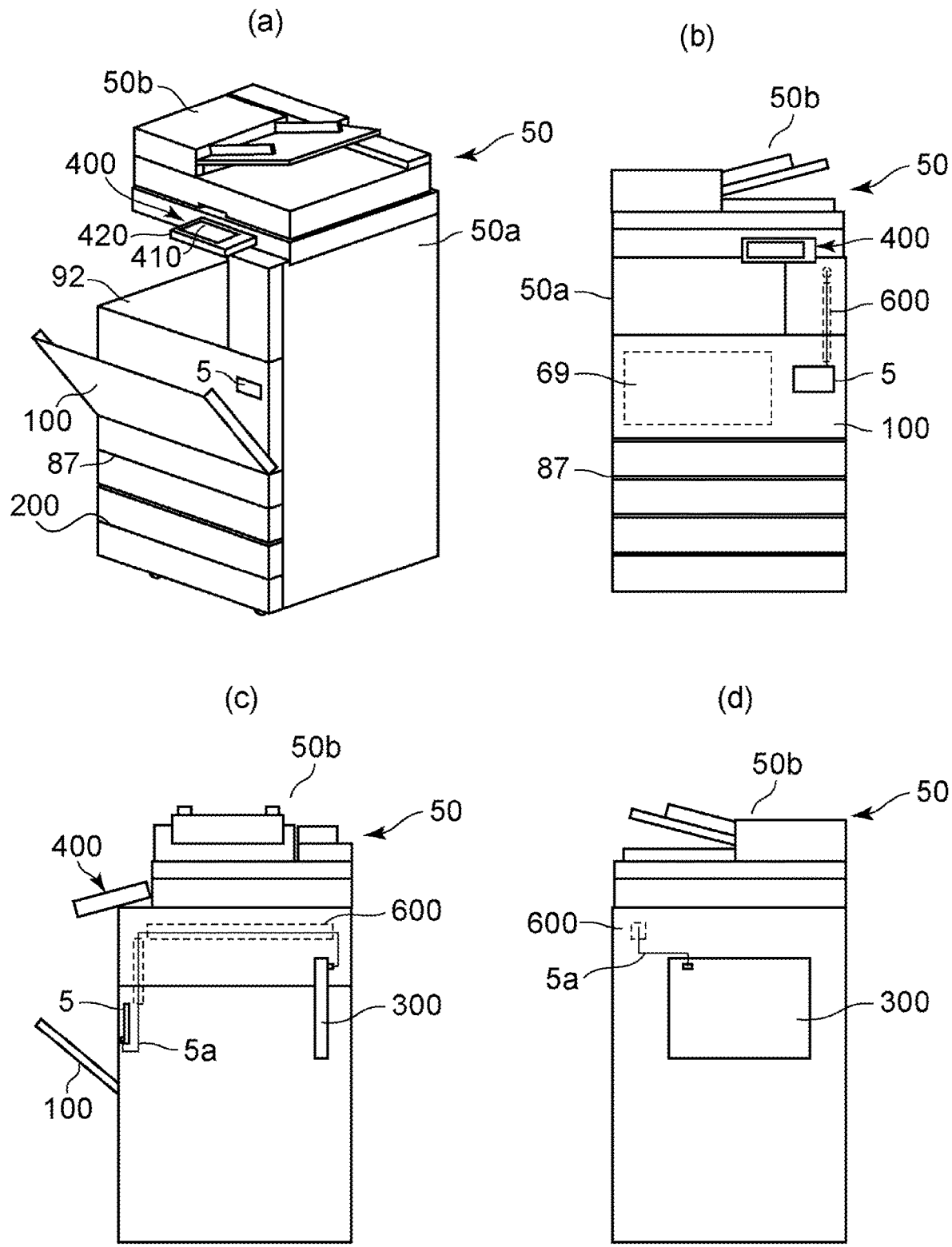
FIG. 15 is a view illustrating an arrangement of a BLE communication unit in a fourth embodiment.

Next, a fourth embodiment will be described by using parts (a) to (d) of FIG. 15 and parts (a) and (b) of FIG. 16. FIG. 15 is a view showing a constitution of the image forming apparatus 50 illustrating the fourth embodiment, wherein part (a) of FIG. 15 is an external appearance perspective view, part (b) of FIG. 15 is a front view, part (c) of the FIG. 15 is a side view, and part (d) of FIG. 15 is a back view. Incidentally, in the embodiment, an only difference from the embodiment described above is an arrangement of the BLE communication unit 5, and similar constitutions are indicated with same reference numerals and omitted from descriptions. Incidentally, in FIG. 15, the board 39 and the BLE antennas from 35 to 38 which constitute the BLE communication unit 5 are not shown, however, its constitution is same as in the first embodiment described above.

As shown in part (a) of FIG. 15, the front cover 100 is an outer cover to be opened when accessing the image forming portion 500 as described above, and is an outer cover which covers the image forming portion 500. As shown in part (b) of FIG. 2, an area in which the image forming portion 500 is covered by the front cover 100 is an area 69, and is an area which is adjacent to an area (area 68 as will be described below) which covers the BLE communication unit 5.

In this way, since the BLE communication unit 5 is covered by the front cover 100 which is capable of opening and closing, it is possible to easily access to the BLE communication unit 5 by opening the front cover 100. Thus, it is possible to easily perform a maintenance of the BLE communication unit 5.

In the embodiment, the BLE communication unit 5 is arranged on the front portion of the main assembly 50a of the image forming apparatus 50 and below the operation portion 400, and the BLE communication unit 5 is covered by the front cover 100. That is, the BLE communication unit 5 in the embodiment is provided so that it is positioned on the front side of the image forming portion 500 in a front and rear direction of the image forming apparatus 50.

In many cases, a user who carries the communication terminal 53 approaches from the front side of the image forming apparatus 50 to operate the operation portion 400 of the image forming apparatus 50. For details, it will be described below, however, in order to detect a direction by the BLE communication of Bluetooth 5.1, it is necessary to send and receive a direct wave of a wireless radio wave which arrives in a straight line between the image forming apparatus 50 and the communication terminal 53 which is carried by the user.

In the embodiment, by arranging the BLE communication unit 5 on the front side of the main assembly 50a of the image forming apparatus 50, it is possible to send and receive the direct wave of the wireless radio wave with the sufficient radio wave strength without being affected by shielding of the radio wave by the main assembly of the image forming apparatus 50, etc., in the BLE communication with the communication terminal 53 which is carried by the user.

For example, in a case that the BLE communication unit 5 is arranged on the rear side of the image forming apparatus 50, it may not be possible to obtain the sufficient radio wave strength since the radio wave is shielded by the unit inside the image forming apparatus 50 or the reading device 50b. On the other hand, in the embodiment, by arranging the BLE communication unit 5 on the front side of the main assembly 50a of the image forming apparatus 50, it is possible to prevent the radio wave from being shielded by the image forming apparatus 50 itself. Further, by arranging the BLE communication unit 5 in the vicinity of the operation portion 400, it is possible to more accurately detect the user who carries the communication terminal 53 and approaches the image forming apparatus 50 to operate the operation portion 400.

Further, the BLE communication unit 5 is arranged in the vicinity of the operation portion 400 and below the operation portion 400 in a vertical direction, which is a relatively high position in the main assembly 50a. Here, the relatively high position with respect to the main assembly 50a is a position above the sheet feeding cassette 87 in the vertical direction. In this way, by arranging the BLE communication unit 5 at the relatively high position in the main assembly 50a, it is possible to send and receive the direct wave of the wireless radio wave with the sufficient radio wave strength, avoiding the influence of obstacles which exist between the image forming apparatus 50 and the communication terminal 53. Incidentally, details of each constitution and arrangement of the BLE communication unit 5 will be described below.

As shown in FIG. 15, the image forming apparatus 50 is provided with the control portion 300 which controls the operation of the image forming portion 500. In the embodiment, while the BLE communication unit 5 is arranged on the front side of the main assembly 50a of the image forming apparatus 50 as shown in parts (a) and (c) of FIG. 15, the control portion 300 is arranged on the rear side of the main assembly 50a as shown in parts (b) and (d) of FIG. 15.

Thus, the BLE communication unit 5 and the control portion 300 are electrically connected by the cable 5a. Since the cable 5a is passed through the cable guide 600 which is provided with the main assembly 50a, and is wired from the front surface to the rear surface in the main assembly 50a, it is easy to wire in the main assembly 50a and is designed to enhance workability when the image forming apparatus 50 is assembled or maintained. Incidentally, as shown in part (b) of FIG. 15, the cable guide 600 is provided below the reading device 50b and below the discharge tray 92 in the vertical direction, and is provided so that it is capable of opening and closing with respect to the main assembly 50a.

As shown in part (a) of FIG. 15, the front cover 100 is an outer part which is provided so that it is capable of opening and closing at a position below the discharge tray 92 in the main assembly 50a and is formed by plastic resin.

Further, the front cover 100 is arranged to cover the front surface of the image forming apparatus 500 and the BLE communication unit 5. Thus, the BLE antenna 35, the BLE antenna 36, the BLE antenna 37, and the BLE antenna 38 of the BLE communication unit 5 are covered by the front cover 100. Here, the front cover 100 is an example of a cover member which covers the BLE communication unit 5 which is fixed to the metal plate 61.

FIG. 16 is a view showing the front cover 100. Part (a) of FIG. 16 is a perspective view of the front cover 100 viewed from an inner surface 100a side. Part (b) of FIG. 16 is a plan view showing a detailed constitution of the inner surface 100a of the outer cover 100. Here, in the front cover 100, a surface, which is inside the image forming apparatus 50 and faces toward an inside of the main assembly 50a while the front cover 100 is closed with respect to the main assembly 50a, is defined as the inner surface 100a. Further, in the outer cover 100, a surface, which is inside the imaging forming apparatus 50 and opposes the support frame (the metal plate 61 and the BLE communication unit 5) while the front cover 100 is closed with respect to the main assembly 50a, is defined as the inner surface 100a. And, in the front cover 100, a surface which forms an outer appearance of the image forming apparatus 50 is defined as the outer surface 100b.

Here, the front cover 100 is molded from resin. In general, in a cover member which is formed using a resin material, ribs, bosses, etc. are formed on the inner surface 65a in order to ensure a strength.

In the front cover 100 of the embodiment, as shown in part (b) of FIG. 16, a plurality of ribs 66 as reinforcing ribs and a plurality of bosses 67 are formed on the inner surface 100a. In this way, the cover itself is prevented from being deformed by reinforcing the front cover 100 with the ribs 66 and the bosses 67. However, even on the inner surface 100a of the front cover 100, an area 68 includes a uniform surface where ribs 66 and bosses 67 are not formed. That is, since the ribs 66 and the bosses 67 are provided in an area other than the area 68, the constitution of the area 68 is less unevenness compared to the other area on the inner surface 100a of the front cover 100. On the other hand, in an area 69 which mainly covers the image forming portion 500, the front cover 100 is reinforced by providing the ribs 66 and the bosses 67.

The area 68 is arranged at the position to cover the area where the BLE communication portion 5 is arranged when the front cover 100 is mounted on the main assembly 50a in part (a) of FIG. 15. That is, the area 68 is the area which opposes the BLE communication portion 5 on the inner surface 100a of the front cover 100, and the area which opposes the BLE antennas from 35 to 38. Incidentally, the arrangement of the BLE communication unit 5 with respect to the area 68 of the outer cover is the same as what is described in the first embodiment by using FIG. 7.

Further, similar to the first embodiment as shown in part (b) of FIG. 7, the area 68 of the front cover 100 is molded so that the thickness f of the molding material is uniform. Thus, similar to the first embodiment, no ribs and no bosses are existed in the portion of the area 68 of the front cover 100 which covers the BLE antenna 35, the BLE antenna 36, the BLE antenna 37, and the BLE antenna 38 of the BLE communication unit 5, and the portion of the area 68 is formed by molding resin so that the thickness f is uniform.

Thus, in the embodiment, it is also possible to maintain the uniform radio wave characteristics of the member which is arranged in front of the BLE antenna 35, the BLE antenna 36, the BLE antenna 37, and the BLE antenna 38 of the BLE communication unit 5. Further, it is possible to send and receive the wireless radio waves at the respective antennas under the same characteristic conditions, preventing from causing the differences in the characteristics of the wireless radio waves which are sent and received by the BLE antenna 35, the BLE antenna 36, the BLE antenna 37, and the BLE antenna 38 passing through the front cover 100, and it is possible to accurately calculate the direction in which the communication terminal 53 is positioned by correctly detecting the phase differences of the wireless radio waves among the antennas in the direction detection of the communication terminal 53 by means of the wireless radio waves.

As described above, in the embodiment, the BLE communication unit 5 is arranged on the front side of the main assembly 50a of the image forming apparatus 50. Thus, when the BLE communication is performed with the communication terminal 53 which is carried by the user, it is possible to prevent the radio waves from being shielded by the main assembly 50a, the reading device 50b, etc. of the image forming apparatus 50 and to favorably detect the direction in which the communication terminal 53 is positioned by using the BLE communication. Further, by arranging the BLE communication unit 5 in the vicinity of the operation portion 400, it is possible to more accurately detect the user who carries the communication terminal 53 and approaches the image forming apparatus 50 to operate the operation portion 400.

Further, by arranging the BLE communication unit 5 in the vicinity of the operation unit 400, below the operation portion 400 and above the sheet feeding cassette 87 in the vertical direction, that is, at a position relatively high in the main assembly 50a, it is possible to send and receive the direct wave of the arrival wireless radio wave with the sufficient radio wave strength by avoiding the influence of the obstacles existing between the image forming apparatus 50 and the communication terminal 53. Thus, it is possible to favorably detect the direction in which the communication terminal 53 is positioned.

Further, in the embodiment described above, the BLE communication unit 5 is not fixed to the rotatable front cover 100 but to the metal plate 61 which is a part of the support frame of the main assembly 50a. That is, in the embodiment, the BLE communication unit 5 is immovable. In a case that the BLE communication unit 5 is fixed to the rotatable front cover 100, the arrival radio wave may not be favorably detected due to inconsistency at all times of a detection range by the BLE communication unit 5, by a rotational angle, an attachment error in the closed state, etc. of the front cover 100. On the other hand, as in the embodiment, since it is possible to favorably detect the arrival radio wave by fixing the BLE communication unit 5 to an unrotatable member, it is possible to favorably detect the direction in which the communication terminal 53 is positioned.

As described above, it is possible to improve the performance of the image forming apparatus 50 by using the plurality of BLE antennas from 35 to 38 for detecting the arrival direction of the radio wave.

Embodiment 5

Next, a fifth embodiment will be described by using FIG. 17 and FIG. 18. FIG. 17 is a view showing a constitution of the image forming apparatus 50 in the fifth embodiment, wherein part (a) of FIG. 17 is an external appearance perspective view, part (b) of FIG. 17 is a side view, and part (c) of the FIG. 17 is a back view. Incidentally, in the embodiment, an only difference from the embodiment described above is an arrangement of the BLE communication unit 5, and similar constitutions are indicated with same reference numerals and omitted from descriptions. Incidentally, in FIG. 17, the board 39 and the BLE antennas from 35 to 38 which constitute the BLE communication unit 5 are not shown, however, its constitution is same as in the first embodiment described above.

In the embodiment, the outer cover 65 is below the image forming portion 500 in a vertical direction, and a cover member which constitutes an outer appearance of the image forming apparatus 50 below the front cover 100 of the main assembly 50a. Further, the outer cover 65 is the cover member which constitutes an outer appearance of the image forming apparatus 50 below the sheet feeding cassette 87 in a vertical direction of the image forming apparatus 50. In the embodiment, a configuration, in which the feeding device 200 is provided in a lower portion of the main assembly 50a of the image forming apparatus 50, is illustrated, and the outer cover 65 is a cover member which is provided between the sheet feeding cassette 87 and the feeding device 200 in a vertical direction.

Further, in the embodiment, the BLE communication unit 5 is arranged on a front portion of the main assembly 50a of the image forming apparatus 50 and below the sheet feeding cassette 87. and the BLE communication unit 5 is covered with the outer cover 65. Incidentally, the front side of the main assembly 50a is defined as a position on a front side of the image forming portion 500 in the front and rear direction of the image forming device 50.

Further, the BLE communication unit 5 in the embodiment is provided so that it is positioned on the front side of the discharging roller pair 91 in the front and rear direction of the image forming apparatus 50. Further, the BLE communication unit 5 in the embodiment is provided in the position in which it does not overlap with the operation portion 400 when the image forming apparatus 50 is viewed from the front side, even in the case that the operation portion 400 is rotated with respect to the main assembly 50a. Further, the BLE communication unit 5 in the embodiment is provided below the discharge tray 92 in the vertical direction of the image forming apparatus 50 and below the image forming portion 500.

In many cases, a user who carries the communication terminal 53 approaches from the front side of the image forming apparatus 50 to operate the operation portion 400 of the image forming apparatus 50. For details, it will be described below, however, in order to detect a direction by the BLE communication of Bluetooth 5.1, it is necessary to send and receive a direct wave of a wireless radio wave which arrives in a straight line between the image forming apparatus 50 and the communication terminal 53 which is carried by the user.

In the embodiment, by arranging the BLE communication unit 5 on the front side of the main assembly 50a of the image forming apparatus 50, it is possible to send and receive the direct wave of the wireless radio wave with the sufficient radio wave strength without being affected by shielding of the radio wave by the main assembly of the image forming apparatus 50, etc., in the BLE communication with the communication terminal 53 which is carried by the user. For example, in a case that the BLE communication unit 5 is arranged on the rear side of the image forming apparatus 50, it may not be possible to obtain the sufficient radio wave strength since the radio wave is shielded by the unit inside the image forming apparatus 50 or the reading device 50b. However, in the embodiment, by arranging the BLE communication unit 5 on the front side of the main assembly 50a of the image forming apparatus 50, it is possible to prevent the radio wave from being shielded by the image forming apparatus 50 itself.

Further, by arranging the BLE communication unit 5 at a relatively low position in a lower portion of a front surface of the main assembly, it is possible to send and receive the direct wave of the wireless radio wave with the sufficient radio wave strength, avoiding the influence of obstacles which exist between the image forming apparatus 50 and the communication terminal 53. In particular, in many cases, a user stands in a front side of the image forming apparatus 50 and in front of the operation portion 400. Considering a width of a human body, an upper body from a waist up may be thick, however, legs are thin compared to the upper body.

Thus, in the embodiment, even in a case that a user is in front of the operation portion 400, it is possible to send and receive the direct wave of the wireless radio wave with sufficient radio wave strength, avoiding an influence of the human body by arranging the BLE communication unit 5 at a lower portion in which it is difficult to interfere with a communication between the communication terminal 53 which is carried by another user and the BLE communication unit 5.

Incidentally, in the embodiment, a relatively low position of the image forming apparatus 50 is a position which is lower than the image forming portion 500 in a vertical direction and is lower than the front cover 100. In the embodiment, a relatively low position of the image forming apparatus 50 is a position which is lower than the sheet feeding cassette 87 in a vertical direction. In a case that the image forming apparatus 50 includes only a small number of the sheet feeding cassettes 87, for example, one, the BLE communication unit 5 may be constituted to be arranged between the front cover 100 and the sheet feeding cassette 87. Even with the configuration, since the BLE communication unit 5 is arranged at a low position of the image forming portion 500 in a vertical direction and at a relatively low position of the image forming apparatus 50, it is possible to send and receive the direct waves of the wireless radio wave with sufficient radio wave strength, avoiding the influence of the human body.

Further, it is possible to additionally reduce the influence of the human body, by arranging the BLE communication unit 5 at a position which is displaced from the operation portion 400 in a right and left direction of the image forming apparatus 50. Thus, in the embodiment, an example of arranging the BLE communication unit 5 at a position which is shifted to a right side in the right and left direction is shown, however, the BLE communication unit 5 may be arranged at a position which is shifted to a left side in the right and left direction as long as the position does not overlap with the operation portion 400 in a vertical direction. Incidentally, the arrangement of the BLE communication unit 5 with respect to the area 68 of the outer cover is the same as what is described in the first embodiment by using FIG. 7.

In the embodiment, while the BLE communication unit 5 is arranged on a front side of the main assembly 50a of the image forming apparatus 50 as shown in parts (a) and (b) of FIG. 17, the control portion 300 is arranged on the rear side of the main assembly 50a as shown in parts (b) and (c) of FIG. 17.

Thus, the BLE communication unit 5 and the control portion 300 are electrically connected by the cable 5a. Since the cable 5a is passed through the cable guide 600, which is provided with the main assembly 50a, is wired from a front surface to a rear surface in the main assembly 50a, it is easy to wire in the main assembly 50a and is designed to enhance workability when the image forming apparatus 50 is assembled or maintained. Incidentally, as shown in part (b) of FIG. 17, the cable guide 600 is arranged to avoid the image forming portion 500 below the reading device 50b.

In the embodiment, as described above in part (a) of FIG. 17, the BLE communication unit 5 is arranged on a front portion of the image forming apparatus 50 and below the front cover 100.

Figure 18:
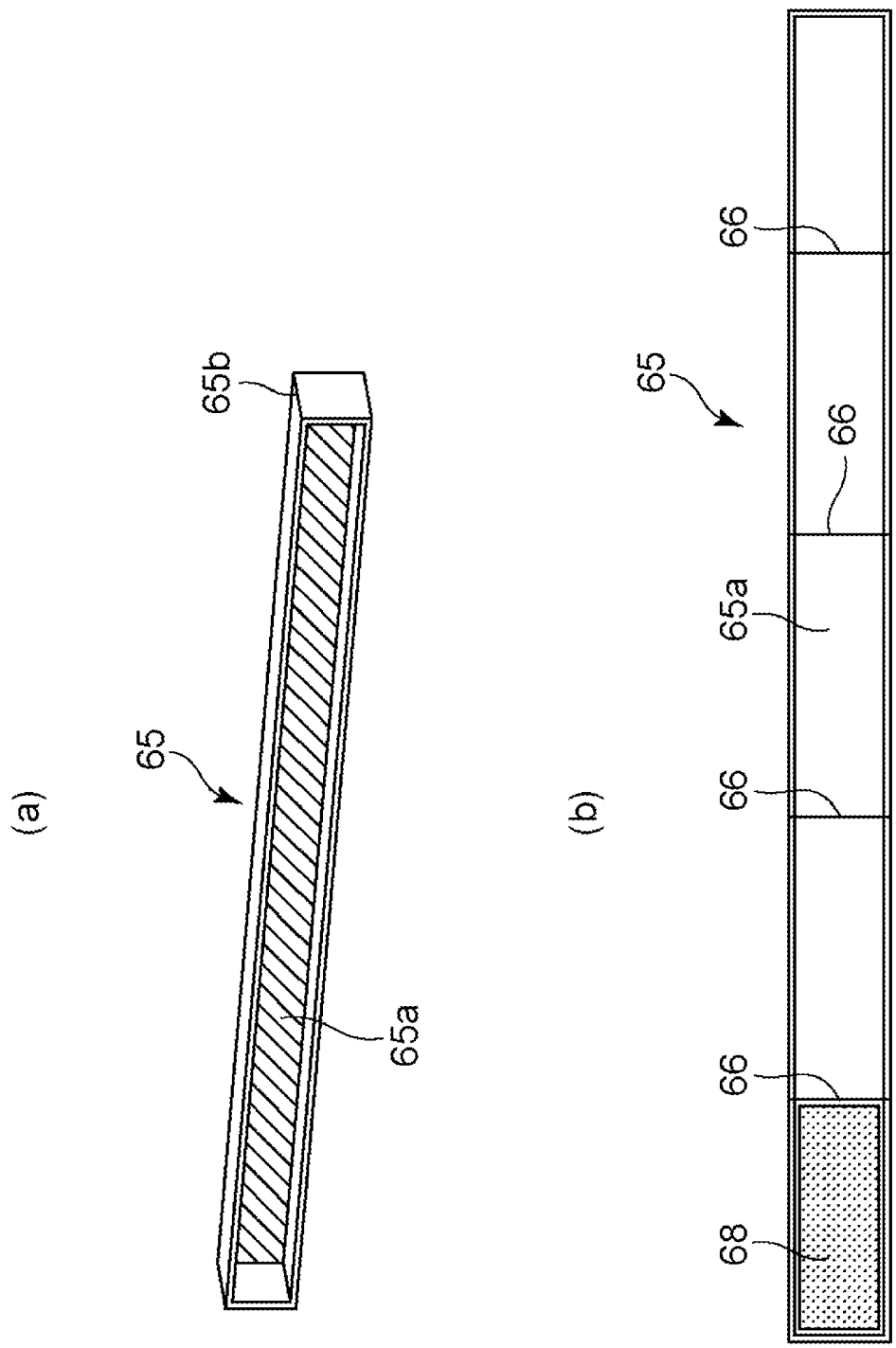
FIG. 18 is a view showing an outer cover which covers a BLE communication unit in a fifth embodiment.

FIG. 18 is a view showing the outer cover 65. As shown in part (a) of FIG. 17, the outer cover 65 is an outer part which is mounted below the sheet feeding cassette 87 in a vertical direction in the main assembly 50a, and covers the BLE communication unit 5. Further, the outer cover 65 is provided below the front cover 100 in the vertical direction in the main assembly 50a, and is a cover member which is fixed to the main assembly 50a with fixtures such as screws.

Part (a) of FIG. 18 is a perspective view of the outer cover 65 viewed from the inner surface 65a side. Part (b) of FIG. 18 is a plan view showing a detailed constitution of the inner surface 65a of the outer cover 65. Here, in the outer cover 65, a surface, which is inside the image forming apparatus 50 and faces toward the inside of the main assembly 50a while the outer cover 65 is mounted on the main assembly 50a, is defined as the inner surface 65a. Further, in the outer cover 65, a surface, which is inside the imaging forming apparatus 50 and opposes the support frame (the metal plate 61 and the BLE communication unit 5) while the outer cover 65 is mounted on the main assembly 50a, is defined as the inner surface 65a. And, in the outer cover 65, a surface which forms an outer appearance of the image forming apparatus 50 is defined as the outer surface 65b.

Here, the outer cover 65 is molded from resin. In general, in a cover member which is formed using a resin material, ribs, bosses, etc. are formed on the inner surface 65a in order to ensure a strength.

In the outer cover 65 of the embodiment, as shown in part (b) of FIG. 18, the ribs 66 are formed on its inner surface 65a as reinforcing ribs. In this way, the cover itself is prevented from being deformed by reinforcing it with the ribs 66. Incidentally, a constitution, in which the outer cover 65 includes only the ribs 66, is shown in the embodiment, however, it may be constituted to be reinforced with bosses, or it may be constituted to be reinforced with both ribs and bosses.

However, even the inner surface 65a of the outer cover 65 includes a uniform surface where the ribs 66 are not formed in the area 68. That is, since the ribs 66 are provided in an area other than the area 68, the area 68 is constituted to be less unevenness compared to the other area on the inner surface 65a of the outer cover 65.

The area 68 is arranged at the position to cover the area where the BLE communication portion 5 is arranged when the outer cover 65 is mounted on the main assembly 50a in part (a) of FIG. 17. That is, the area 68 is the area which opposes the BLE communication portion 5 on the inner surface 65a of the outer cover 65, and the area which opposes the BLE antennas from 35 to 38.

Further, in the embodiment, similar to the first embodiment, the area 68 of the outer cover 65 is molded so that the thickness f of the molding material is uniform.

That is, no ribs and no bosses are existed in the portion of the area 68 of the outer cover 65 which covers the BLE antenna 35, the BLE antenna 36, the BLE antenna 37, and the BLE antenna 38 of the BLE communication unit 5, and the portion of the area 68 is formed by molding resin so that the thickness f is uniform.

Thus, it is possible to maintain the uniform radio wave characteristics of the member which is arranged in front of the BLE antenna 35, the BLE antenna 36, the BLE antenna 37, and the BLE antenna 38 of the BLE communication unit 5. That is, it is possible to send and receive the wireless radio waves at the respective antennas under same characteristic conditions, preventing from causing differences in characteristics of the wireless radio waves which are passed through the outer cover 65 and are sent and received by the BLE antenna 35, the BLE antenna 36, the BLE antenna 37, and the BLE antenna 38.

Thus, it is possible to accurately calculate the direction in which the communication terminal 53 is positioned by correctly detecting the phase differences of the wireless radio waves among the antennas in the direction detection of the communication terminal 53 by means of the wireless radio waves.

As described above, in the embodiment, the BLE communication unit 5 is arranged on the front side of the main assembly 50a of the image forming apparatus 50. Thus, when the BLE communication is performed with the communication terminal 53 which is carried by the user, it is possible to prevent the radio waves from being shielded by the main assembly 50a, the reading device 50b, etc. of the image forming apparatus 50 and to favorably detect the direction in which the communication terminal 53 is positioned by using the BLE communication. Further, by arranging the BLE communication unit 5 in the vicinity of the operation portion 400, it is possible to more accurately detect the user who carries the communication terminal 53 and approaches the image forming apparatus 50 to operate the operation portion 400.

Further, the BLE communication unit 5 is arranged at a relatively low position in a lower portion of a front surface of the main assembly, and is arranged at a position below the front cover 100 or at a position blow the sheet feeding cassette 87 in a vertical direction. Thus, it is possible to send and receive the direct wave of the wireless radio wave with sufficient radio wave strength, avoiding an influence of obstacles which exist between the image forming apparatus 50 and the communication terminal 53. Further even in a case that a user is in front of the operation portion 400, it is possible to send and receive the direct wave of the wireless radio wave with sufficient radio wave strength, avoiding an influence of the human body by arranging the BLE communication unit 5 at a lower portion in which it is difficult to interfere with a communication between the communication terminal 53 which is carried by another user and the BLE communication unit 5 by a relatively wide upper body in the human body. Thus, it is possible to favorably detect the direction in which the communication terminal 53 is positioned.

Further, in the embodiment described above, the BLE communication unit 5 is not fixed to the rotatable front cover 100 but to the metal plate 61 which is a part of the support frame of the main assembly 50a. That is, in the embodiment, the BLE communication unit 5 is immovable. In a case that the BLE communication unit 5 is fixed to the rotatable front cover 100, the arrival radio wave may not be favorably detected due to inconsistency at all times of a detection range by the BLE communication unit 5, by the rotational angle, the attachment error in the closed state, etc. of the front cover 100. On the other hand, as in the embodiment, since it is possible to favorably detect the arrival radio wave by fixing the BLE communication unit 5 to the unrotatable member, it is possible to favorably detect the direction in which the communication terminal 53 is positioned.

Embodiment 6

Figure 19:
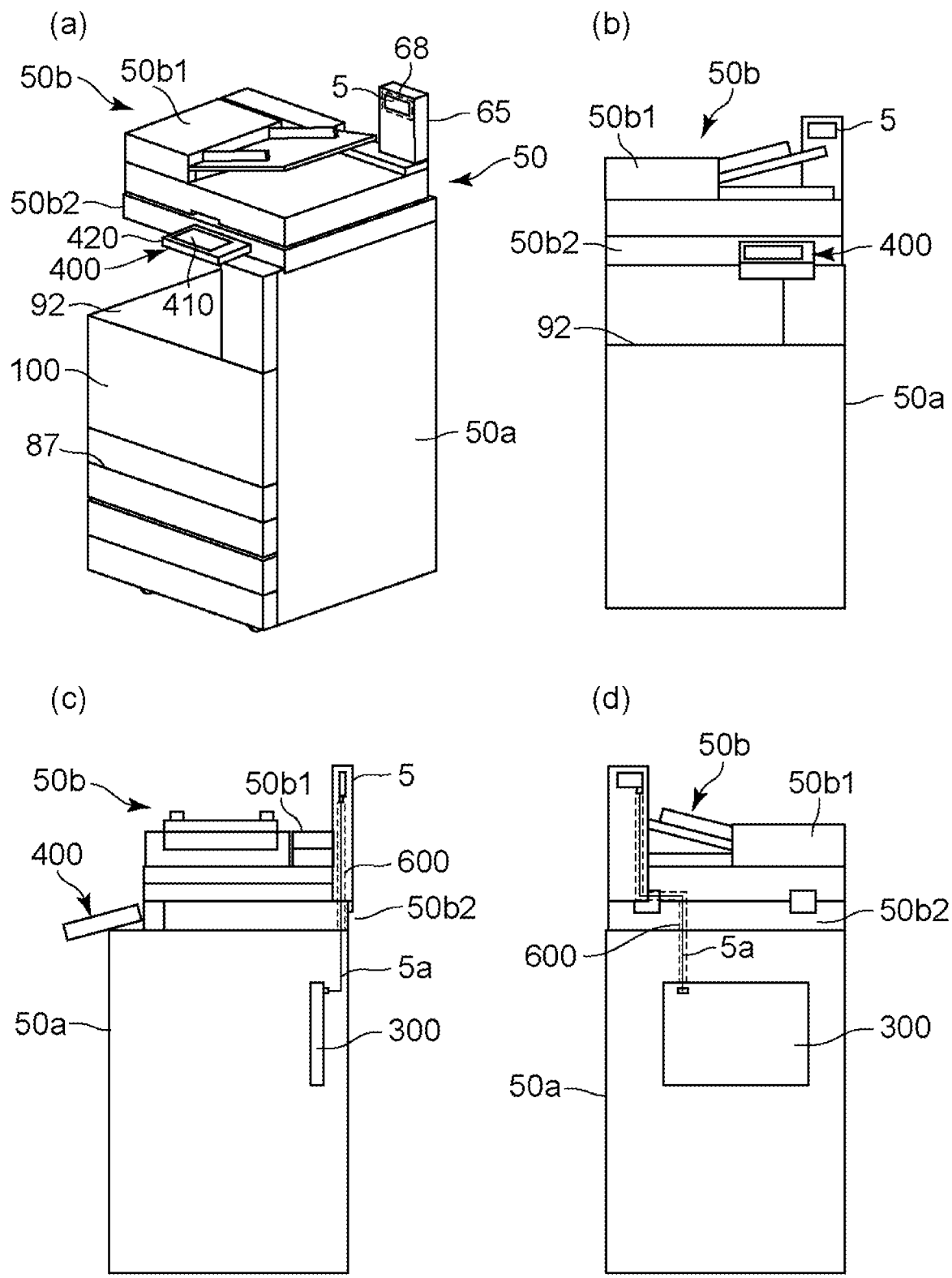
FIG. 19 is a view illustrating an arrangement of a BLE communication unit in a sixth embodiment.

Next, a sixth embodiment will be described by using FIGS. 19 through 21. FIG. 19 is a view showing a constitution of the image forming apparatus 50 in the sixth embodiment, wherein part (a) of FIG. 19 is an external appearance perspective view, part (b) of FIG. 19 is a front view, part (c) of the FIG. 19 is a side view, and part (d) of FIG. 19 is a back view. Incidentally, in the embodiment, an only difference from the embodiment described above is an arrangement of the BLE communication unit 5, and similar constitutions are indicated with same reference numerals and omitted from descriptions. Incidentally, in FIG. 19, the board 39 and the BLE antennas from 35 to 38 which constitute the BLE communication unit 5 are not shown, however, its constitution is same as in the first embodiment described above.

The image forming apparatus 50 in the embodiment is provided with the BLE communication unit 5 which performs the short range wireless communication with the communication terminal 53 by BLE (Bluetooth Low Energy), so that the BLE communication unit 5 protrudes from a top of the reading device 50b. Further, the BLE communication unit 5 is constituted to protrude from the top of the feeding portion 50b1 of the reading device 50b, and is covered by the outer cover 65. Incidentally, the BLE communication unit 5 is provided in a form of a board module which is constituted on a printed board.

Further, in the embodiment, as shown in FIG. 19, the BLE communication unit 5 is arranged in a rear side of the main assembly 50a of the image forming apparatus 50 and is arranged above the feeding portion 50b1. Here, the position above the feeding portion 50b1 is a position which is above the sheet loading surface of the feeding portion 50b1, and in which the BLE communication unit 5 does not overlap any members of the feeding portion 50b1 in case that the image forming apparatus 50 is viewed from the front. Further, the rear side of the main assembly 50a is a position in the rear side of the image forming portion 500 in a front and rear direction, and a position in the rear side of a rear end portion of the reading device 50b in the front and rear direction. Incidentally, in the embodiment, an example that the BLE communication unit 5 is fixed to the feeding portion 50b1 is described, however, it may be constituted to be fixed to the main assembly 50a as long as it protrudes from the feeding portion 50b1.

Further, in the embodiment, the reading device 50b which includes the feeding portion 50b1 is described as an example, however, in a case of a constitution which includes only the reading portion 50b2 and a document cover (constitution which does not include the feeding portion 50b), the BLE communication unit 5 may be constituted to be provided at a position in which it protrudes above the reading portion 50b2 and it may be provided at a position in which it protrudes above an uppermost unit.

In many cases, a user who carries the communication terminal 53 approaches from the front side of the image forming apparatus 50 to operate the operation portion 400 of the image forming apparatus 50. For details, it will be described below, however, in order to detect a direction by the BLE communication of Bluetooth 5.1, it is necessary to send and receive a direct wave of a wireless radio wave which arrives in a straight line between the image forming apparatus 50 and the communication terminal 53 which is carried by the user.

In the embodiment, by arranging the BLE communication unit 5 so that it protrudes from the top of the main assembly 50a of the image forming apparatus 50, it is possible to send and receive the direct wave of the wireless radio wave with the sufficient radio wave strength without being affected by shielding of the radio wave by the main assembly of the image forming apparatus 50, etc., in the BLE communication with the communication terminal 53 which is carried by the user. For example, in a case that the BLE communication unit 5 is arranged at a position in which it does not protrude from the top in a vertical direction in the rear side of the main assembly 50a of the image forming apparatus 50, it may not be able to obtain the sufficient radio wave strength since the radio wave is shielded by a unit inside the image forming apparatus 50 and the reading device 50b. On the other hand, in the embodiment, by arranging the BLE communication unit 5 at the position in which it protrudes from the top of the image forming apparatus 50, even in the rear side of the image forming apparatus 50, it is possible to prevent the radio wave from being shielded by the image forming apparatus 50 itself. Further, although the BLE communication unit 5 is constituted to protrude from the image forming apparatus 50, since the BLE communication unit 5 is provided in the rear side of the image forming apparatus 50, it is possible to send and receive the direct waves of the wireless radio waves with the sufficient radio wave strength without deteriorating a user's operability. Further, by providing the BLE communication unit 5 in a right side which is same as the operation portion 400 in a width direction (right and left direction) of the image forming apparatus 50, it is possible to more accurately detect a user who carries the communication terminal 53 and approaches the image forming apparatus 50 to operate the operation portion 400.

Further, the BLE communication unit 5 is arranged at the highest position of the image forming apparatus 50 in a vertical direction. Here, the highest position with respect to the main assembly 50a is a position which is higher than any part of the feeding portion 50b1 of the reading device 50b. As a result, the position, in which the BLE communication unit 5 is provided, is a position above the image forming portion 500 and the front cover 100 in the vertical direction.

Further, the position, in which the BLE communication unit 5 is provided, is a position above the discharge tray 92 in the vertical direction. Here, the position above the discharge tray 92 in the vertical direction is a position above at least a part of the sheet loading surface of the discharge tray 92 in the vertical direction.

In this way, by arranging the BLE communication unit 5 at the highest position in the main assembly 50a and at a position which does not overlap with any units of the image forming apparatus 50 in the front and rear direction, it is possible to send and receive the direct wave of the wireless radio wave with the sufficient radio wave strength, avoiding the influence of obstacles which exist between the image forming apparatus 50 and the communication terminal 53. Incidentally, details of each constitution of the BLE communication unit 5 will be described below.

In this embodiment, as shown in parts (c) and (d) of FIG. 19, the BLE communication unit 5 and the control portion 300 are arranged in the rear side of the image forming apparatus 50.

Thus, the BLE communication unit 5 and the control portion 300 are electrically connected by the cable 5. Since the cable 5a is passed through the cable guide 600 which is provided with the main assembly 50a, and is wired along the rear side of the image forming apparatus 50, it is easy to wire in the main assembly 50a and is designed to enhance workability when the image forming apparatus 50 is assembled or maintained.

Next, a method, that the BLE communication unit 5 is arranged by fixing to the main assembly 50a, will be described by using FIG. 20 and FIG. 21. Part (a) of FIG. 20 is a view of the BLE communication unit 5 fixed to the metal plate 61 which is connected to the support frame of the main assembly 50a, viewed from the front of the image forming apparatus 50 (side in which the display portion 410 is arranged), and is a view of the BLE communication unit 5, viewed from a thickness direction of the board. Thus, a lateral direction in part (a) of FIG. 20 is a horizontal direction in which the image forming apparatus 50 is installed. Further, part (b) of FIG. 20 is a sectional view of this, viewed from above the image forming apparatus 50.

The metal plate 61 is a metal plate which is fixed to the frame plate constituting of the support frame of the main assembly 50a as described above. Incidentally, the support frame of the main assembly 50a is a support frame of the reading device 50b which is constituted of a metal plate. Here, the metal plate 61 may be fixed to a frame which supports each unit of the image forming portion 500, or it may be a metal plate which is integrally formed with the support frame of the reading device 50b or it may be a metal plate which is formed separately.

The metal sheet 61 is connected to the support frame of the main assembly 50a and serves as the frame ground for the electric circuit, and is grounded via the ground wire, etc.

The metal spacer 62 is constituted of the metal member which is formed of metal, is the spacer for fixing the BLE communication unit 5 to the metal plate 61 and is fixed to the metal plate 61. The resin spacer 64 is constituted of the resin member which is formed of plastic resin, is the spacer for fixing the BLE communication unit 5 to the metal plate 61 and is fixed to the metal plate 61.

The screw 63 is the metal screw for fixing the BLE communication unit 5 to the metal spacer 62, and fixes the BLE communication unit 5 by passing through the screw hole 43 which is provided with the BLE communication unit 5 and being tighten by the tap which is formed in the metal spacer 62. As described above, the screw hole 43 which is provided with the BLE communication unit 5 is grounded to the electric circuit of the BLE communication unit 5.

Thus, the ground of the electric circuit of the BLE communication unit 5 is connected to the metal plate 61 via the metal spacer 62 and the screw 63, that is, it is connected to the frame ground of the electrical circuit of the main assembly 50*a*.

The resin spacer 64 is formed so that its leading end portion penetrates the through hole 44 of the BLE communication unit 5. Thus, the resin spacer 64 prevents the BLE communication unit 5 from rotating around the metal spacer 62, when the BLE communication unit 5 is fixed to the metal plate 61.

The outer cover 65 is an outer part which covers an outer surface of the BLE communication unit 5, and is formed by plastic resin. Further, the outer cover 65 is arranged to cover the BLE communication unit 5. Thus, the BLE antenna 35, the BLE antenna 36, the BLE antenna 37, and the BLE antenna 38 of the BLE communication unit 5 are covered by the outer cover 65. Here, the outer cover 65 is an example of a cover member which covers the BLE communication unit 5 which is fixed to the metal plate 61.

As described above, the BLE communication unit 5 is fixed to the metal plate 61 via the metal spacer 62 and the resin spacer 64. In this case, the respective antennas of the BLE antenna 35, the BLE antenna 36, the BLE antenna 37, and the BLE antenna 38 of the BLE communication unit 5 are arranged and fixed to the metal plate 61 so that they are arrayed in the horizontal direction on the installation surface of the image forming apparatus 5. Here, the metal spacer 62 is an example of the first support member, and the resin spacer 64 is an example of the second support member.

This is, as described above using part (a) of FIG. 6 and part (b) of FIG. 6, due to detect the arrival angle and the sending angle of the wireless radio wave by using two of the antennas when performing the direction detection between the image forming apparatus 50 and the mobile communication terminal 53.

That is, in the case of performing the direction detection between the image forming apparatus 50 and the communication terminal 53 which is present on the horizontal plane of the installation of the image forming apparatus 50, it is possible to detect in all directions efficiently by arraying the respective BLE antennas in the horizontal direction.

Figure 20:
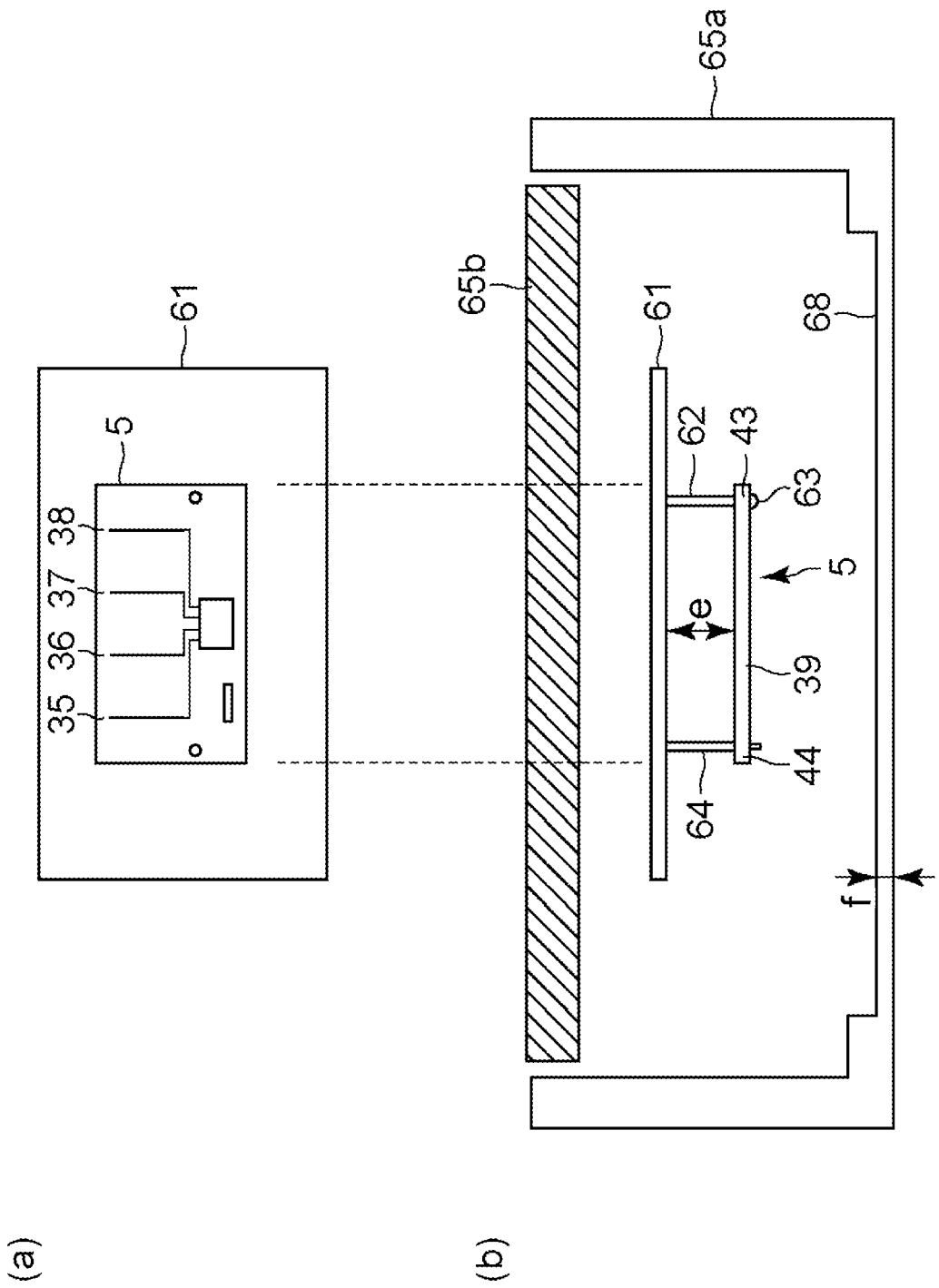
FIG. 20 is a view illustrating an arrangement of a BLE communication unit in a sixth embodiment.

Incidentally, as shown in part (b) of FIG. 20, the BLE communication unit 5 is fixed to the metal plate 61 by the metal spacer 62 and the resin spacer 64 with the distance e, so that it is parallel to the metal plate 61. At this time, the BLE communication unit 5 is fixed to the metal plate 61 so that distances between each of the BLE antennas from 35 to 38 and the metal plate 61 are equally spaced. This is due to maintain the uniform distance between each of the BLE antennas from 35 to 38 which are formed on the BLE communication unit 5 and the metal plate 61, and prevent the metal plate 61 from causing differences in the antenna characteristics of the BLE antennas from 35 to 38. Thus, it is possible to send and receive the wireless radio waves under the same characteristic conditions of the respective antennas, and it is possible to correctly detect the phase difference of the wireless radio waves between the antennas in the direction detection by the wireless radio wave described above, and to accurately calculate the direction in which the communication terminal 53 as the communication target is positioned.

Figure 21:
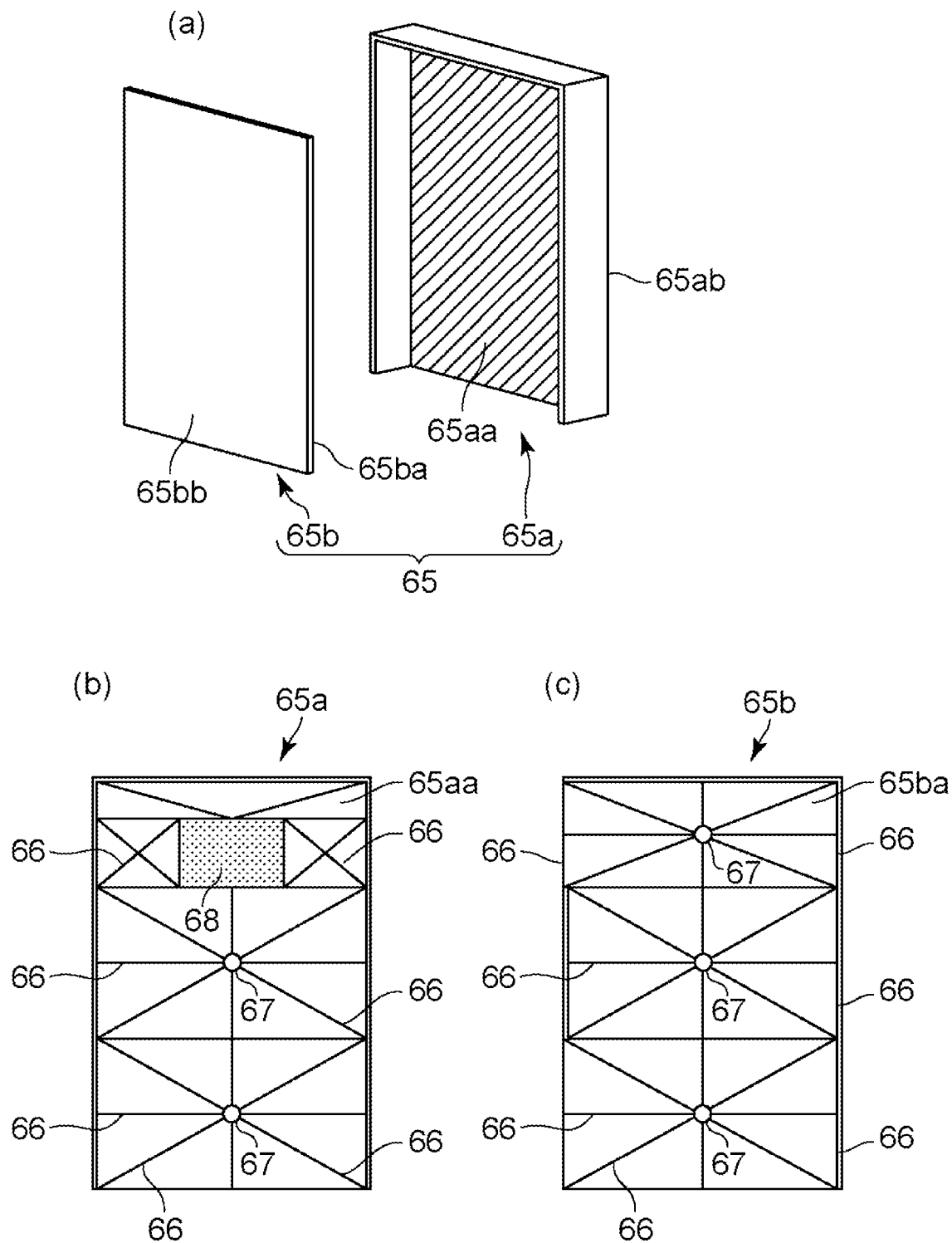
FIG. 21 is a view showing an outer cover which covers a BLE communication unit in a sixth embodiment.

FIG. 21 is a view showing the outer cover 65. As shown in part (a) of FIG. 19, the outer cover 65 is an outer part which is mounted so that it protrudes above the reading device 50*b* in the image forming apparatus 50, and covers the BLE communication unit 5. Further, the outer cover 65 is fixed to the reading device 50*b* or the main assembly 50*a* by unshown screws, etc. Here, the outer cover 65 may be constituted to be fixed to each support frame via an outer cover of the reading device 50*b* or an outer cover of the main assembly 50*a*.

Part (a) of FIG. 21 is an exploded perspective view of the outer cover 65. Part (b) of FIG. 21 is a plan view showing a detailed constitution of the inner surface 65*aa* of a first cover 65*a* of the outer cover 65. Part (c) of FIG. 21 is a plan view showing a detailed constitution of the inner surface 65 of a second cover 65*b* of the outer cover 65. Incidentally, the BLE communication unit 5 is not shown in FIG. 8.

As described part (a) of FIG. 21, the outer cover 65 includes a first cover portion 65*a* which covers a front surface of the BLE communication unit 5 (a front side of the image forming apparatus 50 in a front and rear direction and a mounting surface of the BLE antennas from 35 to 38 on the board 39) and a second cover portion 65*b* which covers a rear surface of the BLE communication unit 5 (a rear side of the image forming apparatus 50 in the front and back direction and a rear surface of the board 39).

The BLE communication unit 5 is fixed to the second cover portion 65*b* with unshown fixtures such as screws, the BLE communication unit 5 is covered by the first cover portion 65*a* so that it is sandwiched, and is fixed to the second cover portion 65*b* by unshown fixtures such as screws.

Here, in the first cover 65*a* of the outer cover 65, a surface which opposes the mounting surface of the antennas from 35 to 38 on the board 39 of the BLE communication unit 5 is defined as the inner surface 65*aa*. And, in the first cover 65*a* of the outer cover 65, a surface which forms an outer appearance of the image forming apparatus 50 is defined as the outer surface 65*ab*. Further, in the second cover 65*b*, a surface which opposes the rear side of the board 39 of the BLE communication unit 5 is defined as the inner surface 65*ba*, and a surface which forms an outer appearance of the image forming apparatus 50 is defined as the outer surface 65*bb*.

As described above, the metal plate 61 of the BLE communication unit 5 is grounded by being fixed or connected with a ground wire to the unshown support frame of the image forming apparatus 50.

Here, the outer cover 65 is molded from resin. In general, in a cover member which is formed using a resin material, ribs, bosses, etc. are formed on the inner surface 65*aa* of the first cover 65*a* and the inner surface 65*ba* of the second cover 65*b* in order to ensure a strength.

In the outer cover 65 of the embodiment, as shown in part (b) of FIG. 21, the plurality of ribs 66 as reinforcing ribs and the plurality of bosses 67 are formed on the inner surface 65*aa* of the first cover 65*a*. In this way, the cover itself is prevented from being deformed by reinforcing the first cover 65*a* of the outer cover 65 with the ribs 66 and the bosses 67.

However, even on the inner surface 65aa of the first cover 65a, the area 68 includes the uniform surface where the ribs 66 and the bosses 67 are not formed. That is, since the ribs 66 and the bosses 67 are provided in an area other than the area 68, the constitution of the area 68 is less unevenness compared to the other area on the inner surface 65aa of the first cover 65a.

The area 68 is arranged at a position to cover the area where the BLE communication portion 5 is arranged in part (a) of FIG. 19. That is, the area 68 is the area which opposes the front of the BLE communication portion 5 on the inner surface 65aa of the first cover 65a, and the area which opposes the BLE antennas from 35 to 38.

Further, as shown in part (b) of FIG. 20, the area 68 of the first cover 65a, which covers the BLE communication unit 5, is molded so that the thickness f of the molding material is uniform.

That is, no ribs and no bosses are existed in the portion of the area 68 of the first cover 65a which covers the BLE antenna 35, the BLE antenna 36, the BLE antenna 37, and the BLE antenna 38 of the BLE communication unit 5, and the portion of the area 68 is formed by molding resin so that the thickness f is uniform.

Thus, it is possible to maintain the uniform radio wave characteristics of the member which is arranged in front of the BLE antenna 35, the BLE antenna 36, the BLE antenna 37, and the BLE antenna 38 of the BLE communication unit 5. That is, it is possible to send and receive the wireless radio waves at the respective antennas under same characteristic conditions, preventing from causing differences in characteristics of the wireless radio waves which are sent and received by the BLE antenna 35, the BLE antenna 36, the BLE antenna 37, and the BLE antenna 38, passing through the first cover 65a.

Thus, it is possible to accurately calculate the direction in which the communication terminal 53 is positioned by correctly detecting the phase differences of the wireless radio waves among the antennas in the direction detection of the communication terminal 53 by means of the wireless radio waves.

Further, in the embodiment described above, a constitution is illustrated that in the outer cover 65, only the first cover 65a, which is positioned in the front side of the image forming apparatus 50, is provided with the area 68 in which the ribs 66 and the bosses 67 are not formed. On the other hand, the inner surface 65ba of the second cover 65b which is positioned in the rear side of the image forming apparatus 50, is constituted to be uniformly provided with the ribs 66 and the bosses 67. Since the second cover 65b is a member which opposes a rear surface which is an opposite side of a surface in which the BLE antennas from 35 to 38 are mounted with respect to the board 39, and does not directly affect a performance of sending and receiving of the wireless radio waves, it may be constituted to include the ribs 66 and the bosses 67 in the front side, in this way.

In this way, since it is possible to increase a strength of the outer cover 65 by including the ribs 66 and the bosses 67 on a front surface of the inner surface 65ba of the second over portion 65b, which is one of cover members 65 which covers the BLE communication unit 5 in a front and back direction, it is possible to stably hold the BLE communication unit 5.

As described above, in the embodiment, the BLE communication unit 5 is arranged so that it protrudes upward from the top of the image forming apparatus 50. In more detail, the BLE communication unit 5 is arranged so that it protrudes upward from the feeding portion 50b1 of the reading device 50b. Thus, when the BLE communication is performed with the communication terminal 53 which is carried by the user, it is possible to prevent the radio waves from being shielded by the main assembly 50a, the reading device 50b, etc. of the image forming apparatus 50 and to favorably detect the direction in which the communication terminal 53 is positioned by using the BLE communication. Further, by arranging the BLE communication unit 5 in the rear side of the image forming apparatus 50, it is possible to more accurately detect the user who carries the communication terminal 53 and approaches the image forming apparatus 50 to operate the operation portion 400. Further, by arranging the BLE communication unit 5 in a same right side as the right side in which the operation portion 400 is positioned in a right and left direction (width direction) of the image forming apparatus 50, it is possible to more accurately detect the user who carries the communication terminal 53 and approaches the image forming apparatus 50 to operate the operation portion 400.

Further, by arranging the BLE communication unit 5 at the highest position in the main assembly 50a, which is above the operation portion 400 in the vertical direction, it is possible to send and receive the direct wave of the arrival wireless radio wave with the sufficient radio wave strength by avoiding the influence of the obstacles existing between the image forming apparatus 50 and the communication terminal 53. Thus, it is possible to favorably detect the direction in which the communication terminal 53 is positioned.

Embodiment 7

Next, a seventh embodiment will be described by using FIG. 22 and FIG. 23. FIG. 22 is a view showing a constitution of the image forming apparatus 50 in the seventh embodiment, wherein part (a) of FIG. 22 is an external appearance perspective view, part (b) of FIG. 22 is a side view, and part (c) of the FIG. 22 is a back view. Incidentally, in the embodiment, an only difference from the embodiment described above is an arrangement of the BLE communication unit 5, and similar constitutions are indicated with same reference numerals and omitted from descriptions. Incidentally, in FIG. 22, the board 39 and the BLE antennas from 35 to 38 which constitute the BLE communication unit 5 are not shown, however, its constitution is same as in the first embodiment described above.

In case of the embodiment, the image forming apparatus 50 is provided with the BLE communication unit 5 which performs the short range wireless communication with the communication terminal 53 by BLE (Bluetooth Low Energy), so that the BLE communication unit 5 protrudes from a right side of the main assembly 50a. Further, the BLE communication unit 5 is constituted to protrude with respect to the outer cover of the main assembly 50a, and is covered by the outer cover 65. Incidentally, the BLE communication unit 5 is provided in a form of a board module which is constituted on a printed board.

Further, in the embodiment, the BLE communication unit 5 is arranged on a side surface of the main assembly 50a of the image forming apparatus 50, and is arranged below the operation portion 400. Incidentally, in the embodiment, a sheet is discharged from a right side to a left side of the image forming apparatus 50 by the discharging roller pair 91, so the BLE communication unit 5 is constituted to be provided on the right side surface of the main assembly 50a in the right and left direction, however, it may be provided on the left side surface of the main assembly 50a in case that a sheet discharge direction is from the left side to right side.

Further, in a case that the sheet discharge direction is a front and rear direction with respect to the main assembly 50a, the BLE communication unit 5 may be provided on either side of right and left. Further, the BLE communication unit 5 may be provided so that it protrudes from a side surface of the reading device 50b, instead of being provided on the side surface of the main assembly 50a.

Further, the BLE communication unit 5 in the embodiment is provided in the position in which it does not overlap with the operation portion 400 when the image forming apparatus 50 is viewed from the front side, even in the case that the operation portion 400 is rotated with respect to the main assembly 50a.

In the embodiment, by arranging the BLE communication unit 5 on the side surface of the main assembly 50a of the image forming apparatus 50, it is possible to send and receive the direct wave of the wireless radio wave with the sufficient radio wave strength without being affected by shielding of the radio wave by the main assembly of the image forming apparatus 50, etc., in the BLE communication with the communication terminal 53 which is carried by the user. For example, in a case that the BLE communication unit 5 is arranged on the rear side of the image forming apparatus 50, it may not be possible to obtain the sufficient radio wave strength since the radio wave is shielded by the unit inside the image forming apparatus 50 and the reading device 50b. On the other hand, in the embodiment, by arranging the BLE communication unit 5 on the side surface of the main assembly 50a of the image forming apparatus 50, it is possible to prevent the radio wave from being shielded by the image forming apparatus 50 itself. Further, by arranging the BLE communication unit 5 in the vicinity of the operation portion 400, it is possible to more accurately detect the user who carries the communication terminal 53 and approaches the image forming apparatus 50 to operate the operation portion 400.

Further, the BLE communication unit 5 is arranged in the vicinity of the operation unit 400 and at a relatively high position of the image forming apparatus 50 in the vertical direction. Here, the relatively high position with respect to the main assembly 50a is a position above the image forming portion 500 and the front cover 100 in the vertical direction.

Further, the relatively high position with respect to the main assembly 50a is a position above the discharge tray 92 in the vertical direction. Here, the position above the discharge tray 92 in the vertical direction is a position above at least a part of the sheet loading surface of the discharge tray 92. Further, the relatively high position with respect to the main assembly 50a is a position above the sheet feeding cassette 87 in the vertical direction.

In this way, by arranging the BLE communication unit 5 at the relatively high position in the main assembly 50a, it is possible to send and receive the direct wave of the wireless radio wave with sufficient radio wave strength, avoiding the influence of obstacles which exist between the image forming apparatus 50 and the communication terminal 53.

Further, by providing the BLE communication unit 5 so that it protrudes from the side surface of the image forming apparatus 50, it is possible to send and receive the direct wave of the wireless radio wave with sufficient radio wave strength, avoiding that the radio waves are shielded by an operator even in a case that the operator is existed in front of the image forming apparatus 50. Incidentally, an arrangement of the BLE communication unit 5 with respect to the area 68 of the outer cover is the same as what is described in the first embodiment by using FIG. 7.

In the embodiment, while the BLE communication unit 5 is arranged in a front side of the main assembly 50a of the image forming apparatus 50 as shown in part (b) of FIG. 22, the control portion 300 is arranged in the rear side of the main assembly 50a as shown in part (b) of FIG. 22.

Thus, the BLE communication unit 5 and the control portion 300 are electrically connected by a cable 5. Since the cable 5a is passed through a cable guide 600, which is provided with the main assembly 50a, is wired from a front surface to a rear surface in the main assembly 50a, it is easy to wire in the main assembly 50a and is designed to enhance workability when the image forming apparatus 50 is assembled or maintained.

Next, a method, that the BLE communication unit 5 is arranged by fixing to the main assembly 50a, will be described by using FIG. 23.

Figure 23:
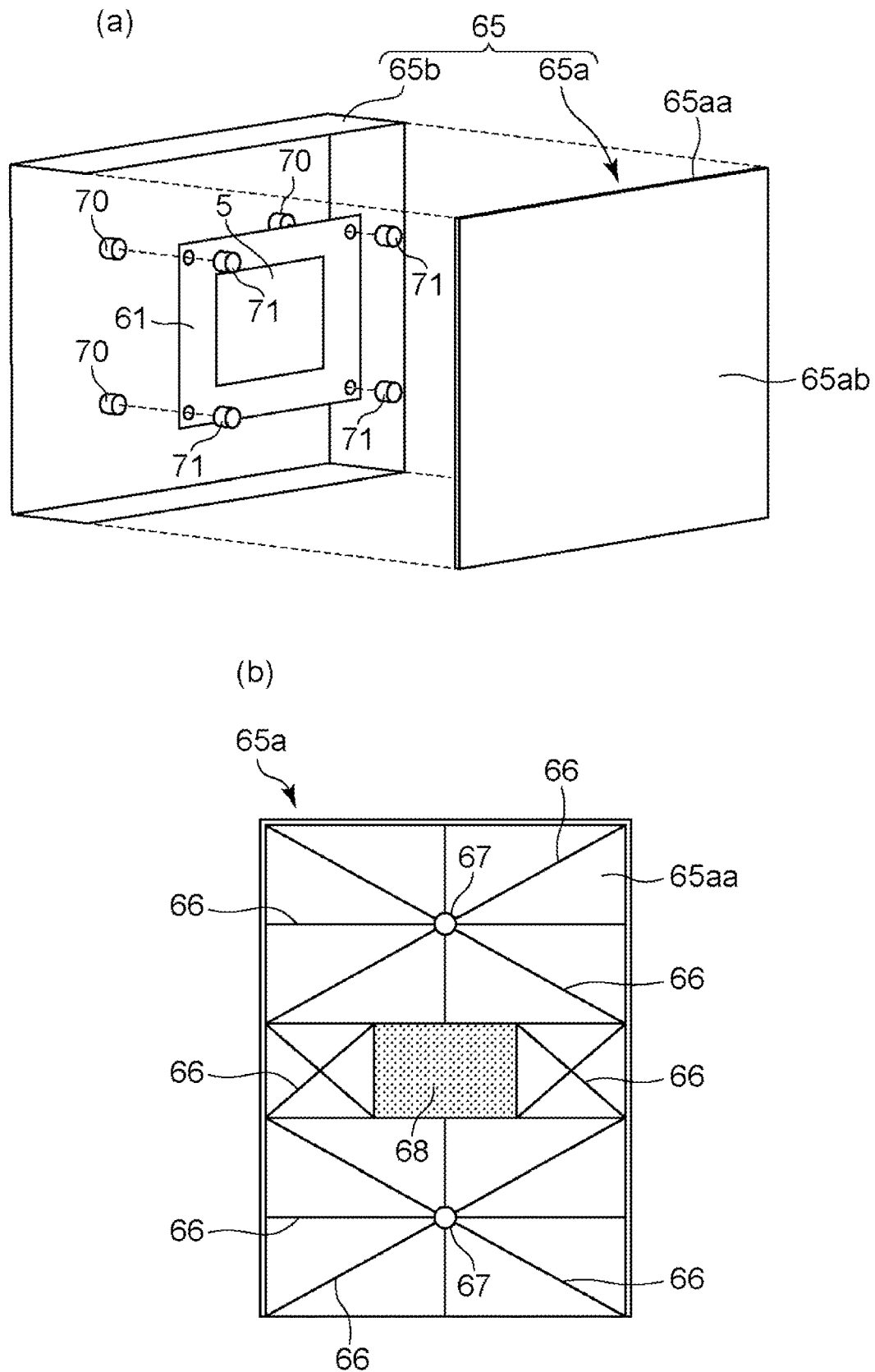
FIG. 23 is a view showing an outer cover which covers a BLE communication unit in a seventh embodiment.

The metal plate 61 shown in FIG. 23 is a metal plate which is connected to the frame plate which constitutes the support frame of the main assembly 50a. Incidentally, the support frame of the main assembly 50a is a frame which supports each unit of the image forming apparatus 500. Further, the support frame is a support frame which supports the reading device 50b. Here, the metal plate 61 may be a metal plate which is integrally formed with the support frame of the image forming portion 500 or it may be a metal plate which is formed separately. Here, detailed constitutions of the metal plate 61 and the BLE communication unit 5 which is fixed to the metal plate 61 are similar to the first embodiment, so the descriptions of them will be omitted.

FIG. 23 is a view showing the outer cover 65. As shown in part (a) of FIG. 22, the outer cover 65 is an outer part which is mounted on the side surface of the main assembly 50a, and covers the BLE communication unit 5. Further, the outer cover 65 is an outer part which is mounted below the operation portion 400, and is fixed to the main assembly 50a by unshown screws, etc.

Part (a) of FIG. 23 is an exploded perspective view of the outer cover 65. Part (b) of FIG. 23 is a plan view showing a detailed constitution of the inner surface 65aa of the first cover 65a of the outer cover 65. As shown in part (a) of FIG. 23, the outer cover 65 includes the first cover 65a which covers the front surface of the BLE communication unit 5, and the second cover 65b which covers the rear surface of the BLE communication unit 5. Thus, the BLE communication unit 5 is fixed so as to be sandwiched between the first cover portion 65a and the second cover portion 65b in the front and rear direction. Here, in the first cover 65a of the outer cover 65, a surface which opposes the BLE communication unit 5 is the inner surface 65aa. And, in the first cover 65a of the outer cover 65, a surface which forms an outer appearance of the image forming apparatus 50 is defined as the outer surface 65ab.

The metal plate 61 is fixed to a spacer 70 of the second cover 65b with screws 71. Further, the first cover 65a is fixed to the second cover 65b with unshown screws, etc. As described above, the metal plate 61 is grounded by being fixed or connected with a ground wire to the unshown support frame of the image forming apparatus 50.

Here, the outer cover 65 is molded from resin. In general, in a cover member, which is formed using a resin material, ribs, bosses, etc. are formed on the inner surface 65aa in order to ensure a strength.

In the outer cover 65 of the embodiment, as shown in part (b) of FIG. 8, the plurality of ribs 66 as reinforcing ribs and the plurality of bosses 67 are formed on the inner surface 65a. In this way, the cover itself is prevented from being deformed by reinforcing the first cover 65a of the outer cover 65 with the ribs 66 and the bosses 67. However, even on the inner surface 65a of the outer cover 65, the area 68 includes the uniform surface where the ribs 66 and the bosses 67 are not formed. That is, since the ribs 66 and the bosses 67 are provided in an area other than the area 68, the area 68 is constituted to be less unevenness compared to the other area on the inner surface 65a of the outer cover 65.

The area 68 is arranged at the position to cover the area where the BLE communication portion 5 is arranged in part (a) of FIG. 22. That is, the area 68 is the area which opposes the BLE communication portion 5 on the inner surface 65aa of the first cover 65a, and the area which opposes the BLE antennas from 35 to 38. Further, similar to the first embodiment, the area 68 of the first cover 65a is molded so that the thickness f of the molding material is uniform.

That is, no ribs and no bosses are existed in the portion of the area 68 of the outer cover 65 which covers the BLE antenna 35, the BLE antenna 36, the BLE antenna 37, and the BLE antenna 38 of the BLE communication unit 5, and the portion of the area 68 is formed by molding resin so that the thickness f is uniform.

Thus, it is possible to maintain the uniform radio wave characteristics of the member which is arranged in front of the BLE antenna 35, the BLE antenna 36, the BLE antenna 37, and the BLE antenna 38 of the BLE communication unit 5. Further, it is possible to send and receive the wireless radio waves at the respective antennas under same characteristic conditions, preventing from causing differences in characteristics of the wireless radio waves which are sent and received by the BLE antennas from 35 to 38, passing through the outer cover 65.

Thus, it is possible to accurately calculate the direction in which the communication terminal 53 is positioned by correctly detecting the phase differences of the wireless radio waves among the antennas in the direction detection of the communication terminal 53 by means of the wireless radio waves.

Incidentally, in the embodiment described above, the outer cover of the main assembly 50a and the outer cover 65 which covers the BLE communication unit 5 are constituted separately, however, the outer cover 65 may be constituted to be integrated into the outer cover which covers the main assembly 50a.

Further, in the embodiment described above, a constitution is illustrated that in the outer cover 65, only the first cover 65a, which is positioned in the front side of the image forming apparatus 50, is provided with the area 68 in which the ribs 66 and the bosses 67 are not formed. On the other hand, since the second cover 65b, which is positioned in the rear side of the image forming apparatus 50, is not in a direction from which the communication terminal 53 approaches, the second cover 65b is constituted to be provided uniformly with ribs and bosses.

As described above, in the embodiment, the BLE communication unit 5 is arranged on the side surface of the main assembly 50a of the image forming apparatus 50. Thus, when the BLE communication is performed with the communication terminal 53 which is carried by the user, it is possible to prevent the radio waves from being shielded by the main assembly 50a, the reading device 50b, etc. of the image forming apparatus 50 and to favorably detect the direction in which the communication terminal 53 is positioned by using the BLE communication. Further, by arranging the BLE communication unit 5 in the vicinity of the operation portion 400, it is possible to more accurately detect the user who carries the communication terminal 53 and approaches the image forming apparatus 50 to operate the operation portion 400.

Further, by arranging the BLE communication unit 5 in the vicinity of the operation unit 400, below the operation portion 400 and above the sheet feeding cassette 87 in the vertical direction, that is, at a position relatively high in the main assembly 50a, it is possible to send and receive the direct wave of the arrival wireless radio wave with the sufficient radio wave strength by avoiding the influence of the obstacles existing between the image forming apparatus 50 and the communication terminal 53. Thus, it is possible to favorably detect the direction in which the communication terminal 53 is positioned.

Further, in the embodiment described above, the BLE communication unit 5 is not constituted to be provided with the rotatable front cover 100 etc., but the BLE communication unit 5 is immovable with respect to the main assembly 50a. In a case that the BLE communication unit 5 is fixed to a rotatable member such as the front cover 100, the arrival radio wave may not be favorably detected due to inconsistency at all times of a detection range by the BLE communication unit 5, by the rotational angle, the attachment error in the closed state, etc. of the front cover 100. On the other hand, as in the embodiment, since it is possible to favorably detect the arrival radio wave by fixing the BLE communication unit 5 to the unrotatable member, it is possible to favorably detect the direction in which the communication terminal 53 is positioned.

In each of the embodiments described above, the constitution, in which the discharging roller pair 91 discharges a sheet to the discharge tray 92 from the right side to the left side in the right and left direction of the image forming apparatus 50, is described, however, it may apply the embodiment to a constitution that a sheet is discharged from the left side to the right side in the right and left direction. Further, it may also apply to a configuration in which a sheet is discharged by the discharging roller pair 91 from the rear side toward the front side of the image forming apparatus 50.

Further, in each of the embodiments described above, a constitution in which the discharge tray 92 is provided at a position below the reading device 50b and above the image forming portion 500 in a vertical direction, generally known as in body sheet discharge, is described, however, it may apply to a configuration in which the discharge tray is arranged outside the main assembly 50a (outside the reading device 50b in a right and left direction). Incidentally, the BLE communication unit 5 may be arranged, as shown in the embodiment, in the image forming apparatus 50 in which an unshown sheet processing device is connected in a downstream side in a sheet feeding direction, As described above, it is possible to improve the performance of the image forming apparatus 50 by using the plurality of BLE antennas from 35 to 38 for detecting the arrival direction of the radio wave.

INDUSTRIAL APPLICABILITY

According to the present invention, an image forming apparatus which uses antennas to detect an arrival direction of a radio wave will be provided.

The present invention is not limited to the above embodiments, and various changes and variations are possible without departing from the spirit and scope of the present invention. Therefore, the following claims are attached to publicly disclose the scope of the present invention.

This application claims priority on the basis of Japanese Patent Application 2019-176272 filed Sep. 26, 2019, Japanese Patent Application 2019-176273 filed Sep. 26, 2019, Japanese Patent Application 2019-176274 filed Sep. 26, 2019, Japanese Patent Application 2019-176275 filed Sep. 26, 2019, Japanese Patent Application 2019-176276 filed Sep. 26, 2019, and Japanese Patent Application 2019-176277 filed Sep. 26, 2019, the entire contents of which are hereby incorporated herein.

The invention claimed is:

1. An image forming apparatus including an image forming unit configured to form an image on a sheet, the image forming apparatus comprising:
   a main assembly including the image forming unit therein;
   a supporting frame including a metallic plate and for supporting the image forming unit;
   a reading device provided above the main assembly with respect to a vertical direction and for reading an image of an original;
   an operating portion provided on a front side of the reading device with respect to a front-rear direction of the image forming apparatus and above the main assembly with respect to the vertical direction, the operating portion being operable by a user; and
   a communication board provided with a plurality of antennas configured to communicate collectively in accordance with a same radio communication standard and to detect an arrival direction of a radio wave, the plurality of antennas being arranged along a horizontal direction,
   wherein the communication board is provided on a front side of the image forming apparatus with respect to the front-rear direction, and
   wherein the communication board is fixed to the metallic plate.

2. An image forming apparatus according to claim 1, wherein the reading device is provided with a reading portion for reading the image of the original and a feeding portion for feeding the original to the reading portion, and
   wherein the communication board is provided on a front side of the feeding portion with respect to the front-rear direction.

3. An image forming apparatus according to claim 1, wherein the reading device is provided with a reading portion for reading the image of the original and a feeding portion for feeding the original to the reading portion, and
   wherein the communication board is provided on a front side of the reading portion with respect to the front-rear direction.

4. An image forming apparatus according to claim 1, wherein the communication board is provided on a front side of the operating portion with respect to the front-rear direction.

5. An image forming apparatus according to claim 1, wherein the communication board is provided above the image forming unit and below the operating portion with respect to the vertical direction.

6. An image forming apparatus according to claim 1, further comprising a discharging tray provided between the reading device and the image forming unit with respect to the vertical direction, and into which the sheet on which the image is formed by the image forming unit is discharged,
   wherein the communication board is provided above the discharging tray and below the operating portion with respect to the vertical direction.

7. An image forming apparatus according to claim 1, further comprising an accommodating portion provided below the image forming unit with respect to the vertical direction and for accommodating the sheet to be fed to the image forming unit,
   wherein the communication board is provided below the accommodating portion with respect to the vertical direction.

8. An image forming apparatus according to claim 1, further comprising a cover member for covering the communication board and for forming an appearance of the image forming apparatus,
   wherein the communication board is covered by the cover member.

9. An image forming apparatus according to claim 8, wherein the cover member includes a reinforcing rib for reinforcing the cover member in an area other than an area opposing the communication board with respect to an inner side of the image forming apparatus.

10. An image forming apparatus according to claim 1, further comprising a cover member provided on a front side of the image forming unit with respect to the front-rear direction and openable and closable relative to the image forming apparatus,
    wherein the communication board is provided at a position where the communication board is covered by the cover member when the cover member is in a closing state and below the operating portion with respect to the vertical direction.

11. An image forming apparatus according to claim 10, wherein the cover member includes a reinforcing rib for reinforcing the cover member in an area other than an area opposing the communication board with respect to an inner side of the image forming apparatus.

12. An image forming apparatus according to claim 1, wherein the communication board is fixed to the metallic plate such that the plurality of antennas are arranged at equal intervals relative to the metallic plate.

13. An image forming apparatus according to claim 1, further comprising a first supporting member formed of a metallic member and a second supporting member formed of a resin member,
    wherein the communication board is fixed to the metallic plate via the first supporting member and the second supporting member.

14. An image forming apparatus according to claim 1, wherein the plurality of antennas perform a BLE communication in accordance to BLUETOOTH® standard.

15. An image forming apparatus according to claim 1, further comprising a control unit configured to control the image forming apparatus, in a case in which the radio wave outputted from a communication terminal is received by at least two of the plurality of antennas, based on a direction of the communication terminal of which position is detected on the basis of the arrival direction of the radio wave received by the plurality of antennas.

16. An image forming apparatus according to claim 15, wherein the control unit is capable of shifting the image forming apparatus between an activation state permitting image formation by the image forming unit and a power saving state in which power consumption is less than that in the activation state, and
    wherein the control unit shifts the image forming apparatus from the power saving state to the activation state in a case in which the communication terminal approaches from a predetermined direction and a position of the communication terminal to the image forming apparatus is within a predetermined distance.

17. An image forming apparatus according to claim 16, wherein the control unit performs a start-up control of the image forming unit in the case in which the control unit shifts the image forming apparatus from the power saving state to the activation state.

18. An image forming apparatus according to claim 15, further comprising a storing unit configured to store an ID list of an authenticable use,
wherein the control unit performs a use authentication processing to a user ID of the communication terminal detected by at least one of the plurality of antennas on the basis of the ID list stored in the storing unit in a case in which the communication terminal approaches from a predetermined direction and a position of the communication terminal to the image forming apparatus is within a predetermined distance.

19. An image forming apparatus according to claim 16, wherein the operating portion includes a display portion for displaying information on the image forming apparatus, and
wherein the control unit shifts a display screen of the display portion to a screen in the activation state in the case in which the control unit shifts the image forming apparatus from the power saving state to the activation state.

20. An image forming apparatus according to claim 18, wherein the operating portion includes a display portion for displaying information on the image forming apparatus, and
wherein, in a case in which a user ID of the ID list stored in the storing unit coincides with the user ID of the communication terminal, the control unit causes the display portion to display an operation screen corresponding to the user ID coincided on the display portion.

* * * * *